United States Patent
Yu et al.

(10) Patent No.: US 12,513,772 B2
(45) Date of Patent: Dec. 30, 2025

(54) TRANSMISSION DURING A RADIO ACCESS NETWORK (RAN) UPDATE

(71) Applicant: Apogee Networks, LLC, Plano, TX (US)

(72) Inventors: Qiaoling Yu, Shanghai (CN); Xiaobo Zhang, Shanghai (CN)

(73) Assignee: Apogee Networks, LLC, Plano, TX (US)

( * ) Notice: Subject to any disclaimer, the term of this patent is extended or adjusted under 35 U.S.C. 154(b) by 312 days.

(21) Appl. No.: 18/207,697

(22) Filed: Jun. 9, 2023

(65) Prior Publication Data

US 2023/0328836 A1    Oct. 12, 2023

Related U.S. Application Data

(63) Continuation of application No. PCT/CN2021/136314, filed on Dec. 8, 2021.

(30) Foreign Application Priority Data

Dec. 10, 2020 (CN) .......................... 202011436602.3
Dec. 16, 2020 (CN) .......................... 202011487376.1
Jan. 15, 2021 (CN) .......................... 202110051706.0

(51) Int. Cl.
*H04W 76/27* (2018.01)
*H04W 76/38* (2018.01)

(52) U.S. Cl.
CPC ........... *H04W 76/27* (2018.02); *H04W 76/38* (2018.02)

(58) Field of Classification Search
CPC .............................. H04W 76/27; H04W 76/38
See application file for complete search history.

(56) References Cited

U.S. PATENT DOCUMENTS

| 11,324,063 B2 | 5/2022 | da Silva et al. |
| 2018/0139778 A1 | 5/2018 | Chou et al. |

(Continued)

FOREIGN PATENT DOCUMENTS

| CN | 110140409 A | 1/2018 |
| CN | 111434131 A | 11/2018 |

(Continued)

OTHER PUBLICATIONS

ISR received in application No. PCT/CN2021/136314 dated Mar. 1, 2022.

(Continued)

*Primary Examiner* — Mewale A Ambaye
(74) *Attorney, Agent, or Firm* — Volpe Koenig

(57) ABSTRACT

The present application discloses a method and a device in a communication node for wireless communications. A communication node receives a first message; and as a response to the action of receiving a first message, starts a first timer; and determines whether to transmit a second message at a first time according to whether a packet is to be transmitted via a first data radio bearer; the first message is an RRC signaling, where a name of the first message includes RRC and Release, the first message indicating a first expiration value of the first timer; a time interval from the first time to the starting action of the first timer is no smaller than the first expiration value of the first timer. The present application proposes a scheme of canceling the performance of RNA update in Small Data transmission for guaranteeing the transmission of small data packets.

16 Claims, 10 Drawing Sheets

(56) References Cited

U.S. PATENT DOCUMENTS

| | | | |
|---|---|---|---|
| 2020/0045767 A1 | 2/2020 | Velev et al. | |
| 2020/0092939 A1 | 3/2020 | Kim et al. | |
| 2023/0276530 A1* | 8/2023 | Jeon | H04W 36/06 370/329 |
| 2023/0309127 A1* | 9/2023 | Prasad | H04W 72/51 |
| 2024/0015689 A1* | 1/2024 | Tseng | H04W 4/029 |
| 2024/0080933 A1* | 3/2024 | Xiao | H04W 76/19 |
| 2024/0155725 A1 | 5/2024 | Agiwal | |
| 2024/0244698 A1* | 7/2024 | Kim | H04W 28/02 |
| 2024/0251446 A1* | 7/2024 | Prasad | H04W 74/004 |
| 2024/0365277 A1* | 10/2024 | Rao | H04W 64/00 |

FOREIGN PATENT DOCUMENTS

| | | | | |
|---|---|---|---|---|
| CN | 111972009 A | 12/2018 | | |
| CN | 110278612 A | 3/2019 | | |
| CN | 110225600 A | 9/2019 | | |
| CN | 110546975 A | 12/2019 | | |
| CN | 110999523 A | 4/2020 | | |
| EP | 4218268 A1 | 8/2023 | | |
| EP | 4277423 A1 | 11/2023 | | |
| EP | 4277430 A1 | 11/2023 | | |
| WO | 2020087280 A1 | 10/2018 | | |
| WO | WO-2019202516 A1 * | 10/2019 | | H04W 60/02 |
| WO | 2020074507 A1 | 4/2020 | | |
| WO | 2020221861 A1 | 4/2020 | | |
| WO | 2020112606 A1 | 6/2020 | | |
| WO | 2022191599 A1 | 9/2022 | | |
| WO | 2022205360 A1 | 10/2022 | | |

OTHER PUBLICATIONS

Samsung DRB and QoS management in Inactive 3GPP TSG-RAN WG2 Feb. 2017 RAN2#97 R2-1701528 Feb. 17, 2017.
Intel Corporation Support of RRC inactive state 3GPP TSG RAN WG2 Meeting #106 R2-1906439 May 17, 2019.
Qualcomm Incorporated Report of Email Discussion [NR-AH1801#14][NR] RRC inactive procedures 3GPP TSG-RAN WG2 Meeting #101 R2-1803585 Mar. 2, 2018.
The extended European search report in application EP21902627.5 dated Jul. 12, 2024.
First Office Action of Chinese patent application No. CN202011436602.3 dated Aug. 29, 2024.
Second Office Action of Chinese patent application No. CN202011436602.3 dated Nov. 18, 2024.
First Search Report of Chinese patent application No. CN202011436602.3 dated Aug. 26, 2024.
Supplementary Search Report of Chinese patent application No. CN202011436602.3 dated Nov. 12, 2024.
NEC "Discussion on CG-based Small Data Transmissions"3GPP TSG-RAN WG2 Meeting #112 electronic R2-2009973 Oct. 23, 2020.
Supplementary European Search Report in U.S. Appl. No. 21/902,627 dated Jul. 5, 2024.
Ntel Corporation:"Control Planeleftover issues on sT procedure"3GPP DRAFT:R2-2109620 , 3rd Partnership PROIECT(3GPP) , Mobilecompetence Centre:650 , Route Deslucioles :F-06921 Sophia-Antipolis Cedexfrance.
Intel Corporation:"Control Planeleftover issues on SDT mechanism"3GPP Draft:R2-2107293 , 3rdepartnership Project(3GPP) , Mobilecompetence CENTRE:650 , Route Deslucioles :F-06921 Sophia-Antipoliscex:France.
3rd Generation Partnership Project;Technical specification Group Radio access Network;NR;Radio Resource Control (RRC)protocol specification(Release 16),3GPP DRAFT:38331-G20 , 3rdpartnership Proiect(3GPP) Mobilecompetence Centre:650 , Routedelucioles :F-06921 Sophia-Antipoliscedex:France.
Huawei et al., "Small data transmission with RA-based schemes," 3GPP TSG-RAN WG2 Meeting #111-e, R2-2006583, Electronic (Aug. 17-28, 2020).
Lenovo et al., "Analysis on RA selection and Rnau," 3GPP TSG-RAN WG2 Meeting #112 electronic, R2-2009873, E-meeting (Nov. 2-13, 2020).
Third Generation Partnership Project, "Technical Specification Group Radio Access Network; NR; NR and NG-RAN Overall Description; Stage 2 (Release 16)," 3GPP TS 38.300 V16.3.0 (Sep. 2020).
Third Generation Partnership Project, "Technical Specification Group Radio Access Network; NR; NR and NG-RAN Overall Description; Stage 2 (Release 16)," 3GPP TS 38.300 V16.7.0 (Sep. 2021).
Third Generation Partnership Project, "Technical Specification Group Radio Access Network; NR; Radio Resource Control (RRC) protocol specification (Release 16)," 3GPP TS 38.331 V16.6.0 (Sep. 2021).
Third Generation Partnership Project, "Technical Specification Group Radio Access Network; NR; Physical channels and modulation (Release 16)," 3GPP TS 38.211 V16.3.0 (Sep. 2020).

* cited by examiner

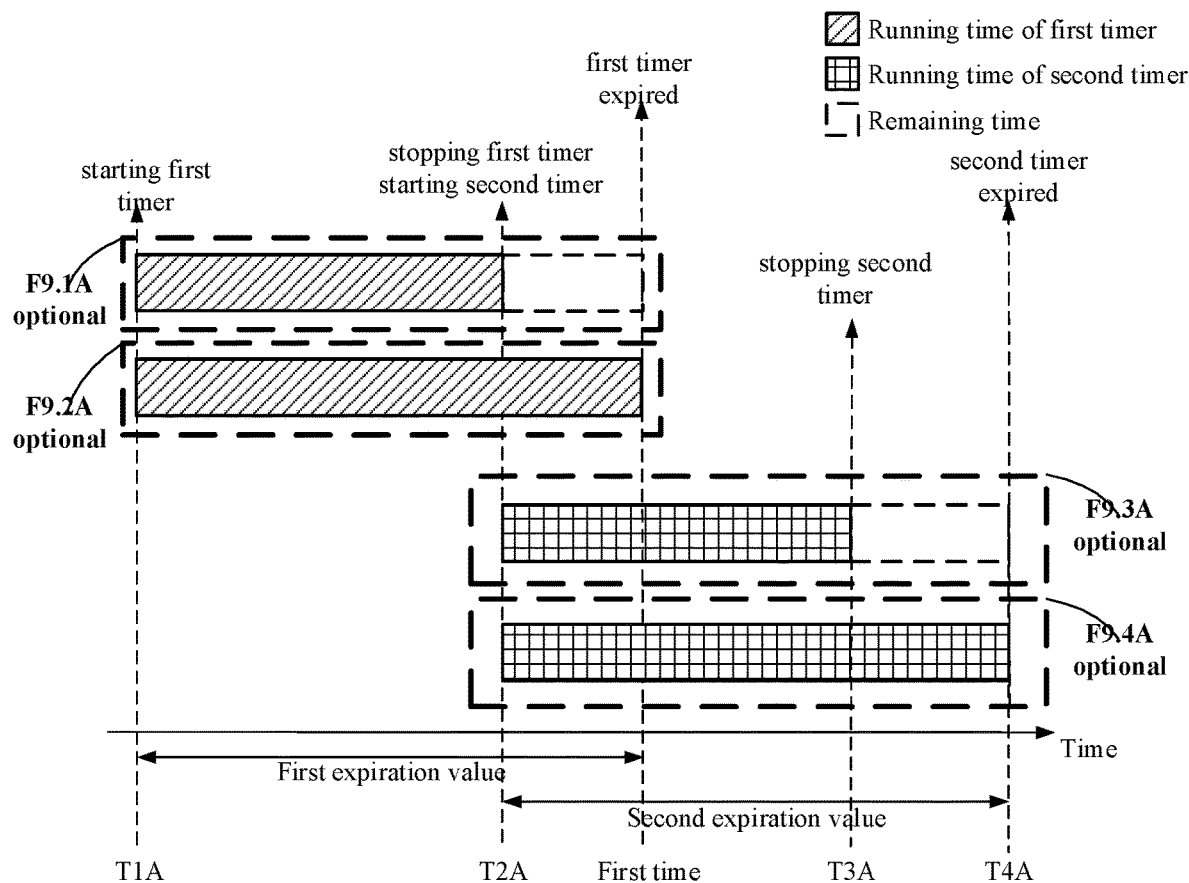
FIG. 9A
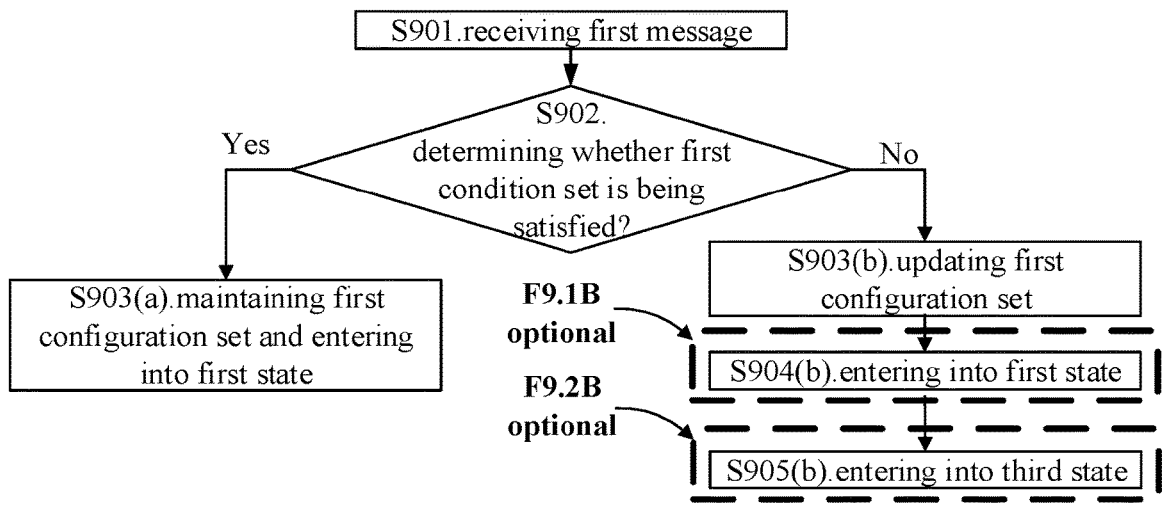
FIG. 9B
At second time  —transmitting→  Second message
FIG. 10A

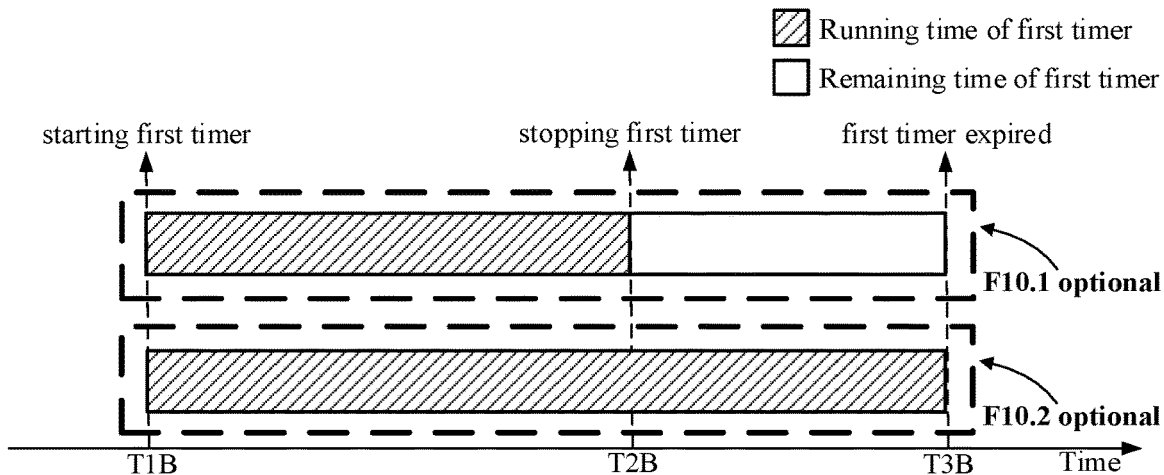
FIG. 10B
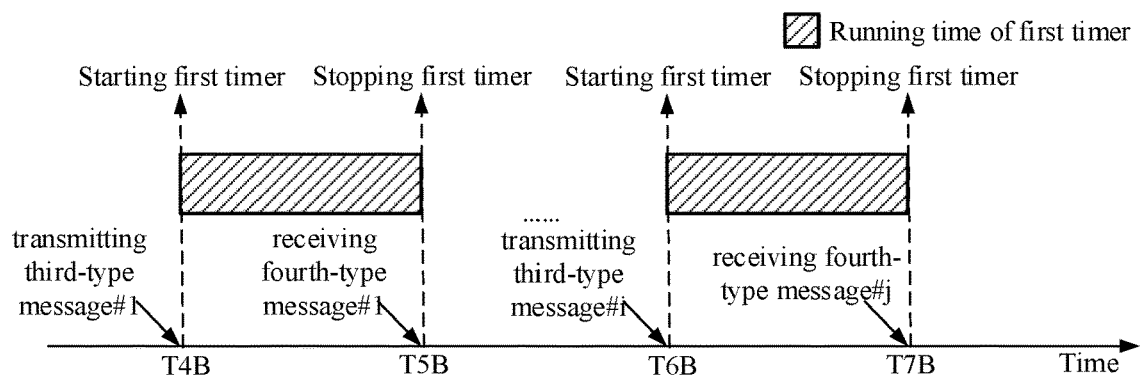
FIG. 11A
FIG. 11B
Third message —is→ one of Q1 third-type message(s)
Fourth message —is→ one of Q2 fourth-type message(s)
FIG. 12A
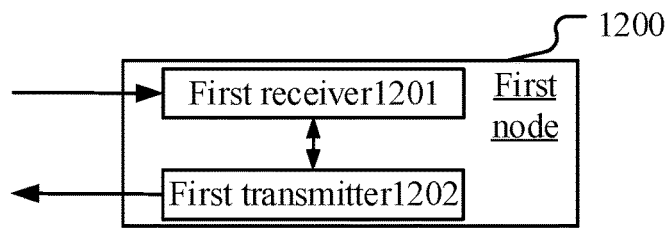
FIG. 12B

TRANSMISSION DURING A RADIO ACCESS NETWORK (RAN) UPDATE

CROSS REFERENCE TO RELATED APPLICATIONS

This application is the continuation of the international patent application No. PCT/CN2021/136314, filed on Dec. 8, 2021, and claims the priority benefit of Chinese Patent Application No. 202011436602.3, filed on Dec. 10, 2020; and claims the priority benefit of Chinese Patent Application No. 202011487376.1, file on Dec. 16, 2020; and claims the priority benefit of Chinese Patent Application No. 202110051706.0, filed on Jan. 15, 2021, the full disclosure of which is incorporated herein by reference.

BACKGROUND

Technical Field

The present application relates to transmission methods and devices in wireless communication systems, and in particular to a method and a device for transmission of small-data traffics.

Related Art

New Radio (NR) supports Radio Resource Control_INACTIVE (RRC_INACTIVE) State till the 3GPP Rel-16 in which data transmission is no longer supported in an RRC_INACTIVE State. When a User Equipment (UE) in an RRC_INACTIVE state has to transmit periodic or aperiodic small data packets that come infrequently, it firstly needs to resume its connection, which means to switch to an RRC_CONNECTED state, and then transit to an RRC_INACTIVE state after completing data transmission. As was decided at the 3GPP RAN #86 meetings, a Work Item (WI) of "NR INACTIVE state Small Data Transmission (SDT)" will be conducted to study the technique of small data packet transmission in an RRC_INACTIVE state, including transmitting uplink data on pre-configured Physical Uplink Shared Channel (PUSCH) resources, or carrying data by means of either a Message 3 (Msg3) or a Message B (MsgB) in a Random Access (RA) procedure.

SUMMARY

When in an RRC_INACTIVE state a UE maintains a RAN Notification Area (RNA). When a timer T380 expires or receives a System Information Block (SIB) indication, it will trigger an RNA Update, and upon the completion of RNA Update some link configurations will be released, which will have some influence on the small data transmission being performed. Therefore, combined enhancements for RNA Update and Small data transmission in an RRC_INACTIVE state are necessary, or, enhancements for radio configurations in an RRC_INACTIVE state are necessary.

To address the above problem, the present application provides a solution. The statement above only took NR scenarios for example, though; the present application is also applicable to scenarios such as Long Term Evolution (LTE) or NarrowBand Internet of Things (NB-IoT), where similar technical effects can be achieved. Additionally, the adoption of a unified solution for various scenarios contributes to the reduction of hardcore complexity and costs.

In one embodiment, interpretations of the terminology in the present application refer to definitions given in the 3GPP TS36 series.

In one embodiment, interpretations of the terminology in the present application refer to definitions given in the 3GPP TS38 series.

In one embodiment, interpretations of the terminology in the present application refer to definitions given in the 3GPP TS37 series.

In one embodiment, interpretations of the terminology in the present application refer to definitions given in Institute of Electrical and Electronics Engineers (IEEE) protocol specifications.

It should be noted that if no conflict is incurred, embodiments in any node in the present application and the characteristics of the embodiments are also applicable to any other node, and vice versa. What's more, the embodiments in the present application and the characteristics in the embodiments can be arbitrarily combined if there is no conflict.

The present application provides a method in a first node for wireless communications, comprising:
  receiving a first message; and as a response to the action of receiving a first message, starting a first timer; and
  determining whether to transmit a second message at a first time according to whether a packet is to be transmitted via a first data radio bearer;
  herein, the first message is a Radio Resource Control (RRC) signaling, where a name of the first message includes RRC and Release, the first message indicating a first expiration value of the first timer; a time interval from the first time to the starting action of the first timer is no smaller than the first expiration value of the first timer; the second message is used to determine an update of a first area; the first data radio bearer is a data radio bearer of a first cell group.

In one embodiment, an issue to be solved in the present application comprises: how to guarantee small data transmission during the RNA update.

In one embodiment, characteristics of the above method include: determining whether to transmit a second message at a first time according to whether a packet is to be transmitted via a first data radio bearer.

In one embodiment, characteristics of the above method include: transmitting a packet via a first data radio bearer being used to determine that a second message is transmitted at a first time.

In one embodiment, characteristics of the above method include: not transmitting a packet via a first data radio bearer being used to determine that transmitting a second message is dropped at a first time.

In one embodiment, characteristics of the above method include: the first time including a time when the first timer expires.

In one embodiment, characteristics of the above method include: the first timer being stopped, and dropping transmitting a second message.

In one embodiment, characteristics of the above method include: the first timer being expired, and dropping transmitting a second message.

In one embodiment, characteristics of the above method include: the second message being used to determine an update of a first area.

In one embodiment, an advantage of the above method includes: guaranteeing small data packet transmission.

In one embodiment, an advantage of the above method includes: the second message not being transmitted during the small data transmission.

According to one aspect of the present application, characterized in comprising:
transmitting a first signal; and
as a response to the action of transmitting a first signal, receiving a second signal;
herein, the first signal is used for a random access procedure; the first signal is used to determine that a packet is to be transmitted via the first data radio bearer.

According to one aspect of the present application, characterized in comprising:
transmitting a third message; and
monitoring a fourth message;
herein, a packet transmitted via the first data radio bearer comprises the third message; the third message is used to trigger the fourth message.

According to one aspect of the present application, characterized in comprising:
receiving a first signaling; configuring a state of a second timer according to whether a packet is to be transmitted via the first data radio bearer; and
determining whether to transmit the second message at the first time according to the state of the second timer;
herein, the first signaling indicates a second expiration value of the second timer; the first timer is different from the second timer.

According to one aspect of the present application, characterized in comprising:
the first receiver, while the first timer is running, stopping the first timer as a response to starting the second timer;
herein, the action of configuring a state of a second timer comprises the action of starting the second timer.

According to one aspect of the present application, characterized in that a time of starting the second timer is related to a reception of a first indication from lower layers; and a time of stopping the second timer is related to a reception of a second indication from lower layers; the first indication is used to determine a start of that a packet is to be transmitted via the first data radio bearer; the second indication is used to determine a stop of that a packet is to be transmitted via the first data radio bearer.

According to one aspect of the present application, characterized in comprising:
as a response to dropping transmitting the second message at the first time, transmitting the second message at a second time;
herein, a time interval between the second time and the first time is related to transmitting a packet via the first data radio bearer.

The present application provides a method in a second node for wireless communications, comprising:
transmitting a first message; and
monitoring a second message;
herein, as a response to the first message being received, a first timer is started; whether the second message is transmitted at a first time is determined according to whether a packet is to be transmitted via a first data radio bearer; the first message is an RRC signaling, where a name of the first message includes RRC and Release, the first message indicating a first expiration value of the first timer; a time interval from the first time to the starting action of the first timer is no smaller than the first expiration value of the first timer; the second message is used to determine an update of a first area; the first data radio bearer is a data radio bearer of a first cell group.

According to one aspect of the present application, characterized in comprising:
receiving a first signal; and
as a response to the action of receiving a first signal, transmitting a second signal;
herein, the first signal is used for a random access procedure; the first signal is used to determine that a packet is to be transmitted via the first data radio bearer.

According to one aspect of the present application, characterized in comprising:
monitoring a third message; and
upon reception of the third message, transmitting a fourth message;
herein, a packet transmitted via the first data radio bearer comprises the third message; the third message is used to trigger the fourth message.

According to one aspect of the present application, characterized in comprising:
transmitting a first signaling; and
receiving a second message;
herein, a state of a second timer is configured according to whether a packet is to be transmitted via the first data radio bearer; and whether the second message is transmitted at the first time is determined according to the state of the second timer; the first signaling indicates a second expiration value of the second timer; the first timer is different from the second timer.

According to one aspect of the present application, characterized in that when the first timer is running, as a response to starting the second timer, the first timer is stopped; the action of configuring a state of a second timer comprises the action of starting the second timer.

According to one aspect of the present application, characterized in that a time of starting the second timer is related to a reception of a first indication from lower layers; and a time of stopping the second timer is related to a reception of a second indication from lower layers; the first indication is used to determine a start of that a packet is to be transmitted via the first data radio bearer; the second indication is used to determine a stop of that a packet is to be transmitted via the first data radio bearer.

According to one aspect of the present application, characterized in comprising:
receiving a second message;
herein, in response to transmitting of the second message being dropped at the first time, the second message is transmitted at a second time; a time interval between the second time and the first time is related to transmitting data packet through the first Data Radio Bearer (DRB).

The present application provides a first node for wireless communications, comprising:
a first receiver, receiving a first message; and as a response to the action of receiving a first message, starting a first timer; and
a first transmitter, determining whether to transmit a second message at a first time according to whether a packet is to be transmitted via a first data radio bearer;
herein, the first message is a Radio Resource Control (RRC) signaling, where a name of the first message includes RRC and Release, the first message indicating a first expiration value of the first timer; a time interval from the first time to the starting action of the first timer is no smaller than the first expiration value of the first timer; the second message is used to determine an update of a first area; the first data radio bearer is a data radio bearer of a first cell group.

The present application provides a second node for wireless communications, comprising:
  a second transmitter, transmitting a first message; and
  a second receiver, monitoring a second message;
  herein, as a response to the first message being received, a first timer is started; whether the second message is transmitted at a first time is determined according to whether a packet is to be transmitted via a first data radio bearer; the first message is an RRC signaling, where a name of the first message includes RRC and Release, the first message indicating a first expiration value of the first timer; a time interval from the first time to the starting action of the first timer is no smaller than the first expiration value of the first timer; the second message is used to determine an update of a first area; the first data radio bearer is a data radio bearer of a first cell group.

In one embodiment, compared with the prior art, the present application is advantageous in the following aspects:
  guaranteeing small data packet transmission;
  the second message not being transmitted in the procedure of small data transmission, thus guaranteeing small data transmission;
  the second message not being transmitted while a second timer is running, thus guaranteeing small data transmission;
  postponing transmission of the second message, thus guaranteeing small data transmission.

The present application provides a method in a first node for wireless communications, comprising:
  receiving a first message, the first message being a Radio Resource Control (RRC) signaling, where a name of the first message includes RRC and Release; as a response to a first condition set being satisfied, maintaining a first configuration set and entering into a first state, the first configuration set comprising a first data radio bearer, the first data radio bearer being a data radio bearer of a first cell group;
  herein, the first condition set comprises the action of receiving the first message, where the first state is an RRC state other than an RRC Connected state.

In one embodiment, a problem to be solved in the present application includes: how to preserve the first configuration set in an RRC_INACTIVE state.

In one embodiment, characteristics of the above method include: a reception of the first message not being used to trigger an update of the first configuration set.

In one embodiment, characteristics of the above method include: the first message being triggered by an RNA update.

In one embodiment, characteristics of the above method include: the first message being triggered by small data transmission.

In one embodiment, characteristics of the above method include: the first message being triggered by an RRC state transition.

In one embodiment, an advantage of the above method includes: ensuring small data transmission.

In one embodiment, an advantage of the above method includes: preserving the first configuration set during small data transmission.

According to one aspect of the present application, characterized in comprising:
  transmitting a second message, the second message being used to trigger the first message.

In one embodiment, characteristics of the above method include: the first message being triggered by the second message.

According to one aspect of the present application, characterized in comprising:
  transmitting a third message; and
  monitoring a fourth message;
  herein, the third message is related to the first data radio bearer; the third message is used to trigger the fourth message.

In one embodiment, characteristics of the above method include: the third message is used for transmitting small data packet.

In one embodiment, characteristics of the above method include: all or part of the third message is transmitted through the first data radio bearer.

In one embodiment, characteristics of the above method include: the third message is used for RA-based small data transmission.

In one embodiment, characteristics of the above method include: the third message is used for RA-less small data transmission.

In one embodiment, characteristics of the above method include: the third message is used for RRC-based small data transmission.

In one embodiment, characteristics of the above method include: the third message is used for RRC-less small data transmission.

In one embodiment, characteristics of the above method include: the third message comprises one or more of uplink transmissions.

In one embodiment, characteristics of the above method include: the third message not carrying an RRC message.

In one embodiment, characteristics of the above method include: the third message carrying an RRC message.

According to one aspect of the present application, characterized in comprising:
  receiving a first signaling;
  herein, the first signaling indicates a first expiration value of a first timer, the first timer being related to the first data radio bearer; the first condition set comprises the first timer being running.

In one embodiment, characteristics of the above method include: the first timer being running is used to determine to maintain the first configuration set and enter into the first state.

In one embodiment, characteristics of the above method include: whether to maintain the first configuration set and enter into the first state is related to the running state of the first timer.

According to one aspect of the present application, characterized in that a time of starting the first timer is no later than the action of transmitting the third message; a condition of stopping the first timer includes receiving the fourth message.

In one embodiment, characteristics of the above method include: a time of starting the first timer is earlier than the third message.

In one embodiment, characteristics of the above method include: a time of starting the first timer is related to a time of transmitting the third message.

In one embodiment, characteristics of the above method include: a time of starting the first timer is related to a time of transmitting a first signal.

According to one aspect of the present application, characterized in comprising:
  transmitting a first signal; and as a response to the action of transmitting a first signal, receiving a second signal;

herein, the first signal is used for a random access procedure; the first signal is used to determine that a packet is to be transmitted via the first data radio bearer.

In one embodiment, characteristics of the above method include: the first signal and the second signal are used for a random access procedure.

In one embodiment, characteristics of the above method include: the first signal is used for starting a RA-based small data transmission.

In one embodiment, characteristics of the above method include: the first signal is related to a small data transmission based on Configured Grant (CG) resources, where the first signal is used to determine a TA.

According to one aspect of the present application, characterized in that the first condition set comprises determining that a packet is to be transmitted via the first data radio bearer.

In one embodiment, characteristics of the above method include: determining that a packet is to be transmitted via the first data radio bearer is used to determine to maintain the first configuration set and enter into the first state.

In one embodiment, characteristics of the above method include: whether to maintain the first configuration set and enter into the first state is related to determining that a packet is to be transmitted via the first data radio bearer.

The present application provides a method in a second node for wireless communications, comprising:

transmitting a first message, the first message being a Radio Resource Control (RRC) signaling, where a name of the first message includes RRC and Release;

herein, as a response to a first condition set being satisfied, a first configuration set is maintained and a first state is entered, the first configuration set comprising a first data radio bearer, the first data radio bearer being a data radio bearer of a first cell group; the first condition set comprises the action of receiving the first message, where the first state is an RRC state other than an RRC Connected state.

According to one aspect of the present application, characterized in comprising:

receiving a second message, the second message being used to trigger the first message.

According to one aspect of the present application, characterized in comprising:

receiving a third message; and upon reception of the third message, transmitting a fourth message;

herein, the third message is related to the first data radio bearer; the third message is used to trigger the fourth message.

According to one aspect of the present application, characterized in comprising:

transmitting a first signaling;

herein, the first signaling indicates a first expiration value of a first timer, the first timer being related to the first data radio bearer; the first condition set comprises the first timer being running.

According to one aspect of the present application, characterized in that a time of starting the first timer is no later than the action of transmitting the third message; a condition of stopping the first timer includes receiving the fourth message.

According to one aspect of the present application, characterized in comprising:

receiving a first signal; and as a response to the action of transmitting a first signal, transmitting a second signal;

herein, the first signal is used for a random access procedure; the first signal is used to determine that a packet is to be transmitted via the first data radio bearer.

According to one aspect of the present application, characterized in that the first condition set comprises determining that a packet is to be transmitted via the first data radio bearer.

The present application provides a first node for wireless communications, comprising:

a first receiver, receiving a first message, the first message being a Radio Resource Control (RRC) signaling, where a name of the first message includes RRC and Release; as a response to a first condition set being satisfied, maintaining a first configuration set and entering into a first state, the first configuration set comprising a first data radio bearer, the first data radio bearer being a data radio bearer of a first cell group;

herein, the first condition set comprises the action of receiving the first message, where the first state is an RRC state other than an RRC Connected state.

The present application provides a second node for wireless communications, comprising:

a second transmitter, transmitting a first message, the first message being a Radio Resource Control (RRC) signaling, where a name of the first message includes RRC and Release;

herein, as a response to a first condition set being satisfied, a first configuration set is maintained and a first state is entered, the first configuration set comprising a first data radio bearer, the first data radio bearer being a data radio bearer of a first cell group; the first condition set comprises the action of receiving the first message, where the first state is an RRC state other than an RRC Connected state.

In one embodiment, compared with the prior art, the present application is advantageous in the following aspects:

when a first condition set is satisfied, maintaining the first configuration set and entering into the first state, thus ensuring small data transmission;

the first condition set comprising a timer;

the first condition set comprising determining that a packet is to be transmitted via the first data radio bearer.

BRIEF DESCRIPTION OF THE DRAWINGS

Other features, objects and advantages of the present application will become more apparent from the detailed description of non-restrictive embodiments taken in conjunction with the following drawings:

FIG. 9A illustrates a schematic diagram of a relation between a first timer and a second timer according to one embodiment of the present application.

FIG. 9B illustrates a schematic diagram of a first condition set being used to determine whether to maintain a first configuration set and enter into a first state according to one embodiment of the present application.

FIG. 10A illustrates a schematic diagram of transmitting a second message at a second time according to one embodiment of the present application.

FIG. 10B illustrates a schematic diagram of a first timer according to one embodiment of the present application.

FIG. 11A illustrates a schematic diagram of determining whether to transmit a second message at a first time according to a state of a second timer according to one embodiment of the present application.

FIG. 11B illustrates a schematic diagram of a first timer according to another embodiment of the present application.

FIG. 12A illustrates a schematic diagram illustrating that a third message is one of Q1 third-type message(s) and a fourth message is one of Q2 fourth-type message(s) according to one embodiment of the present application.

FIG. 12B illustrates a structure block diagram of a processing device used in a first node according to one embodiment of the present application.

DESCRIPTION OF THE EMBODIMENTS

The technical scheme of the present application is described below in further details in conjunction with the drawings. It should be noted that the embodiments of the present application and the characteristics of the embodiments may be arbitrarily combined if no conflict is caused.

Embodiment 1A

Figure 1A:
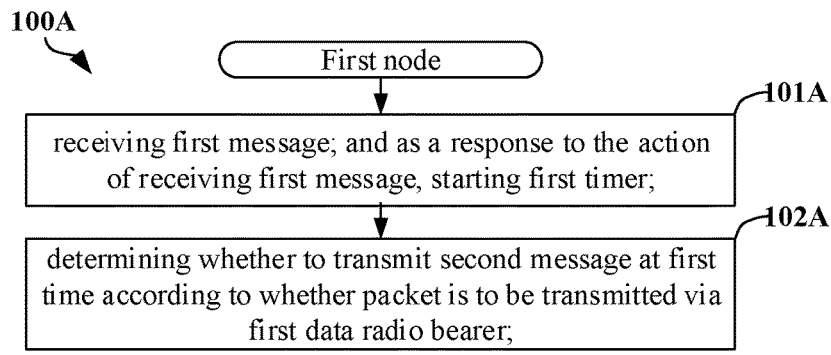
FIG. 1A illustrates a flowchart of transmission of a first message and a second message according to one embodiment of the present application.

Embodiment 1A illustrates a flowchart of transmission of a first message and a second message according to one embodiment of the present application, as shown in FIG. 1A. In FIG. 1A, each step represents a step, it should be particularly noted that the sequence order of each box herein does not imply a chronological order of steps marked respectively by these boxes.

In Embodiment 1A, the first node in the present application receives a first message in step 101A; and as a response to the action of receiving a first message, starts a first timer; and in step 102A, determines whether to transmit a second message at a first time according to whether a packet is to be transmitted via a first data radio bearer; herein, the first message is a Radio Resource Control (RRC) signaling, where a name of the first message includes RRC and Release, the first message indicating a first expiration value of the first timer; a time interval from the first time to the starting action of the first timer is no smaller than the first expiration value of the first timer; the second message is used to determine an update of a first area; the first data radio bearer is a data radio bearer of a first cell group.

In one embodiment, the first message is received in a first state or a second state, where the second state is an RRC Connected state, and the first state is an RRC state other than the RRC Connected state.

In one embodiment, the first state includes an RRC state.

In one embodiment, the first state is not an RRC_CONNECTED state.

In one embodiment, the first state includes an RRC-INACTIVE state.

In one embodiment, the first state includes an RRC-INACTIVE state.

In one embodiment, the first state includes an RRC_IDLE state.

In one embodiment, the first state includes an RRC-INACTIVE state.

In one embodiment, the first state includes an RRC_IDLE state.

In one embodiment, each SRB in the first state other than SRB0 is suspended.

In one embodiment, in the first state the first node maintains an RNA.

In one embodiment, in the first state the first node keeps CM-CONNECTED.

In one embodiment, the second state includes an RRC state.

In one embodiment, the second state includes RRC_CONNECTED state.

In one embodiment, the second state is RRC_CONNECTED state.

In one embodiment, as a response to the action of receiving a first message, entering into the first state.

In one subembodiment, the action of entering into a first state comprises: being camped in the first state.

In one subembodiment, the action of entering into a first state comprises: being kept in the first state.

In one subembodiment, the action of entering into a first state comprises: being shifted to the first state.

In one subembodiment, the action of entering into a first state comprises: maintaining the first state.

In one embodiment, the first message is transmitted via an air interface.

In one embodiment, the first message is transmitted via an antenna port.

In one embodiment, the first message comprises a Downlink (DL) message.

In one embodiment, the first message comprises a Sidelink (SL) message.

In one embodiment, the phrase that the first message is a Radio Resource Control (RRC) signaling comprises that: the first message comprises an RRC Message.

In one embodiment, the phrase that the first message is a Radio Resource Control (RRC) signaling comprises that: the first message comprises an IE in an RRC Message.

In one embodiment, the phrase that the first message is a Radio Resource Control (RRC) signaling comprises that: the first message is generated by an RRC layer.

In one embodiment, the phrase that the first message is a Radio Resource Control (RRC) signaling comprises that: the first message is a higher layer signaling.

In one embodiment, the phrase that the first message is a Radio Resource Control (RRC) signaling comprises that: the first message is transmitted through an RRC-layer message.

In one embodiment, the phrase that the first message is a Radio Resource Control (RRC) signaling comprises that: the first message comprises all or part of an RRC signaling.

In one embodiment, the phrase that the first message is a Radio Resource Control (RRC) signaling comprises that: the first message comprises one or more Information Elements (IEs) in an RRC message.

In one subembodiment, a name of the IE includes SuspendConfig.

In one subembodiment, a name of the IE includes at least one of small, or data, or inactive, or transmission, or sdt or idt.

In one embodiment, the phrase that the first message is a Radio Resource Control (RRC) signaling comprises that: the first message comprises one or more fields in an RRC message.

In one subembodiment, a name of the field includes fullI-RNTI.

In one subembodiment, a name of the field includes at least one of shortI-RNTIs.

In one subembodiment, a name of the field includes ran-PagingCycle.

In one subembodiment, a name of the field includes ran-NotificationAreaInfo.

In one subembodiment, a name of the field includes t380.

In one subembodiment, a name of the field includes nextHopChainingCount.

In one subembodiment, a name of the field includes C-RNTI.

In one subembodiment, a name of the field includes drb-ContinueROHC.

In one subembodiment, a name of the field includes measInactiveConfig.

In one subembodiment, a name of the field includes measIdleConfig.

In one subembodiment, a name of the field includes rrc-InactiveConfig.

In one subembodiment, a name of the field includes cg-Config.

In one subembodiment, a name of the field includes pur-Config.

In one subembodiment, the field indicates the first expiration value of the first timer.

In one subembodiment, the field indicates configurations of the first data radio bearer.

In one subembodiment, the field indicates RObust Header Compression (ROHC) of the first data radio bearer.

In one embodiment, the phrase that a name of the first message includes RRC and Release comprises that: the name of the first message includes both RRC and Release.

In one embodiment, the phrase that a name of the first message includes RRC and Release comprises that: the name of the first message includes at least RRC and Release.

In one embodiment, the phrase that a name of the first message includes RRC and Release comprises that: the name of the first message consists of RRC and Release.

In one embodiment, the phrase that a name of the first message includes RRC and Release comprises that: the first message comprises an RRCRelease message.

In one embodiment, the phrase that a name of the first message includes RRC and Release comprises that: the first message comprises an RRCConnectionRelease message.

In one embodiment, the first message comprises an UpLink (UL) Grant.

In one embodiment, the first message comprises a Physical Downlink Control Channel (PDCCH).

In one embodiment, the first message comprises Downlink Control Information (DCI).

In one embodiment, the first message is used to indicate a first resource block, the first resource block being used for transmitting a packet via the first data radio bearer.

In one embodiment, the phrase of the first message indicating a first expiration value of the first timer comprises that: the first message explicitly indicates the first expiration value of the first timer.

In one embodiment, the phrase of the first message indicating a first expiration value of the first timer comprises that: the first message implicitly indicates the first expiration value of the first timer.

In one embodiment, the phrase of the first message indicating a first expiration value of the first timer comprises that: the first message is used for configuring the first expiration value of the first timer.

In one embodiment, the phrase of the first message indicating a first expiration value of the first timer comprises that: the first message carries the first expiration value of the first timer.

In one embodiment, the phrase of the first message indicating a first expiration value of the first timer comprises that: the first expiration value of the first timer is configured by a field in the first message.

In one embodiment, the phrase of the first message indicating a first expiration value of the first timer comprises that: the first message comprises an RRC message, a field in the RRC message indicating the first expiration value of the first timer.

In one embodiment, the phrase of the first message indicating a first expiration value of the first timer comprises that: the first message comprises a RRCRelease message, and the RRCRelease message comprises a SuspendConfig IE, the SuspendConfig IE comprising a field, where a name of the field includes t380, the t380 indicating the first expiration value of the first timer.

In one embodiment, the phrase of the first message indicating a first expiration value of the first timer comprises that: the first message comprises a RRCConnectionRelease message, and the RRCConnectionRelease message comprises a SuspendConfig IE, the SuspendConfig IE comprising a field, where a name of the field includes t380, the t380 indicating the first expiration value of the first timer.

In one embodiment, the first timer includes T380.

In one embodiment, the first timer includes an RRC-layer timer.

In one embodiment, the first expiration value of the first timer is set to a PeriodicRNAU-TimerValue.

In one embodiment, the first expiration value of the first timer comprises a positive integer number of millisecond(s) (ms).

In one embodiment, the first expiration value of the first timer comprises a positive integer number of minute(s).

In one embodiment, the first expiration value of the first timer comprises a positive integer number of second(s) (s).

In one embodiment, the first expiration value of the first timer comprises a positive integer number of hour(s).

In one embodiment, the first expiration value of the first timer comprises a positive integer number of slot(s).

In one embodiment, the first expiration value is configurable.

In one embodiment, the first expiration value is pre-configured.

In one embodiment, the first expiration value is of a fixed size.

In one embodiment, the slot comprises at least one of slot(s), or subframe(s), or Radio Frame(s), or multiple Orthogonal Frequency Division Multiplexing (OFDM) symbols, or multiple Single Carrier Frequency Division Multiple Access (SC-FDMA) symbols.

In one embodiment, the sentence that "as a response to the action of receiving a first message, starting a first timer" comprises that: receiving the first message is used to trigger starting of the first timer.

In one embodiment, the sentence that "as a response to the action of receiving a first message, starting a first timer" comprises that: upon reception of the first message, the first timer is started.

In one embodiment, the sentence that "as a response to the action of receiving a first message, starting a first timer" comprises that: a time of starting the first timer is related to receiving the first message.

In one embodiment, the sentence that "as a response to the action of receiving a first message, starting a first timer" comprises that: after a certain time interval following the reception of the first message, the first timer is started.

In one subembodiment, the certain time interval is used for system processing time.

In one subembodiment, the certain time interval is used for processing other higher-priority procedures.

In one subembodiment, the certain time interval is smaller than a Round-Trip Time (RTT).

In one embodiment, the action of starting a first timer comprises that: the first timer gets started.

In one embodiment, the action of starting a first timer comprises that: the first timer begins to count time.

In one embodiment, the action of starting a first timer comprises that: the first timer starts running.

In one embodiment, the action of starting a first timer comprises that: the first timer begins to count from 0.

In one embodiment, the first time comprises one slot.

In one embodiment, the first time refers to a time of determining to transmit the second message.

In one embodiment, the first time is not a fixed time.

In one embodiment, the first time is a time at which the second message is transmitted.

In one embodiment, the first time includes a certain time after the first timer is stopped.

In one embodiment, the first time includes a certain time after the first timer is expired.

In one embodiment, the first time includes a time at which the second message is configured after the first timer is expired.

In one embodiment, the first time includes a time at which the second message is configured completely after the first timer is expired.

In one embodiment, the first time comprises a contiguous time interval.

In one embodiment, the first time is later than a start of a time window, and earlier than a time when the time window expires.

In one subembodiment, the time window comprises a ra-ResponseWindow.

In one subembodiment, the time window comprises an msgB-ResponseWindow.

In one subembodiment, the time window is unrelated to the first timer.

In one subembodiment, the time window is related to transmitting a packet via a first data radio bearer.

In one embodiment, the first time is later than a start time of a timer, and earlier than a time when the timer expires.

In one subembodiment, the timer includes a ra-ContentionResolutionTimer.

In one subembodiment, the timer includes the second timer in the present application.

In one subembodiment, the timer is unrelated to the first timer.

In one subembodiment, the timer is related to transmitting a packet via a first data radio bearer.

In one embodiment, the phrase of determining whether to transmit a second message at a first time according to whether a packet is to be transmitted via a first data radio bearer comprises: determining whether to perform an RNA update at a first time according to whether a packet is to be transmitted via a first data radio bearer.

In one embodiment, the phrase of determining whether to transmit a second message at a first time according to whether a packet is to be transmitted via a first data radio bearer comprises: determining whether to configure the second message at a first time according to whether a packet is to be transmitted via a first data radio bearer.

In one embodiment, the phrase of determining whether to transmit a second message at a first time according to whether a packet is to be transmitted via a first data radio bearer comprises: determining whether to deliver the second message to lower layers at a first time according to whether a packet is to be transmitted via a first data radio bearer.

In one embodiment, the phrase of determining whether to transmit a second message at a first time according to whether a packet is to be transmitted via a first data radio bearer comprises: determining whether to start an RRC connection resume procedure at a first time while configuring a resumeCause as a ma-Update according to whether a packet is to be transmitted via a first data radio bearer.

In one embodiment, the phrase of determining whether to transmit a second message at a first time according to whether a packet is to be transmitted via a first data radio bearer comprises: whether to transmit a second message at a first time being related to whether a packet is to be transmitted via a first data radio bearer.

In one embodiment, the phrase of determining whether to transmit a second message at a first time according to whether a packet is to be transmitted via a first data radio bearer comprises: transmitting a packet via the first data radio bearer being used to determine to drop transmitting the second message at the first time.

In one subembodiment, to drop transmitting means not to transmit.

In one subembodiment, to drop transmitting means not to trigger.

In one subembodiment, to drop transmitting means not to perform transmission.

In one subembodiment, to drop transmitting means no occurrence of the action of transmitting.

In one embodiment, the phrase of determining whether to transmit a second message at a first time according to whether a packet is to be transmitted via a first data radio bearer comprises: not transmitting a packet via a first data radio bearer being used to determine that a second message is transmitted at a first time.

In one embodiment, at a first time, if a packet is to be transmitted via the first data radio bearer, drop transmitting the second message.

In one embodiment, at a first time, if a packet is not to be transmitted via the first data radio bearer, transmit the second message.

In one embodiment, the action of determining whether to transmit a second message at a first time according to whether a packet is to be transmitted via a first data radio bearer comprises: whether a packet is to be transmitted via a first data radio bearer being one of multiple conditions of determining whether to transmit the second message at the first time.

In one subembodiment, at a first time, if no packet is to be transmitted via the first data radio bearer, no matter whether other conditions among the multiple conditions are satisfied, drop transmitting the second message.

In one subembodiment, at a first time, if no packet is to be transmitted via the first data radio bearer, and other conditions among the multiple conditions are satisfied, transmit the second message.

In one embodiment, the phrase that a packet is to be transmitted via a first data radio bearer comprises: the first data radio bearer carrying a packet.

In one embodiment, the phrase that a packet is to be transmitted via a first data radio bearer comprises: performing SDT.

In one embodiment, the phrase that a packet is to be transmitted via a first data radio bearer comprises: performing Inactive Data Transmission (IDT).

In one embodiment, the phrase that a packet is to be transmitted via a first data radio bearer comprises: performing Early Data Transmission (EDT).

In one embodiment, the phrase that a time interval from the first time to the starting action of the first timer is no smaller than the first expiration value of the first timer comprises that: a time interval from the first time to the starting action of the first timer is equal to the first expiration value of the first timer.

In one embodiment, the phrase that a time interval from the first time to the starting action of the first timer is no smaller than the first expiration value of the first timer comprises that: a time interval from the first time to the starting action of the first timer is larger than the first expiration value of the first timer.

In one embodiment, there does not exist any message that indicates RNA being transmitted within a time interval from the first time to the starting action of the first timer.

In one embodiment, a time interval from the first time to the starting action of the first timer comprises a time length of one or more of the first expiration values.

In one embodiment, the first timer is expired within a time interval from the first time to the starting action of the first timer, but the expiration does not trigger an RNA update.

In one embodiment, the first timer is stopped and restarted within a time interval from the first time to the starting action of the first timer.

In one embodiment, the phrase that the second message is used to determine an update of a first area comprises that: the second message is used to trigger an update of the first area.

In one embodiment, the phrase that the second message is used to determine an update of a first area comprises that: the second message is used for performing an update procedure of the first area.

In one embodiment, the phrase that the second message is used to determine an update of a first area comprises that: the second message is used for starting an update procedure of the first area.

In one embodiment, the phrase that the second message is used to determine an update of a first area comprises that: the second message is used for RNA update.

In one embodiment, the phrase that the second message is used to determine an update of a first area comprises that: the second message comprises a given indication, the given indication being used to determine an update of the first area.

In one subembodiment, the given indication comprises a field in an RRC message.

In one subembodiment, the given indication comprises an IE in an RRC message.

In one subembodiment, a name of the given indication includes resumeCause.

In one subembodiment, a value of the given indication is configured as ma-Update.

In one embodiment, the first area comprises a RAN based Notification Area (RNA).

In one embodiment, the first area comprises one or multiple cells.

In one embodiment, the first area consists of one or multiple cell lists.

In one embodiment, the first area consists of at least one Radio Access Network (RAN) Area ID being provided. The RAN Area is either a subset of a Core Network Tracking Area (TA) or identical to the Core Network TA.

In one embodiment, the first area consists of one or more RAN Area IDs broadcasted by a cell in the system information.

In one embodiment, the first area belongs to a Core Network (CN) Registration Area.

In one embodiment, the second message is transmitted via an air interface.

In one embodiment, the second message is transmitted via an antenna port.

In one embodiment, when the second message is transmitted, the first node is in the first state.

In one embodiment, the second message is transmitted via an upper layer signaling.

In one embodiment, the second message is transmitted via a higher layer signaling.

In one embodiment, the second message comprises an Uplink (UL) signal.

In one embodiment, the second message comprises a Sidelink (SL) signal.

In one embodiment, the second message comprises all or part of an upper layer signaling.

In one embodiment, the second message comprises all or part of a higher layer signaling.

In one embodiment, the second message comprises an RRC message.

In one embodiment, the second message comprises an RRCResumeRequest message or an RRCResumeRequest1 message or an RRCConnectionResumeRequest message.

In one embodiment, the second message comprises an RRCEarlyDataRequest message.

In one embodiment, the second message comprises an RRCSmallDataRequest message.

In one embodiment, the second message comprises an RRCInactiveDataRequest message.

In one embodiment, a name of the second message includes at least one of RRC, or Resume, or Request, or Connection.

In one embodiment, a Signaling Radio Bearer (SRB) for the second message includes SRB0.

In one embodiment, the second message comprises a Common Control Channel (CCCH) message.

In one embodiment, the second message comprises all or partial Information Elements (IEs) in an RRC message.

In one embodiment, the second message comprises all or partial fields in an IE in an RRC message.

In one embodiment, the second message comprises one field in an RRC message, where a name of the field includes resumeIdentity.

In one embodiment, the second message comprises one field in an RRC message, where a name of the field includes resumeMAC-I.

In one embodiment, the second message comprises one field in an RRC message, where a name of the field includes resumeCause.

In one embodiment, the second message comprises one field in an RRC message, where a name of the field includes Spare.

In one embodiment, the second message is transmitted in a random access procedure.

In one embodiment, the random access procedure comprises a 2-stepRA.

In one subsidiary embodiment of the above subembodiment, the second message is transmitted through a Message A (MsgA).

In one subsidiary embodiment of the above subembodiment, the second message is transmitted through a PUSCH.

In one embodiment, the random access procedure comprises a 4-stepRA.

In one subsidiary embodiment of the above subembodiment, the second message is transmitted through a Message 3 (Msg3).

In one subsidiary embodiment of the above subembodiment, the second message is transmitted through a UL Grant scheduled by a Message 2 (Msg2).

In one subembodiment, the random access procedure comprises a Contention Based Random Access (CBRA).

In one subembodiment, the random access procedure comprises Contention Free Random Access (CFRA).

In one embodiment, the second message is transmitted through Configured Grant (CG) resources.

In one embodiment, the phrase that the first data radio bearer is a data radio bearer of a first cell group comprises that: the first data radio bearer is associated with the first cell group.

In one embodiment, the phrase that the first data radio bearer is a data radio bearer of a first cell group comprises that: the first data radio bearer is associated with a cell in the first cell group.

In one embodiment, the phrase that the first data radio bearer is a data radio bearer of a first cell group comprises that: the first data radio bearer is associated with multiple cells in the first cell group.

In one embodiment, the phrase that the first data radio bearer is a data radio bearer of a first cell group comprises that: the first data radio bearer is associated with a SpCell in the first cell group.

In one subembodiment, the SpCell comprises a Primary SCG Cell (PSCell).

In one subembodiment, the SpCell comprises a Primary Cell (PCell).

In one embodiment, the first cell group comprises a Master Cell Group (MCG).

In one embodiment, the first cell group comprises a Secondary Cell Group (SCG).

In one embodiment, the first cell group comprises one or multiple cells.

In one embodiment, the first cell group comprises a Serving Cell group.

In one embodiment, the first data radio bearer includes a Data Radio Bearer (DRB).

In one embodiment, the first data radio bearer is used for transmitting a small data packet.

In one embodiment, the first data radio bearer is associated with a Packet Data Convergence Protocol (PDCP) Entity.

In one embodiment, a PDCP Entity associated with the first data radio bearer is configured by an RRC layer.

In one embodiment, the first data radio bearer comprises an Acknowledged Mode (AM) DRB, the AM DRB using a Radio Link Control (RLC) AM.

In one embodiment, the first data radio bearer comprises an Unacknowledged Mode (UM) DRB, the UM DRB using an RLC UM.

In one embodiment, the first data radio bearer is associated with a PDCP entity.

In one embodiment, the first data radio bearer is used for carrying User Plane (UP) Data.

In one embodiment, the phrase at a first time comprises: when having received a SIB message, and a serving cell does not belong to configured ran-NotificationAreaInfo.

In one embodiment, the phrase at a first time comprises: after having received a SIB message, and a serving cell does not belong to configured ran-NotificationAreaInfo.

In one embodiment, the phrase at a first time comprises: when the first timer is expired.

In one embodiment, the phrase at a first time comprises: when a time interval since the first timer is started is equal to the first expiration value.

In one embodiment, the phrase at a first time comprises: when a time interval since the first timer is started is larger than the first expiration value.

In one embodiment, within a time interval from the first time to the starting action of the first timer, the first timer is restarted.

In one embodiment, within a time interval from the first time to the starting action of the first timer, the first timer is not restarted.

In one embodiment, within a time interval from the first time to the starting action of the first timer, the first timer is stopped.

In one embodiment, within a time interval from the first time to the starting action of the first timer, the first timer keeps running.

In one embodiment, within a time interval from the first time to the starting action of the first timer, the first timer is stopped, and restarted.

In one embodiment, within a time interval from the first time to the starting action of the first timer, the first timer is expired, and restarted.

In one embodiment, at the first time, the first timer is expired.

In one embodiment, at the first time, the first timer is not expired.

In one embodiment, at the first time, a value of the first timer is no smaller than the first expiration value.

In one embodiment, at the first time, a value of the first timer is smaller than the first expiration value.

In one embodiment, the phrase that in response to an action comprises: when the action takes place.

In one embodiment, the phrase that in response to an action comprises: as a next step following the action.

In one embodiment, the phrase that in response to an action comprises: if the action occurs.

In one embodiment, the phrase that in response to an action comprises: subsequent actions being triggered by the action.

Embodiment 1B

Figure 1B:
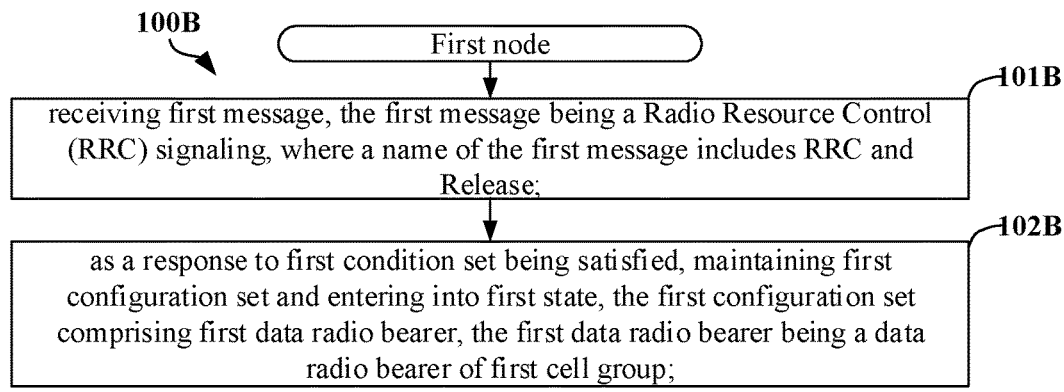
FIG. 1B illustrates a flowchart of transmission of a first message according to one embodiment of the present application.

Embodiment 1B illustrates a flowchart of transmission of a first message according to one embodiment of the present application, as shown in FIG. 1B. In FIG. 1B, each step represents a step, it should be particularly noted that the sequence order of each box herein does not imply a chronological order of steps marked respectively by these boxes.

In Embodiment 1B, the first node in the present application receives a first message in step 101B, the first message being a Radio Resource Control (RRC) signaling, where a name of the first message includes RRC and Release; and in step 102B, as a response to a first condition set being satisfied, maintains a first configuration set and enters into a first state, the first configuration set comprising a first data radio bearer, the first data radio bearer being a data radio bearer of a first cell group; herein, the first condition set comprises the action of receiving the first message, where the first state is an RRC state other than an RRC Connected state.

In one embodiment, the first message is transmitted via an air interface.

In one embodiment, the first message is transmitted via an antenna port.

In one embodiment, the first message comprises a DownLink (DL) message.

In one embodiment, the first message comprises a Sidelink (SL) message.

In one embodiment, the phrase that the first message is a Radio Resource Control (RRC) signaling comprises that: the first message comprises an RRC Message.

In one embodiment, the phrase that the first message is a Radio Resource Control (RRC) signaling comprises that: the first message comprises an IE in an RRC Message.

In one embodiment, the phrase that the first message is a Radio Resource Control (RRC) signaling comprises that: the first message is generated by an RRC layer.

In one embodiment, the phrase that the first message is a Radio Resource Control (RRC) signaling comprises that: the first message is a higher layer signaling.

In one embodiment, the phrase that the first message is a Radio Resource Control (RRC) signaling comprises that: the first message is transmitted through an RRC-layer message.

In one embodiment, the phrase that the first message is a Radio Resource Control (RRC) signaling comprises that: the first message comprises all or part of an RRC signaling.

In one embodiment, the phrase that the first message is a Radio Resource Control (RRC) signaling comprises that: the first message comprises one or more Information Elements (IEs) in an RRC message.

In one subembodiment, a name of the IE includes SuspendConfig.

In one subembodiment, a name of the IE includes at least one of small, or data, or inactive, or transmission, or sdt or idt.

In one embodiment, the phrase that the first message is a Radio Resource Control (RRC) signaling comprises that: the first message comprises one or more fields in an RRC message.

In one subembodiment, a name of the field includes fullI-RNTI.

In one subembodiment, a name of the field includes at least one of shortI-RNTIs.

In one subembodiment, a name of the field includes ran-PagingCycle.

In one subembodiment, a name of the field includes ran-NotificationAreaInfo.

In one subembodiment, a name of the field includes t380.

In one subembodiment, a name of the field includes nextHopChainingCount.

In one subembodiment, a name of the field includes C-RNTI.

In one subembodiment, a name of the field includes drb-ContinueROHC.

In one subembodiment, a name of the field includes measInactiveConfig.

In one subembodiment, a name of the field includes measIdleConfig.

In one subembodiment, a name of the field includes rrc-InactiveConfig.

In one subembodiment, a name of the field includes cg-Config.

In one subembodiment, a name of the field includes pur-Config.

In one subembodiment, the field indicates the first expiration value of the first timer.

In one subembodiment, the field indicates configurations of the first data radio bearer.

In one subembodiment, the field indicates RObust Header Compression (ROHC) of the first data radio bearer.

In one embodiment, the phrase that a name of the first message includes RRC and Release comprises that: the name of the first message includes both RRC and Release.

In one embodiment, the phrase that a name of the first message includes RRC and Release comprises that: the name of the first message includes at least RRC and Release.

In one embodiment, the phrase that a name of the first message includes RRC and Release comprises that: the name of the first message consists of RRC and Release.

In one embodiment, the phrase that a name of the first message includes RRC and Release comprises that: the first message comprises an RRCRelease message.

In one embodiment, the phrase that a name of the first message includes RRC and Release comprises that: the first message comprises an RRCConnectionRelease message.

In one embodiment, the first message comprises an UpLink (UL) Grant.

In one embodiment, the first message comprises a Physical Downlink Control Channel (PDCCH).

In one embodiment, the first message comprises Downlink Control Information (DCI).

In one embodiment, the first message is used to indicate a first resource block, the first resource block being used for transmitting a packet via the first data radio bearer.

In one embodiment, the first condition set comprises receiving the first message.

In one subembodiment, the phrase of receiving the first message comprises: having received the first message.

In one subembodiment, the phrase of receiving the first message comprises: having received the first message, and the first message comprising a suspendConfig IE.

In one subembodiment, the phrase of receiving the first message comprises: having received the first message, and the first message comprising the first information.

In one embodiment, the phrase that as a response to a first condition set being satisfied comprises: when the first condition set is satisfied.

In one embodiment, the phrase that as a response to a first condition set being satisfied comprises: as a next step after the first condition set is satisfied.

In one embodiment, the phrase that as a response to a first condition set being satisfied comprises: a behavior after the first condition set is satisfied.

In one embodiment, the phrase that as a response to a first condition set being satisfied comprises: if the first condition set is satisfied.

In one embodiment, the first condition set comprises one or multiple conditions.

In one embodiment, a condition in the first condition set comprises the action of receiving the first message.

In one embodiment, the first condition set comprises M1 first-type condition(s), M1 being a positive integer and M1 being no greater than 512; a said first-type condition of the M1 first-type condition(s) comprises the action of receiving the first message.

In one subembodiment, each condition of the M1 first-type condition(s) being satisfied is used to determine that the first condition set is satisfied.

In one subembodiment, at least one condition of the M1 first-type condition(s) being satisfied is used to determine that the first condition set is satisfied.

In one subembodiment, at least one condition of the M1 first-type condition(s) not being satisfied is used to determine that the first condition set is unsatisfied.

In one subembodiment, a said first-type condition of the M1 first-type condition(s) comprises that the first message comprises first information.

In one subsidiary embodiment of the above subembodiment, the first information is related to transmitting a packet via a first data radio bearer.

In one specific embodiment of the above subsidiary embodiment, the phrase that the first information is related to transmitting a packet via a first data radio bearer comprises that: the first information indicates that a packet is to be transmitted via the first data radio bearer.

In one specific embodiment of the above subsidiary embodiment, the phrase that the first information is related to transmitting a packet via a first data radio bearer comprises that: the first information explicitly indicates that a packet is to be transmitted via the first data radio bearer.

In one specific embodiment of the above subsidiary embodiment, the phrase that the first information is related to transmitting a packet via a first data radio bearer comprises that: the first information implicitly indicates that a packet is to be transmitted via the first data radio bearer.

In one specific embodiment of the above subsidiary embodiment, the phrase that the first information is related to transmitting a packet via a first data radio bearer comprises that: a name of the first information is used to determine that a packet is to be transmitted via a first data radio bearer.

In one specific embodiment of the above subsidiary embodiment, the phrase that the first information is related to transmitting a packet via a first data radio bearer comprises that: an IE or a field in the first information is used to determine that a packet is to be transmitted via a first data radio bearer.

In one subsidiary embodiment of the above subembodiment, the first information is related to a configuration indicating an RRC_INACTIVE state.

In one subsidiary embodiment of the above subembodiment, the first information is used for indicating that the first node enters into the first state.

In one subsidiary embodiment of the above subembodiment, a name of the first information includes at least one of suspend or Config.

In one subsidiary embodiment of the above subembodiment, a name of the first information includes at least one of small, or data, or SDT or IDT.

In one subsidiary embodiment of the above subembodiment, the first information comprises a suspendConfig IE.

In one subembodiment, a said first-type condition of the M1 first-type condition(s) comprises that a first timer in the present application is running.

In one subembodiment, a said first-type condition of the M1 first-type condition(s) comprises determining that a packet is to be transmitted via a first data radio bearer.

In one embodiment, the first condition set comprises the action of receiving the first message, and the first message comprising the first information.

In one subembodiment, the first information is related to transmitting a packet via a first data radio bearer.

In one embodiment, the first condition set comprises the action of receiving the first message, and the first message comprising the first information, and a first timer in the present application being running.

In one embodiment, the first condition set comprises the action of receiving the first message, and the first message comprising the first information, and determining that a packet is to be transmitted via a first data radio bearer.

In one embodiment, the phrase that the first condition set comprises the action of receiving the first message comprises: the action of receiving the first message being one condition comprised in the first condition set.

In one embodiment, the phrase that the first condition set comprises the action of receiving the first message comprises: upon reception of the first message, determining that the first condition set is satisfied.

In one embodiment, the phrase that the first condition set comprises the action of receiving the first message comprises: a condition in the first condition set being the action of receiving the first message.

In one embodiment, the action of maintaining a first configuration set comprises: keeping the first configuration set unchanged.

In one embodiment, the action of maintaining a first configuration set comprises: not modifying any configuration within the first configuration set.

In one embodiment, the action of maintaining a first configuration set comprises: not updating the first configuration set.

In one embodiment, the action of maintaining a first configuration set comprises: dropping updating the first configuration set.

In one embodiment, the action of maintaining a first configuration set comprises: not resetting a Medium Access Control (MAC) and not releasing a default MAC cell group configuration.

In one embodiment, the action of maintaining a first configuration set comprises: not re-establishing Radio Link Control (RLC) entities of a Signalling Radio Bearer 1 (SRB1).

In one embodiment, the action of maintaining a first configuration set comprises: not suspending any Signalling Radio Bearer (SRB) other than a Signalling Radio Bearer 0 (SRB0) or a Data Radio Bearer (DRB).

In one embodiment, the action of maintaining a first configuration set comprises: not indicating that a Packet Data Convergence Protocol (PDCP) layer is suspended at lower layers comprising all data radio bearers.

In one embodiment, the first configuration set comprises at least one configuration.

In one embodiment, a configuration in the first configuration set comprises a MAC entity.

In one embodiment, a configuration in the first configuration set comprises a MAC cell group configuration.

In one embodiment, a configuration in the first configuration set comprises an RLC entity of an SRB1.

In one embodiment, a configuration in the first configuration set comprises an SRB, the SRB including at least one of an SRB0, or an SRB1, or an SRB2, or an SRB3 or an SRB4.

In one embodiment, a configuration in the first configuration set comprises a data radio bearer.

In one embodiment, the action of entering into a first state comprises: being camped in the first state.

In one embodiment, the action of entering into a first state comprises: being kept in the first state.

In one embodiment, the action of entering into a first state comprises: being shifted to the first state.

In one embodiment, the action of entering into a first state comprises: maintaining the first state.

In one embodiment, the phrase of the first configuration set comprising a first data radio bearer comprises: the first configuration set referring to the first data radio bearer.

In one embodiment, the phrase of the first configuration set comprising a first data radio bearer comprises: the first configuration set comprising one or more of configurations, where the first data radio bearer is a configuration in the first configuration set.

In one embodiment, the phrase that the first data radio bearer is a data radio bearer of a first cell group comprises that: the first data radio bearer is associated with the first cell group.

In one embodiment, the phrase that the first data radio bearer is a data radio bearer of a first cell group comprises that: the first data radio bearer is associated with a cell in the first cell group.

In one embodiment, the phrase that the first data radio bearer is a data radio bearer of a first cell group comprises that: the first data radio bearer is associated with multiple cells in the first cell group.

In one embodiment, the phrase that the first data radio bearer is a data radio bearer of a first cell group comprises that: the first data radio bearer is associated with a SpCell in the first cell group.

In one subembodiment, the SpCell comprises a Primary SCG Cell (PSCell).

In one subembodiment, the SpCell comprises a Primary Cell (PCell).

In one embodiment, the first cell group comprises a Master Cell Group (MCG).

In one embodiment, the first cell group comprises a Secondary Cell Group (SCG).

In one embodiment, the first cell group comprises one or multiple cells.

In one embodiment, the first cell group comprises a Serving Cell group.

In one embodiment, the first data radio bearer comprises a DRB.

In one embodiment, the first data radio bearer is used for transmitting a small data packet.

In one embodiment, the first data radio bearer is associated with a PDCP Entity.

In one embodiment, a PDCP Entity associated with the first data radio bearer is configured by an RRC layer.

In one embodiment, the first data radio bearer comprises an Acknowledged Mode (AM) DRB, the AM DRB using an RLC AM.

In one embodiment, the first data radio bearer comprises an Unacknowledged Mode (UM) DRB, the UM DRB using an RLC UM.

In one subembodiment, the small data packet is no larger than a first threshold, the first threshold being configured through an RRC message.

In one subembodiment, the small data packet is transmitted in the first state.

In one subembodiment, the small data packet is generated in the first state.

In one embodiment, the first data radio bearer is associated with a PDCP entity.

In one embodiment, the first data radio bearer is used for carrying User Plane (UP) Data.

In one embodiment, the phrase that the first state is an RRC state other than an RRC Connected state comprises: the first state including an RRC state.

In one embodiment, the phrase that the first state is an RRC state other than an RRC Connected state comprises: the first state not being an RRC Connected state.

In one embodiment, the phrase that the first state is an RRC state other than an RRC Connected state comprises: the first state not being an RRC_CONNECTED state.

In one embodiment, the first state includes an RRC-INACTIVE state.

In one embodiment, the first state includes an RRC-INACTIVE state.

In one embodiment, the first state includes an RRC_IDLE state.

In one embodiment, the first state includes an RRC-INACTIVE state.

In one embodiment, the first state includes an RRC_IDLE state.

In one embodiment, each SRB in the first state other than SRB0 is suspended.

In one embodiment, in the first state the first node maintains an RNA.

In one embodiment, in the first state the first node keeps CM-CONNECTED.

Embodiment 2

Figure 2:
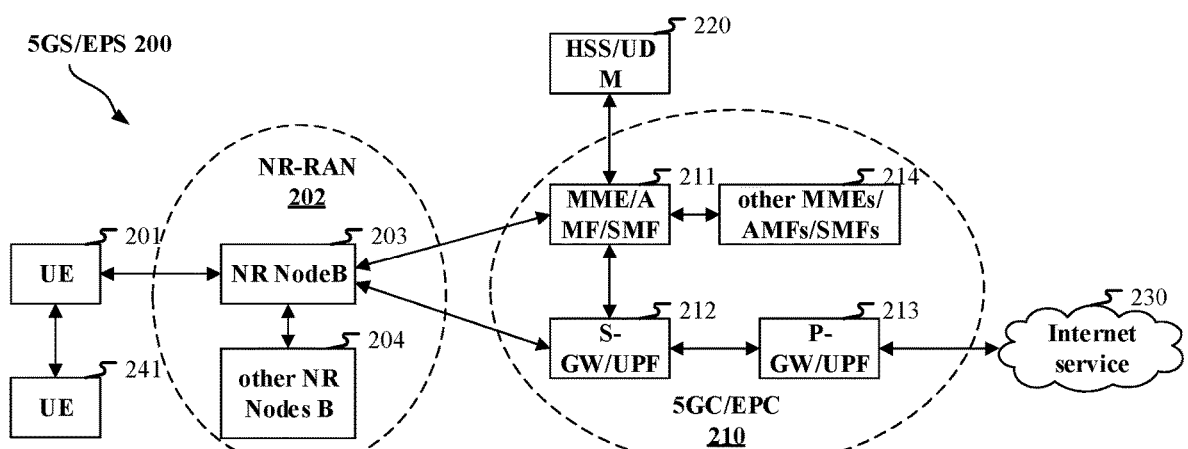
FIG. 2 illustrates a schematic diagram of a network architecture according to one embodiment of the present application.

Embodiment 2 illustrates a schematic diagram of a network architecture according to one embodiment of the present application, as shown in FIG. 2. FIG. 2 is a diagram illustrating a network architecture 200 of 5G New Radio (NR), Long-Term Evolution (LTE) and Long-Term Evolution Advanced (LTE-A) systems. The 5G NR or LIE network architecture 200 may be called 5G System/Evolved Packet System (5GS/EPS) 200 or other appropriate terms. The 5GS/EPS 200 may comprise one or more UEs 201, an NG-RAN 202, a 5G-Core Network/Evolved Packet Core (5GC/EPC) 210, a Home Subscriber Server/Unified Data Management (HSS/UDM) 220 and an Internet Service 230. The 5GS/EPS 200 may be interconnected with other access networks. For simple description, the entities/interfaces are not shown. As shown in FIG. 2, the 5GS/EPS 200 provides packet switching services. Those skilled in the art will find it easy to understand that various concepts presented throughout the present application can be extended to networks providing circuit switching services or other cellular networks. The NG-RAN 202 comprises an NR node B (gNB) 203 and other gNBs 204. The gNB 203 provides UE 201-oriented user plane and control plane terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB 203 provides an access point of the 5GC/EPC 210 for the UE 201. Examples of UE 201 include cellular phones, smart phones, Session Initiation Protocol (SIP) phones, laptop computers, Personal Digital Assistant (PDA), Satellite Radios, non-terrestrial base station communications, satellite mobile communications, Global Positioning Systems (GPSs), multimedia devices, video devices, digital audio players (for example, MP3 players), cameras, games consoles, unmanned aerial vehicles, air vehicles, narrowband physical network equipment, machine-type communication equipment, land vehicles, automobiles, wearable equipment, or any other devices having similar functions. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected with the 5G-CN/EPC 210 via an S1/NG interface. The 5G-CN/EPC 210 comprises a Mobility Management Entity (MME)/Authentication Management Field (AMF)/Session Management Function (SMF) 211, other MMES/AMFs/SMFs 214, a Service Gateway (S-GW)/User Plane Function (UPF) 212 and a Packet Date Network Gateway (P-GW)/UPF 213. The MME/AMF/SMF 211 is a control node for processing a signaling between the UE 201 and the 5GC/EPC 210. Generally, the MME/AMF/SMF 211 provides bearer and connection management. All user Internet Protocol (IP) packets are transmitted through the S-GW/UPF 212. The S-GW/UPF 212 is connected to the P-GW/UPF 213. The P-GW 213 provides UE IP address allocation and other functions. The P-GW/UPF 213 is connected to the Internet Service 230. The Internet Service 230 comprises IP services corresponding to operators, specifically including Internet, Intranet, IP Multimedia Subsystem (IMS) and Packet Switching Streaming (PSS) services.

In one embodiment, the UE 201 corresponds to the first node in the present application.

In one embodiment, the UE 201 is a UE.

In one embodiment, the gNB 203 corresponds to the second node in the present application.

In one embodiment, the gNB 203 is a BaseStation (BS).

In one embodiment, the gNB 203 is a UE.

In one embodiment, the gNB 203 is a relay.

In one embodiment, the gNB 203 is a Gateway.

In one embodiment, the UE supports transmissions in Non-Terrestrial Network (NTN).

In one embodiment, the UE supports transmissions in Terrestrial Network (TN).

In one embodiment, the UE supports transmissions in large-delay-difference networks.

In one embodiment, the UE supports Dual Connection (DC) transmissions.

In one embodiment, the UE comprises an aircraft.

In one embodiment, the UE comprises a vehicle-mounted terminal.

In one embodiment, the UE comprises a vessel.

In one embodiment, the UE comprises an Internet-of-Things (IoT) terminal.

In one embodiment, the UE comprises an Industrial IoT (IIoT) terminal.

In one embodiment, the UE comprises a piece of equipment supporting transmissions with low delay and high reliability.

In one embodiment, the UE comprises test equipment.

In one embodiment, the UE comprises a signaling test instrument.

In one embodiment, the base station supports transmissions in NTN.

In one embodiment, the base station supports transmissions in large-delay-difference networks.

In one embodiment, the base station supports transmissions in TN.

In one embodiment, the base station comprises a Macro-Cellular base station.

In one embodiment, the base station comprises a Micro Cell base station.

In one embodiment, the base station comprises a Pico Cell base station.

In one embodiment, the base station comprises a Femto-cell.

In one embodiment, the base station comprises abase station device supporting large time-delay difference.

In one embodiment, the base station comprises a flight platform.

In one embodiment, the base station comprises satellite equipment.

In one embodiment, the base station comprises a Transmitter Receiver Point (TRP).

In one embodiment, the base station comprises a Centralized Unit (CU).

In one embodiment, the base station comprises a Distributed Unit (DU).

In one embodiment, the base station comprises test equipment.

In one embodiment, the base station comprises a signaling test instrument.

In one embodiment, the base station comprises an Integrated Access and Backhaul-node (IAB-node).

In one embodiment, the base station comprises an IAB-donor.

In one embodiment, the base station comprises an IAB-donor-CU.

In one embodiment, the base station comprises an IAB-donor-DU.

In one embodiment, the base station comprises an IAB-DU.

In one embodiment, the base station comprises an IAB-MT.

In one embodiment, the relay comprises a relay.

In one embodiment, the relay comprises a L3 relay.
In one embodiment, the relay comprises a L2 relay.
In one embodiment, the relay comprises a Router.
In one embodiment, the relay comprises an Exchanger.
In one embodiment, the relay comprises a UE.
In one embodiment, the relay comprises a base station.

Embodiment 3

Figure 3:
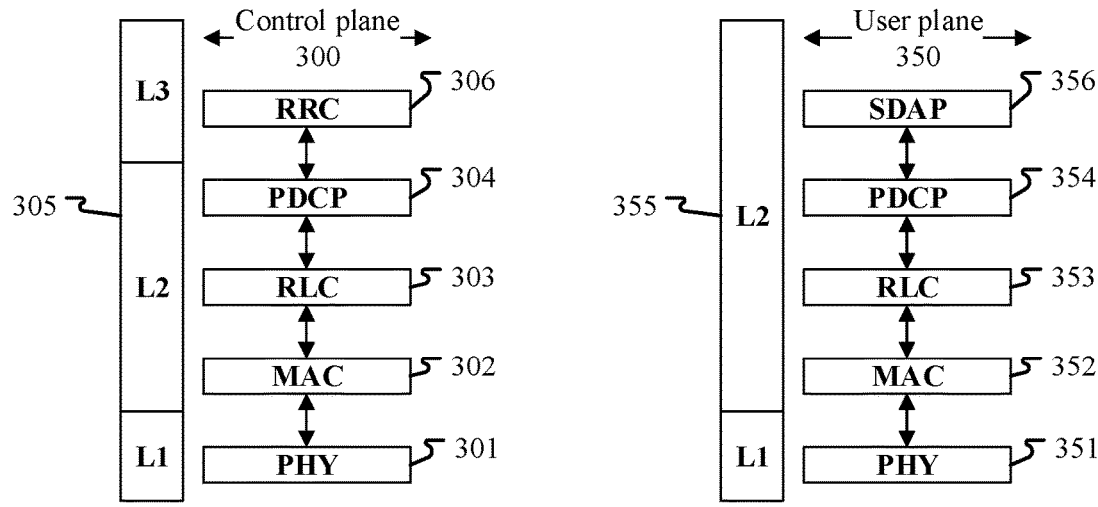
FIG. 3 illustrates a schematic diagram of a radio protocol architecture of a user plane and a control plane according to one embodiment of the present application.

Embodiment 3 illustrates a schematic diagram of a radio protocol architecture of a user plane and a control plane according to the present application, as shown in FIG. 3. FIG. 3 is a schematic diagram illustrating an embodiment of a radio protocol architecture of a user plane 350 and a control plane 300. In FIG. 3, the radio protocol architecture for a control plane 300 is represented by three layers, which are a layer 1, a layer 2 and a layer 3, respectively. The layer 1 (L1) is the lowest layer which performs signal processing functions of various PHY layers. The L1 is called PHY 301 in the present application. The layer 2 (L2) 305 is above the PHY 301, which comprises a Medium Access Control (MAC) sublayer 302, a Radio Link Control (RLC) sublayer 303 and a Packet Data Convergence Protocol (PDCP) sublayer 304. The PDCP sublayer 304 provides multiplexing among variable radio bearers and logical channels. The PDCP sublayer 304 provides security by encrypting a packet and provides support for inter-cell handover. The RLC sublayer 303 provides segmentation and reassembling of a higher-layer packet, retransmission of a lost packet, and reordering of a packet so as to compensate the disordered receiving caused by Hybrid Automatic Repeat reQuest (HARQ). The MAC sublayer 302 provides multiplexing between a logical channel and a transport channel. The MAC sublayer 302 is also responsible for allocating various radio resources (i.e., resource block) in a cell, as well as for HARQ operation. In the control plane 300, The RRC sublayer 306 in the L3 layer is responsible for acquiring radio resources (i.e., radio bearer) and configuring the lower layer using an RRC signaling. The radio protocol architecture in the user plane 350 comprises the L1 layer and the L2 layer. In the user plane 350, the radio protocol architecture used for a PHY layer 351, a PDCP sublayer 354 of the L2 layer 355, an RLC sublayer 353 of the L2 layer 355 and a MAC sublayer 352 of the L2 layer 355 is almost the same as the radio protocol architecture used for corresponding layers and sublayers in the control plane 300, but the PDCP sublayer 354 also provides header compression used for higher-layer packet to reduce radio transmission overhead. The L2 layer 355 in the user plane 350 also comprises a Service Data Adaptation Protocol (SDAP) sublayer 356, which is in charge of the mapping between QoS streams and a Data Radio Bearer (DRB), so as to support diversified traffics.

In one embodiment, the radio protocol architecture in FIG. 3 is applicable to the first node in the present application.

In one embodiment, the radio protocol architecture in FIG. 3 is applicable to the second node in the present application.

In one embodiment, the first message in the present application is generated by the RRC 306.

In one embodiment, the first message in the present application is generated by the MAC 302 or the MAC 352.

In one embodiment, the first message in the present application is generated by the PHY 301 or the PHY 351.

In one embodiment, the second message in the present application is generated by the RRC 306.

In one embodiment, the second message in the present application is generated by the MAC 302 or the MAC 352.

In one embodiment, the second message in the present application is generated by the PHY 301 or the PHY 351.

In one embodiment, the first signal in the present application is generated by the RRC 306.

In one embodiment, the first signal in the present application is generated by the MAC 302 or the MAC 352.

In one embodiment, the first signal in the present application is generated by the PHY 301 or the PHY 351.

In one embodiment, the second signal in the present application is generated by the RRC 306.

In one embodiment, the second signal in the present application is generated by the MAC 302 or the MAC 352.

In one embodiment, the second signal in the present application is generated by the PHY 301 or the PHY 351.

In one embodiment, the third message in the present application is generated by the RRC 306.

In one embodiment, the third message in the present application is generated by the MAC 302 or the MAC 352.

In one embodiment, the third message in the present application is generated by the PHY 301 or the PHY 351.

In one embodiment, the fourth message in the present application is generated by the RRC 306.

In one embodiment, the fourth message in the present application is generated by the MAC 302 or the MAC 352.

In one embodiment, the fourth message in the present application is generated by the PHY 301 or the PHY 351.

In one embodiment, the first signaling in the present application is generated by the RRC 306.

In one embodiment, the first signaling in the present application is generated by the MAC 302 or the MAC 352.

In one embodiment, the first signaling in the present application is generated by the PHY 301 or the PHY 351.

Embodiment 4

Figure 4:
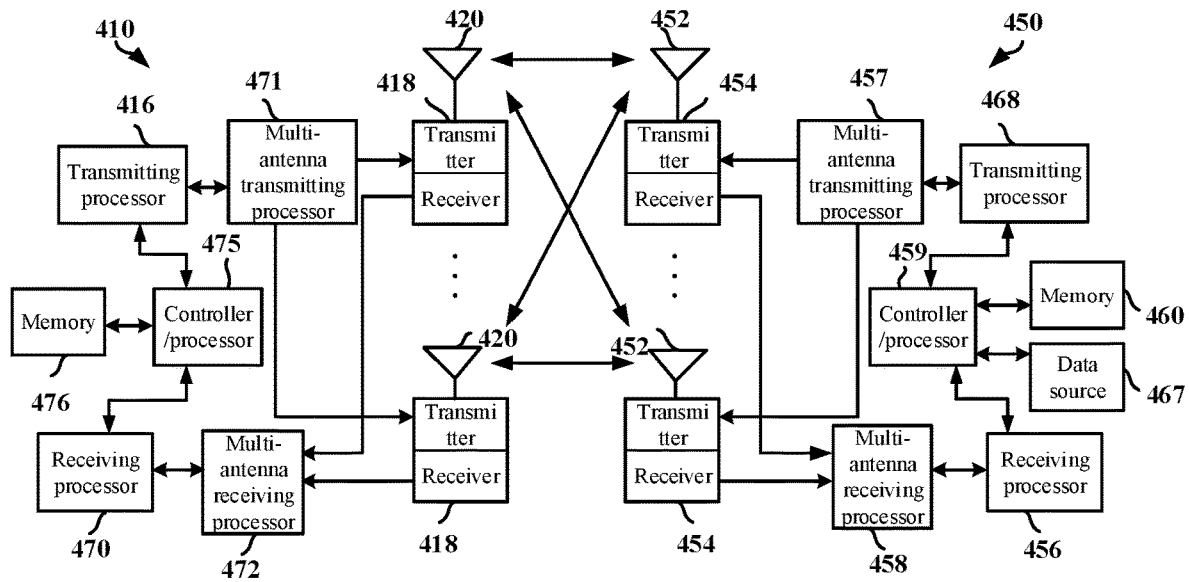
FIG. 4 illustrates a schematic diagram of a first communication device and a second communication device according to one embodiment of the present application.

Embodiment 4 illustrates a schematic diagram of a first communication device and a second communication device according to the present application, as shown in FIG. 4. FIG. 4 is a block diagram of a first communication device 450 and a second communication device 410 in communication with each other in an access network.

The first communication device 450 comprises a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

The second communication device 410 comprises a controller/processor 475, a memory 476, a receiving processor 470, a transmitting processor 416, a multi-antenna receiving processor 472, a multi-antenna transmitting processor 471, a transmitter/receiver 418 and an antenna 420.

In a transmission from the second communication device 410 to the first communication device 450, at the second communication device 410, a higher layer packet from a core network is provided to the controller/processor 475. The controller/processor 475 provides functions of the L2 layer. In the transmission from the second communication device 410 to the first communication device 450, the controller/processor 475 provides header compression, encryption, packet segmentation and reordering, and multiplexing between a logical channel and a transport channel, and radio resource allocation of the first communication device 450 based on various priorities. The controller/processor 475 is also in charge of HARQ operation, a retransmission of a lost packet and a signaling to the first communication device 450. The transmitting processor 416 and the multi-antenna transmitting processor 471 perform various signal processing functions used for the L1 layer (i.e., PHY). The transmitting processor 416 performs coding and interleaving so as to ensure a Forward Error Correction (FEC) at the second communication device 410 side and the mapping of signal clusters corresponding to each modulation scheme (i.e., BPSK, QPSK, M-PSK, and M-QAM, etc.). The multi-antenna transmitting processor 471 performs digital spatial precoding, which includes precoding based on codebook and precoding based on non-codebook, and beamforming processing on encoded and modulated signals to generate one or more spatial streams. The transmitting processor 416 then maps each spatial stream into a subcarrier. The mapped symbols are multiplexed with a reference signal (i.e., pilot frequency) in time domain and/or frequency domain, and then they are assembled through Inverse Fast Fourier Transform (IFFT) to generate a physical channel carrying time-domain multicarrier symbol streams. After that the multi-antenna transmitting processor 471 performs transmission analog precoding/beamforming on the time-domain multicarrier symbol streams. Each transmitter 418 converts a baseband multicarrier symbol stream provided by the multi-antenna transmitting processor 471 into a radio frequency (RF) stream, which is later provided to different antennas 420.

In a transmission from the second communication device 410 to the first communication device 450, at the first communication device 450, each receiver 454 receives a signal via a corresponding antenna 452. Each receiver 454 recovers information modulated to the RF carrier, and converts the radio frequency stream into a baseband multicarrier symbol stream to be provided to the receiving processor 456. The receiving processor 456 and the multi-antenna receiving processor 458 perform signal processing functions of the L1 layer. The multi-antenna receiving processor 458 performs reception analog precoding/beamforming on a baseband multicarrier symbol stream provided by the receiver 454. The receiving processor 456 converts the processed baseband multicarrier symbol stream from time domain into frequency domain using FFT. In frequency domain, a physical layer data signal and a reference signal are de-multiplexed by the receiving processor 456, wherein the reference signal is used for channel estimation, while the data signal is subjected to multi-antenna detection in the multi-antenna receiving processor 458 to recover any first communication device 450-targeted spatial stream. Symbols on each spatial stream are demodulated and recovered in the receiving processor 456 to generate a soft decision. Then the receiving processor 456 decodes and de-interleaves the soft decision to recover the higher-layer data and control signal transmitted by the second communication device 410 on the physical channel. Next, the higher-layer data and control signal are provided to the controller/processor 459. The controller/processor 459 provides functions of the L2 layer. The controller/processor 459 can be associated with a memory 460 that stores program code and data. The memory 460 can be called a computer readable medium. In the transmission from the second communication device 410 to the second communication device 450, the controller/processor 459 provides demultiplexing between a transport channel and a logical channel, packet reassembling, decrypting, header decompression and control signal processing so as to recover a higher-layer packet from the core network. The higher-layer packet is later provided to all protocol layers above the L2 layer. Or various control signals can be provided to the L3 for processing.

In a transmission from the first communication device 450 to the second communication device 410, at the first communication device 450, the data source 467 is configured to provide a higher-layer packet to the controller/processor 459. The data source 467 represents all protocol layers above the L2 layer. Similar to a transmitting function of the second communication device 410 described in the transmission from the second communication node 410 to the first communication node 450, the controller/processor 459 performs header compression, encryption, packet segmentation and reordering, and multiplexing between a logical channel and a transport channel based on radio resource allocation so as to provide the L2 layer functions used for the user plane and the control plane. The controller/processor 459 is also responsible for a retransmission of a lost packet, and a signaling to the second communication device 410. The transmitting processor 468 performs modulation and mapping, as well as channel coding, and the multi-antenna transmitting processor 457 performs digital multi-antenna spatial precoding, including precoding based on codebook and precoding based on non-codebook, and beamforming. The transmitting processor 468 then modulates generated spatial streams into multicarrier/single-carrier symbol streams. The modulated symbol streams, after being subjected to analog precoding/beamforming in the multi-antenna transmitting processor 457, are provided from the transmitter 454 to each antenna 452. Each transmitter 454 first converts a baseband symbol stream provided by the multi-antenna transmitting processor 457 into a radio frequency symbol stream, and then provides the radio frequency symbol stream to the antenna 452.

In a transmission from the first communication device 450 to the second communication device 410, the function of the second communication device 410 is similar to the receiving function of the first communication device 450 described in the transmission from the second communication device 410 to the first communication device 450. Each receiver 418 receives a radio frequency signal via a corresponding antenna 420, converts the received radio frequency signal into a baseband signal, and provides the baseband signal to the multi-antenna receiving processor 472 and the receiving processor 470. The receiving processor 470 and the multi-antenna receiving processor 472 jointly provide functions of the L1 layer. The controller/processor 475 provides functions of the L2 layer. The controller/processor 475 can be associated with the memory 476 that stores program code and data. The memory 476 can be called a computer readable medium. In the transmission from the first communication device 450 to the second communication device 410, the controller/processor 475 provides de-multiplexing between a transport channel and a logical channel, packet reassembling, decrypting, header decompression, control signal processing so as to recover a higher-layer packet from the first communication device (UE) 450. The higher-layer packet coming from the controller/processor 475 may be provided to the core network.

In one embodiment, the first communication node 450 comprises at least one processor and at least one memory, the at least one memory comprises computer program codes; the at least one memory and the computer program codes are configured to be used in collaboration with the at least one processor, the first communication device 450 at least: receives a first message; and as a response to the action of receiving a first message, starts a first timer; and determines whether to transmit a second message at a first time according to whether a packet is to be transmitted via a first data radio bearer; herein, the first message is a Radio Resource Control (RRC) signaling, where a name of the first message includes RRC and Release, the first message indicating a first expiration value of the first timer; a time interval from the first time to the starting action of the first timer is no smaller than the first expiration value of the first timer; the second message is used to determine an update of a first area; the first data radio bearer is a data radio bearer of a first cell group.

In one embodiment, the first communication node 450 comprises a memory that stores a computer readable instruction program, the computer readable instruction program generates actions when executed by at least one processor, which include: receiving a first message; and as a response to the action of receiving a first message, starting a first timer; and determining whether to transmit a second message at a first time according to whether a packet is to be transmitted via a first data radio bearer; herein, the first message is a Radio Resource Control (RRC) signaling, where a name of the first message includes RRC and Release, the first message indicating a first expiration value of the first timer; a time interval from the first time to the starting action of the first timer is no smaller than the first expiration value of the first timer; the second message is used to determine an update of a first area; the first data radio bearer is a data radio bearer of a first cell group.

In one embodiment, the second communication node 410 comprises at least one processor and at least one memory, the at least one memory comprises computer program codes; the at least one memory and the computer program codes are configured to be used in collaboration with the at least one processor. The second communication device 410 at least: transmits a first message; monitors a second message; herein, as a response to the first message being received, a first timer is started; whether the second message is transmitted at a first time is determined according to whether a packet is to be transmitted via a first data radio bearer; the first message is an RRC signaling, where a name of the first message includes RRC and Release, the first message indicating a first expiration value of the first timer; a time interval from the first time to the starting action of the first timer is no smaller than the first expiration value of the first timer; the second message is used to determine an update of a first area; the first data radio bearer is a data radio bearer of a first cell group.

In one embodiment, the second communication node 410 comprises a memory that stores a computer readable instruction program, the computer readable instruction program generates actions when executed by at least one processor, which include: transmitting a first message; monitoring a second message; herein, as a response to the first message being received, a first timer is started; whether the second message is transmitted at a first time is determined according to whether a packet is to be transmitted via a first data radio bearer; the first message is an RRC signaling, where a name of the first message includes RRC and Release, the first message indicating a first expiration value of the first timer; a time interval from the first time to the starting action of the first timer is no smaller than the first expiration value of the first timer; the second message is used to determine an update of a first area; the first data radio bearer is a data radio bearer of a first cell group.

In one embodiment, the antenna 452, the receiver 454, the receiving processor 456, and the controller/processor 459 are used for receiving a first message; at least one of the antenna 420, the transmitter 418, the transmitting processor 416 or the controller/processor 475 is used for transmitting a first message.

In one embodiment, the antenna 452, the transmitter 454, the transmitting processor 468 and the controller/processor 459 are used for transmitting a second message; at least one of the antenna 420, the receiver 418, the receiving processor 470 or the controller/processor 475 is used for receiving a second message.

In one embodiment, the antenna 452, the transmitter 454, the transmitting processor 468 and the controller/processor 459 are used for transmitting a first signal; at least one of the antenna 420, the receiver 418, the receiving processor 470 or the controller/processor 475 is used for receiving a first signal.

In one embodiment, the antenna 452, the receiver 454, the receiving processor 456, and the controller/processor 459 are used for receiving a second signal; at least one of the antenna 420, the transmitter 418, the transmitting processor 416 or the controller/processor 475 is used for transmitting a second signal.

In one embodiment, the antenna 452, the transmitter 454, the transmitting processor 468 and the controller/processor 459 are used for transmitting a third message; at least one of the antenna 420, the receiver 418, the receiving processor 470 or the controller/processor 475 is used for receiving a third message.

In one embodiment, the antenna 452, the receiver 454, the receiving processor 456, and the controller/processor 459 are used for receiving a fourth message; at least one of the antenna 420, the transmitter 418, the transmitting processor 416 or the controller/processor 475 is used for transmitting a fourth message.

In one embodiment, the antenna 452, the receiver 454, the receiving processor 456, and the controller/processor 459 are used for receiving a first signaling; at least one of the antenna 420, the transmitter 418, the transmitting processor 416 or the controller/processor 475 is used for transmitting a first signaling.

In one embodiment, the first communication device 450 corresponds to the first node in the present application.

In one embodiment, the second communication device 410 corresponds to the second node in the present application.

In one embodiment, the first communication device 450 is a UE.

In one embodiment, the first communication device 450 is a UE supporting large delay difference.

In one embodiment, the first communication device 450 is a UE supporting NTN.

In one embodiment, the first communication device 450 is an aircraft.

In one embodiment, the first communication device 450 is capable of positioning.

In one embodiment, the first communication device 450 is incapable of positioning.

In one embodiment, the first communication device 450 is a UE supporting TN.

In one embodiment, the second communication device 410 is a base station (gNB/eNB/ng-eNB).

In one embodiment, the second communication device 410 is a UE.

In one embodiment, the second communication device 410 is a base station supporting large delay difference.

In one embodiment, the second communication device 410 is a base station supporting NTN.

In one embodiment, the second communication device 410 is satellite equipment.

In one embodiment, the second communication device 410 is a flight platform.

In one embodiment, the second communication device 410 is a base station supporting TN.

Embodiment 5A

Figure 5A:
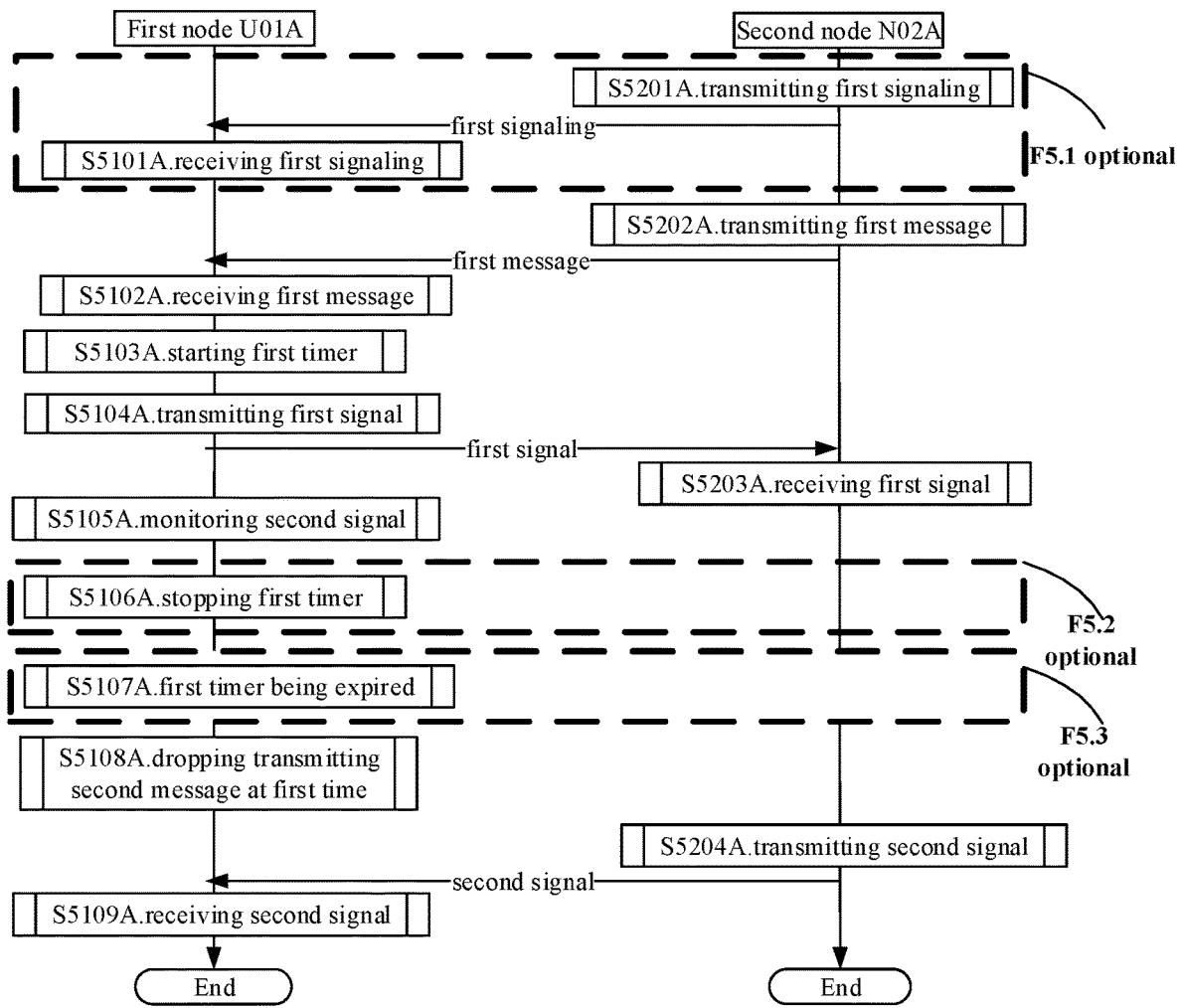
FIG. 5A illustrates a flowchart of radio signal transmission according to one embodiment of the present application.

Embodiment 5A illustrates a flowchart of radio signal transmission according to one embodiment of the present application, as shown in FIG. 5A. It should be particularly noted that the sequence illustrated herein does not set any limit to the signal transmission order or implementation order in the present application.

The first node U01A receives a first signaling in step S5101A; receives a first message in step S5102A; and in step S5103A, as a response to the action of receiving a first message, starts a first timer; transmits a first signal in step S5104A; and in step S5105A, as a response to the action of transmitting a first signal, monitors a second signal; stops a first timer in step S5106A; in step S5107A, the first timer is expired; drops transmitting a second message at a first time in step S5108A; and receives a second signal in step S5109A.

The second node N02A transmits the first signaling in step S5201A; transmits the first message in step S5202A; receives the first signal in step S5203A; and transmits the second signal in step S5204A.

In Embodiment 5A, the first signaling indicates a second expiration value of the second timer; the first timer is different from the second timer; the first message is an RRC signaling, where a name of the first message includes RRC and Release, the first message indicating a first expiration value of the first timer; a time interval from the first time to the starting action of the first timer is no smaller than the first expiration value of the first timer; the second message is used to determine an update of a first area; the first data radio bearer is a data radio bearer of a first cell group; the first signal is used for a random access procedure; the first signal is used to determine that a packet is to be transmitted via the first data radio bearer.

In one embodiment, whether to transmit a second message at a first time is determined according to whether a packet is to be transmitted via a first data radio bearer.

In one embodiment, the phrase of determining whether to transmit a second message at a first time according to whether a packet is to be transmitted via a first data radio bearer comprises: when transmitting a packet via the first data radio bearer, determining to drop transmitting the second message at the first time.

In one embodiment, the first signaling is transmitted via an air interface.

In one embodiment, the first signaling is transmitted via an antenna port.

In one embodiment, when the first signaling is received, the first node U01A is in the first state or the second state.

In one embodiment, the first signaling comprises a Downlink (DL) signal.

In one embodiment, the first signaling comprises a Sidelink (SL) signal.

In one embodiment, the first signaling comprises an RRC message.

In one embodiment, the first signaling comprises a System Information Block 1 (SIB1) message.

In one embodiment, the first signaling comprises an RRCReconfiguration message or an RRCConnectionReconfiguration message.

In one embodiment, the first signaling comprises an RRCRelease message or an RRCReleaseConnection message.

In one embodiment, the first signaling comprises one IE in an RRC message, where a name of the IE includes UE-TimersAndConstants.

In one embodiment, the first signaling comprises one IE in an RRC message, where a name of the IE includes RACH-ConfigCommon.

In one embodiment, the first signaling comprises one IE in an RRC message, where a name of the IE includes RACH-ConfigCommonTwoStepRA.

In one embodiment, the first signaling comprises one IE in an RRC message, where a name of the IE includes BWP-UplinkCommon.

In one embodiment, the first signaling comprises one IE in an RRC message, where a name of the IE includes BWP-Uplink.

In one embodiment, the first signaling comprises one IE in an RRC message, where a name of the IE includes ServingCellConfig.

In one embodiment, the first signaling comprises one field in an RRC message, where a name of the field includes t319.

In one embodiment, the first signaling comprises one field in an RRC message, where a name of the field includes ra-Response Window.

In one embodiment, the first signaling comprises one field in an RRC message, where a name of the field includes msgB-Response Window.

In one embodiment, the first signaling comprises one field in an RRC message, where a name of the field includes ra-ContentionResolutionTimer.

In one embodiment, the phrase that the first signaling indicates a second expiration value of the second timer comprises that: the second expiration value is a field in the first signaling.

In one embodiment, the phrase that the first signaling indicates a second expiration value of the second timer comprises that: the second expiration value is an IE in the first signaling.

In one embodiment, the phrase that the first signaling indicates a second expiration value of the second timer comprises that: the second expiration value is configured through the first signaling.

In one embodiment, the second timer includes an RRC-layer timer.

In one embodiment, the second timer includes a PDCP-layer timer.

In one embodiment, the second timer includes a MAC-layer timer.

In one embodiment, a name of the second timer includes ra-Response Window.

In one embodiment, a name of the second timer includes msgB-ResponseWindow.

In one embodiment, a name of the second timer includes ra-ContentionResolutionTimer.

In one embodiment, a name of the second timer includes timer.

In one embodiment, a name of the second timer includes Window.

In one embodiment, a name of the second timer includes T3.

In one embodiment, a name of the second timer includes at least one of sdt, or idt, or edt, or inactive, or small, or data or early.

In one embodiment, the phrase of determining whether to transmit a second message at a first time according to whether a packet is to be transmitted via a first data radio bearer comprises: determining whether to transmit a second message at a first time according to the first signal.

In one subembodiment, the first signal being transmitted is used to determine to drop transmitting the second message at a first time.

In one subembodiment, the first signal not being transmitted is used to determine to transmit the second message at a first time.

In one subembodiment, the first signal being transmitted and monitoring the second signal are used to determine to drop transmitting the second message at a first time.

In one subsidiary embodiment of the above subembodiment, the first time window is used for receiving the second signal.

In one subembodiment, the first node U01A is not configured with CG resources used for transmitting a packet via the first data radio bearer.

In one subembodiment, the first node U01A transmitting a packet via the first data radio bearer is based on a random access procedure.

In one embodiment, the first signal is transmitted via an air interface.

In one embodiment, the first signal is transmitted via an antenna port.

In one embodiment, when the first signal is transmitted, the first node U01A is in the first state.

In one embodiment, the first signal is transmitted on a Physical Random Access Channel (PRACH).

In one embodiment, the first signal is transmitted on a PUSCH.

In one embodiment, the first signal is transmitted through a CCCH.

In one embodiment, the first signal is transmitted through a DRB.

In one embodiment, the first signal is transmitted through an SRB.

In one embodiment, the first signal comprises all or part of a Physical Layer Signal.

In one embodiment, the first signal comprises all or part of an RRC message.

In one embodiment, the first signal comprises an Uplink (UL) signal.

In one embodiment, the first signal comprises at least one of a PRACH or a PUSCH.

In one embodiment, the phrase that the first signal is used for a random access procedure comprises: the first signal being a message in the random access procedure.

In one embodiment, the phrase that the first signal is used for a random access procedure comprises: the first signal comprising an Msg1 or an Msg3 or an MsgA.

In one embodiment, the first signal comprises a Message 1 (Msg1).

In one subembodiment, the Msg1 comprises a Random Access Preamble.

In one subembodiment, the Msg1 comprises a first characteristic sequence.

In one subsidiary embodiment of the above subembodiment, the first characteristic sequence comprises one or more of a pseudo-random sequence, a Zadoff-Chu sequence or a low-Peak-to-Average Power Ratio (low-PAPR) sequence.

In one subsidiary embodiment of the above subembodiment, the first characteristic sequence comprises a Cyclic Prefix (CP).

In one subsidiary embodiment of the above subembodiment, the first characteristic sequence comprises a positive integer.

In one subsidiary embodiment of the above subembodiment, the first characteristic sequence comprises a bit string.

In one embodiment, the first signal comprises a Message 3 (Msg3).

In one subembodiment, the Msg3 comprises an RRCResumeRequest message or an RRCResumeRequest1 message or an RRCConnectionResumeRequest message.

In one subembodiment, a name of the Msg3 includes RRC.

In one subembodiment, a name of the Msg3 includes at least one of small, or inactive, or early, or data, or resume, or request, or transmission.

In one subsidiary embodiment of the above subembodiment, the above words are case-insensitive.

In one subsidiary embodiment of the above subembodiment, the above words have initials in capitals.

In one subsidiary embodiment of the above subembodiment, the above words are all written in capitals/uppercase.

In one subsidiary embodiment of the above subembodiment, the above words are all written in lowercase.

In one subembodiment, the Msg3 comprises an RRCEarlyDataRequest message.

In one subembodiment, the Msg3 comprises an RRCSmallDataRequest message.

In one subembodiment, the Msg3 comprises an RRCInactiveDataRequest message.

In one embodiment, a Signaling Radio Bearer (SRB) for the Msg3 includes SRB0.

In one subembodiment, the Msg3 comprises a CCCH message.

In one subembodiment, the Msg3 comprises DRB data.

In one subembodiment, the Msg3 comprises a MAC CE.

In one subembodiment, the Msg3 comprises a Buffer Status Report (BSR).

In one subembodiment, the Msg3 comprises Padding bits.

In one embodiment, the first signal comprises a Message A (MsgA), the MsgA comprising at least one of the Msgs1.

In one embodiment, the first signal comprises a Message A (MsgA), the MsgA comprising at least one of the Msgs1 and at least one of the Msgs3.

In one subembodiment, the MsgA comprises a Random Access Preamble.

In one subembodiment, the MsgA comprises a CCCH message.

In one subembodiment, the MsgA comprises DRB data.

In one subembodiment, the MsgA comprises a MAC CE.

In one embodiment, the first signal comprises the Msg1 and the Msg3, the Msg1 and the Msg3 being transmitted simultaneously.

In one embodiment, the first signal comprises the Msg1 and the Msg3, the Msg1 and the Msg3 not being transmitted simultaneously.

In one embodiment, the phrase that the first signal is used to determine that a packet is to be transmitted via the first data radio bearer comprises that: the first signal comprises a first random access preamble, the first random access preamble being used to determine that a packet is to be transmitted via the first data radio bearer.

In one subembodiment, the first random access preamble is different from the random access preamble not being used to determine that a packet is to be transmitted via the first data radio bearer.

In one subembodiment, the first random access preamble is a dedicated random access preamble for determining that a packet is to be transmitted via the first data radio bearer.

In one subembodiment, the first random access preamble belongs to a first group, the first group being used to determine that a packet is to be transmitted via the first data radio bearer.

In one subembodiment, the first random access preamble uses a dedicated PRACH occasion.

In one subembodiment, a dedicated PRACH occasion used by the first random access preamble is different from a PRACH occasion of the random access preamble not being used to determine that a packet is to be transmitted via the first data radio bearer.

In one embodiment, the phrase that the first signal is used to determine that a packet is to be transmitted via the first data radio bearer comprises that: the first signal comprises a first field, the first field being used to determine that a packet is to be transmitted via the first data radio bearer.

In one subembodiment, a name of the first field includes resumeCause.

In one subembodiment, a value of the first field includes resumeCause.

In one subembodiment, a value of the first field is provided by upper layers.

In one subembodiment, a value of the first field is provided by an RRC layer.

In one subembodiment, a value of the first field includes sdt.

In one subembodiment, a value of the first field includes idt.

In one subembodiment, a value of the first field includes idt.

In one subembodiment, a name of a value of the first field includes at least one of sdt, or idt, or cp or up.

In one subembodiment, a name of a value of the first field includes at least one of inactive, or small, or data, or transmission, or cp, or up.

In one subembodiment, a value of the first field is used for indicating that a packet is to be transmitted via the first data radio bearer.

In one embodiment, the phrase that the first signal is used to determine that a packet is to be transmitted via the first data radio bearer comprises that: the first signal comprises an Msg3 or an MsgA, where the Msg3 or the MsgA comprises a RRCResumeRequest message or a RRCResumeRequest1 message or a RRCConnectionResumeRequest message, the RRCResumeRequest message or the RRCResumeRequest1 message or the RRCConnectionResumeRequest message comprising the first field in the present application, the first field being used to determine that a packet is to be transmitted via the first data radio bearer.

In one embodiment, the second signal is transmitted via an air interface.

In one embodiment, the second signal is transmitted via an antenna port.

In one embodiment, when the second signal is received, the first node U01A is in the first state.

In one embodiment, the second signal is transmitted on a PDCCH.

In one embodiment, the second signal comprises all or part of a Physical Layer Signal.

In one embodiment, the second signal comprises all or part of a MAC layer signaling.

In one embodiment, the second signal comprises all or part of an RRC message.

In one embodiment, the second signal comprises a physical-layer signaling.

In one embodiment, the second signal comprises a PDCCH.

In one embodiment, the second signal comprises a Downlink (DL) signal.

In one embodiment, the second signal comprises all or part of a MAC layer signaling.

In one embodiment, the second signal comprises Downlink Control Information (DCI).

In one embodiment, the second signal comprises a Message 2 (Msg2).

In one subembodiment, the Msg2 comprises an RAR.

In one subembodiment, the Msg2 comprises a MAC subheader.

In one subembodiment, the Msg2 comprises a MAC sub-PDU.

In one subembodiment, the Msg2 comprises a Timing Advance (TA).

In one subembodiment, the Msg2 comprises a successRAR.

In one subembodiment, the Msg2 comprises a UL Grant.

In one subembodiment, the Msg2 comprises a Temporary C-RNTI (TC-RNTI).

In one embodiment, the second signal comprises a Message 4 (Msg4).

In one subembodiment, the Msg4 comprises an RRCRelease message or an RRCConnectionRelease message.

In one subembodiment, the Msg4 comprises an RRCConnectionDataComplete message.

In one subembodiment, the Msg4 comprises an RRCEarlyDataComplete message.

In one subembodiment, the Msg4 comprises an RRCSmallDataComplete message.

In one subembodiment, the Msg4 comprises an RRCInactiveDataComplete message.

In one subembodiment, a name of the Msg4 includes RRC.

In one subembodiment, a name of the Msg4 includes Complete.

In one subembodiment, a name of the Msg4 includes at least one of early, or small, or inactive, or data, or idt, or sdt.

In one subsidiary embodiment of the above subembodiment, the above words are case-insensitive.

In one subsidiary embodiment of the above subembodiment, the above words have initials in capitals.

In one subsidiary embodiment of the above subembodiment, the above words are all written in capitals/uppercase.

In one subsidiary embodiment of the above subembodiment, the above words are all written in lowercase.

In one subembodiment, the Msg4 comprises a UE Contention Resolution Identity.

In one subembodiment, the Msg4 comprises a CCCH message.

In one embodiment, the second signal comprises a UL Grant.

In one embodiment, the second signal comprises a PDCCH.

In one embodiment, the second signal comprises DCI.

In one embodiment, the second signal comprises a Message B (MsgB), the MsgB comprising at least one of the Msgs2.

In one embodiment, the second signal comprises a Message B (MsgB), the MsgB comprising at least one of the Msgs4.

In one embodiment, the second signal comprises a Message B (MsgB), the MsgB comprising at least one of the Msgs2 and at least one of the Msgs4.

In one embodiment, the second signal is identified by a C-RNTI.

In one embodiment, Cyclic Redundancy Check (CRC) of the second signal is scrambled by a C-RNTI or a MCS (i.e., abbreviation for Modulation and Coding Scheme)-C-RNTI.

In one embodiment, CRC of the second signal is scrambled by a Temporary C-RNTI.

In one embodiment, CRC of the second signal is scrambled by a C-RNTI.

In one embodiment, CRC of the second signal is scrambled by an MsgB-RNTI.

In one embodiment, CRC of the second signal is scrambled by a Random Access (RA)-RNTI.

In one embodiment, CRC of the second signal is scrambled by the first RNTI.

In one embodiment, the second signal comprises one or more fields in an RRC message.

In one subembodiment, a name of the field includes fullI-RNTI.

In one subembodiment, a name of the field includes at least one of shortI-RNTIs.

In one subembodiment, a name of the field includes ran-PagingCycle.

In one subembodiment, a name of the field includes ran-NotificationAreaInfo.

In one subembodiment, a name of the field includes t380.

In one subembodiment, a name of the field includes nextHopChainingCount.

In one subembodiment, a name of the field includes C-RNTI.

In one subembodiment, a name of the field includes drb-ContinueROHC.

In one subembodiment, a name of the field includes measInactiveConfig.

In one subembodiment, a name of the field includes measIdleConfig.

In one subembodiment, a name of the field includes rrc-InactiveConfig.

In one subembodiment, a name of the field includes cg-Config.

In one subembodiment, a name of the field includes pur-Config.

In one subembodiment, the field indicates the first expiration value of the first timer.

In one subembodiment, the field indicates configurations of the first data radio bearer.

In one subembodiment, the field indicates ROHC of the first data radio bearer.

In one embodiment, the second signal comprises the Msg2 and the Msg4, the Msg2 and the Msg4 being transmitted simultaneously.

In one embodiment, the second signal comprises the Msg2 and the Msg4, the Msg2 and the Msg4 not being transmitted simultaneously.

In one embodiment, the first transmitter, transmitting a first signal; the first receiver, as a response to the action of transmitting a first signal, receiving a second signal.

In one subembodiment, the first transmitter, transmitting the Msg1; the first receiver, as a response to the action of transmitting the Msg1, receiving the Msg2; the first transmitter, as a response to the action of receiving the Msg2, transmitting the Msg3; the first receiver, as a response to the action of transmitting the Msg3, receiving the Msg4.

In one subembodiment, the first transmitter, transmitting the MsgA; the first receiver, as a response to the action of transmitting the MsgA, receiving the MsgB; the first transmitter, as a response to the action of receiving the MsgB, transmitting the Msg3; the first receiver, as a response to the action of transmitting the Msg3, receiving the Msg4.

In one subembodiment, the first transmitter, transmitting the MsgA; the first receiver, as a response to the action of transmitting the MsgA, receiving the MsgB.

In one subembodiment, the first transmitter, transmitting the Msg3; the first receiver, as a response to the action of transmitting the Msg3, receiving the Msg4.

In one embodiment, the dotted-line box F5.1 is optional.

In one subembodiment, the dotted-line box F5.1 exists.

In one subembodiment, the dotted-line box F5.1 does not exist.

In one embodiment, the dotted-line box F5.2 is optional.

In one embodiment, the dotted-line box F5.3 is optional.

In one embodiment, the dotted-line box F5.2 and the dotted-line box F5.3 cannot co-exist.

In one subembodiment, the dotted-line box F5.2 exists, while the dotted-line box F5.3 does not exist.

In one subembodiment, the dotted-line box F5.2 does not exist, while the dotted-line box F5.3 exists.

Embodiment 5B

Figure 5B:
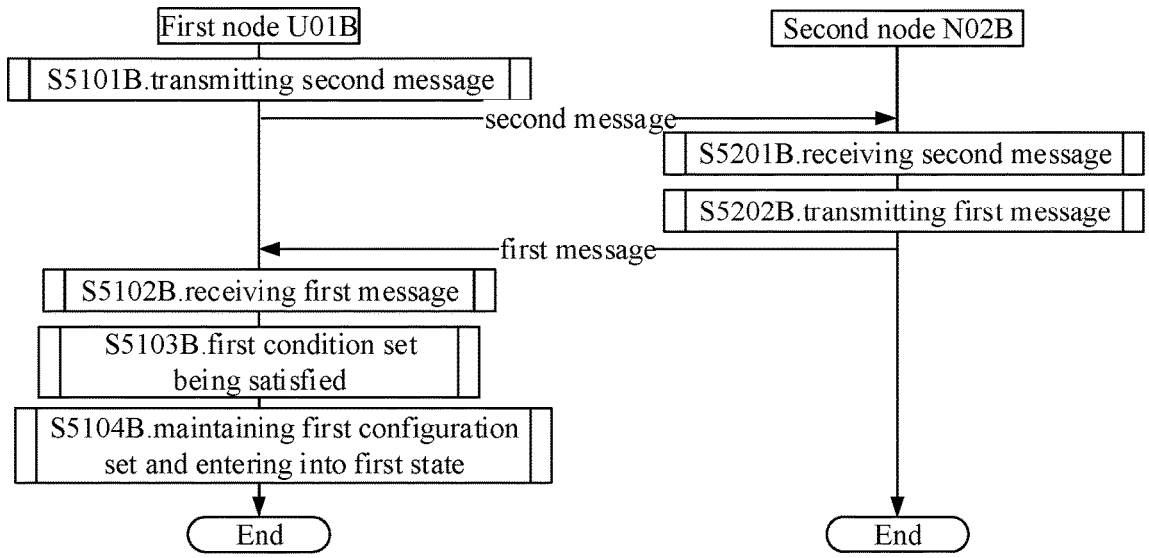
FIG. 5B illustrates a flowchart of radio signal transmission according to one embodiment of the present application.

Embodiment 5B illustrates a flowchart of radio signal transmission according to one embodiment of the present application, as shown in FIG. 5B. It should be particularly noted that the sequence illustrated herein does not set any limit to the signal transmission order or implementation order in the present application.

The first node U01B transmits a second message in step S5101B; receives a first message in step S5102B, the first message being a Radio Resource Control (RRC) signaling, where a name of the first message includes RRC and Release; in step S5103B, a first condition set is satisfied; and in step S5104B, as a response to a first condition set being satisfied, maintains a first configuration set and enters into a first state, the first configuration set comprising a first data radio bearer, the first data radio bearer being a data radio bearer of a first cell group.

The second node N02B receives the second message in step S5201B; and transmits the first message in step S5202B.

In Embodiment 5B, the second message is used to trigger the first message; the first state is an RRC state other than an RRC Connected state; the first condition set comprises at least one of the action of receiving the first message or the action of determining that a packet is to be transmitted via the first data radio bearer.

In one embodiment, the phrase of receiving the first message comprises: having received the first message, and the first message being triggered by the second message.

In one embodiment, the phrase of receiving the first message comprises: having received the first message, and the first message being triggered by the second message, the second message comprising an RRCResumeRequest message or an RRCResumeRequest1 message or an RRCConnectionResumeRequest message.

In one embodiment, the first condition set comprises receiving the first message, and determining that a packet is to be transmitted via the first data radio bearer.

In one embodiment, upon reception of the first message, and when determining that a packet is to be transmitted via the first data radio bearer, it is determined that the first condition set is satisfied.

In one embodiment, upon reception of the first message, it is determined that the first condition set is satisfied.

In one embodiment, upon reception of the first message, it is determined that the first condition set is satisfied.

In one embodiment, the action of determining that a packet is to be transmitted via the first data radio bearer comprises: determining that a condition for transmitting a packet via the first data radio bearer is satisfied.

In one embodiment, the action of determining that a packet is to be transmitted via the first data radio bearer comprises: determining that a packet is being transmitted via the first data radio bearer.

In one embodiment, the action of determining that a packet is to be transmitted via the first data radio bearer comprises: determining that the first data radio bearer has been resumed.

In one embodiment, the action of determining that a packet is to be transmitted via the first data radio bearer comprises: explicitly indicating that a packet is to be transmitted via the first data radio bearer.

In one embodiment, the action of determining that a packet is to be transmitted via the first data radio bearer comprises: implicitly indicating that a packet is to be transmitted via the first data radio bearer.

In one embodiment, the action of determining that a packet is to be transmitted via the first data radio bearer comprises: a PDCP layer of the first node U01A sending a notification to an RRC layer of the first node U01A, the notification being used to determine that a packet is to be transmitted via the first data radio bearer.

In one subembodiment, a PDCP layer of the first node U01A sends another notification to an RRC layer of the first node U01A, the other notification being used to stop transmitting a packet via the first data radio bearer.

In one embodiment, the action of determining that a packet is to be transmitted via the first data radio bearer comprises: an RRC layer of the first node U01A determines according to a state of the first data radio bearer that a packet is to be transmitted via the first data radio bearer.

In one subembodiment, the state of the first data radio bearer includes a suspended state.

In one subembodiment, the state of the first data radio bearer includes a resumed state.

In one embodiment, the phrase that a packet is to be transmitted via the first data radio bearer comprises: transmitting a small packet in the first state.

In one embodiment, the phrase that a packet is to be transmitted via the first data radio bearer comprises: transmitting a packet via the first data radio bearer in the first state.

In one embodiment, the phrase that a packet is to be transmitted via the first data radio bearer comprises: transmitting a packet in the first state, the packet being transmitted via the first data radio bearer.

In one embodiment, the phrase that a packet is to be transmitted via the first data radio bearer comprises: the packet being transmitted via the first data radio bearer.

In one embodiment, the phrase that a packet is to be transmitted via the first data radio bearer comprises: a Small Data Transmission.

In one embodiment, the phrase that a packet is to be transmitted via the first data radio bearer comprises: an INACTIVE Data Transmission.

In one embodiment, the phrase of the second message being used to trigger the first message comprises that: the first message is a response to the second message.

In one embodiment, the phrase of the second message being used to trigger the first message comprises that: the first message is triggered by the second message.

In one embodiment, the phrase of the second message being used to trigger the first message comprises that: as a response to transmitting the second message, the first node U01A monitors and receives the first message.

In one embodiment, the phrase of the second message being used to trigger the first message comprises that: as a response to receiving the second message, the second node N02A transmits the first message.

In one embodiment, the second message is transmitted via an air interface.

In one embodiment, the second message is transmitted via an antenna port.

In one embodiment, the second message is transmitted via an upper layer signaling.

In one embodiment, the second message is transmitted via a higher layer signaling.

In one embodiment, the second message comprises an Uplink (UL) signal.

In one embodiment, the second message comprises a Sidelink (SL) signal.

In one embodiment, the second message comprises all or part of an upper layer signaling.

In one embodiment, the second message comprises all or part of a higher layer signaling.

In one embodiment, the second message comprises an RRC message.

In one embodiment, the second message comprises an RRCResumeRequest message or an RRCResumeRequest1 message or an RRCConnectionResumeRequest message.

In one embodiment, the second message comprises an RRCEarlyDataRequest message.

In one embodiment, the second message comprises an RRCSmallDataRequest message.

In one embodiment, the second message comprises an RRClnactiveDataRequest message.

In one embodiment, a name of the second message includes at least one of RRC, or Resume, or Request, or Connection.

In one embodiment, a Signaling Radio Bearer (SRB) for the second message includes SRB0.

In one embodiment, the second message comprises a Common Control Channel (CCCH) message.

In one embodiment, the second message comprises DRB data.

In one embodiment, the second message comprises a MAC Control Element (CE).

In one embodiment, the second message comprises a Buffer Status Report (BSR).

In one embodiment, the second message comprises Padding bits.

In one embodiment, the second message comprises all or partial Information Elements (IEs) in an RRC message.

In one embodiment, the second message comprises all or partial fields in an IE in an RRC message.

In one embodiment, the second message comprises one field in an RRC message, where a name of the field includes resumeIdentity.

In one embodiment, the second message comprises one field in an RRC message, where a name of the field includes resumeMAC-I.

In one embodiment, the second message comprises one field in an RRC message, where a name of the field includes resumeCause.

In one embodiment, the second message comprises one field in an RRC message, where a name of the field includes Spare.

In one embodiment, the second message is used to determine that a packet is to be transmitted via the first data radio bearer.

In one embodiment, the second message is used to trigger an RNA update.

In one subembodiment, the RNA update is triggered by an expiration of a timer T380.

In one subembodiment, the RNA update is periodically triggered.

In one subembodiment, the RNA update is triggered by a reception of a System Information Block 1 (SIB1).

In one embodiment, the second message comprises the first field in the present application.

In one embodiment, the second message is transmitted in a random access procedure.

In one embodiment, the random access procedure comprises a 2-stepRA.

In one subsidiary embodiment of the above subembodiment, the second message is transmitted through a Message A (MsgA).

In one subsidiary embodiment of the above subembodiment, the second message is transmitted through a PUSCH.

In one embodiment, the random access procedure comprises a 4-stepRA.

In one subsidiary embodiment of the above subembodiment, the second message is transmitted through a Message 3 (Msg3).

In one subsidiary embodiment of the above subembodiment, the second message is transmitted through a UL Grant scheduled by a Message 2 (Msg2).

In one subembodiment, the random access procedure comprises a Contention Based Random Access (CBRA).

In one subembodiment, the random access procedure comprises Contention Free Random Access (CFRA).

In one embodiment, the first node U01A transmits through Configured Grant (CG) resources.

In one subembodiment, the CG resources are configured within an RRCRelease message or an RRCConnectionRelease message.

In one subembodiment, the CG resources are configured within an Msg3.

In one subembodiment, the CG resources are configured within an MsgB.

In one subembodiment, the CG resources are configured in an RRC_CONNECTED state.

In one subembodiment, the CG resources are configured in the first state.

In one subembodiment, the CG resources are used for transmitting a packet via the first DRB.

In one subembodiment, the CG resources are used for transmitting a packet in the first state.

In one subembodiment, the CG resources are associated with a first cell, the first cell being a cell in the first cell group.

In one subembodiment, the CG resources are associated with the first cell group.

In one embodiment, the first node U01A is not configured with the CG resources.

In one embodiment, the second message is transmitted through the CG resources.

In one subembodiment, when the second message is transmitted, a Timing Advance (TA) of the CG resources is valid.

In one embodiment, the second message comprises an RRCResumeRequest message, or an RRCResumeRequest1 message, or an RRCConnectionResumeRequest message, while the first message comprises an RRCRelease message or an RRCConnectionRelease message.

In one embodiment, the first transmitter transmits a second message, the second message being used to trigger the first message; the first receiver receives a first message, the first message being a Radio Resource Control (RRC) signaling, where a name of the first message includes RRC and Release; as a response to a first condition set being satisfied, maintaining a first configuration set and entering into a first state, the first configuration set comprising a first data radio bearer, the first data radio bearer being a data radio bearer of a first cell group; herein, the first condition set comprises the action of receiving the first message, where the first state is an RRC state other than an RRC Connected state; the second message comprises a RRCResumeRequest message or a RRCResumeRequest1 message or a RRCConnectionResumeRequest message, and the second message comprises a first field, the first field being used to indicate a cause of initiating an RRC connection resume request, where a name of the first field includes resumeCause and a value of the first field includes ma-Update; the first message comprises a RRCRelease message or a RRCConnectionRelease message, and the first message comprises first information, the first information comprising a suspendConfig IE.

In one embodiment, the first transmitter transmits a second message, the second message being used to trigger the first message; the first receiver receives a first message, the first message being a Radio Resource Control (RRC) signaling, where a name of the first message includes RRC and Release; as a response to a first condition set being satisfied, maintaining a first configuration set and entering into a first state, the first configuration set comprising a first data radio bearer, the first data radio bearer being a data radio bearer of a first cell group; herein, the first condition set comprises the action of receiving the first message, where the first state is an RRC state other than an RRC Connected state; the second message comprises a RRCResumeRequest message or a RRCResumeRequest1 message or a RRCConnectionResumeRequest message, and the second message is used to determine that a packet is to be transmitted via the first data radio bearer, the second message comprising at least one of a CCCH message or DRB data or a MAC CE or a BSR or padding bits; the first message comprises a RRCRelease message or a RRCConnectionRelease message.

In one subembodiment, the CCCH message comprises a ResumeMAC-I.

In one subembodiment, the CCCH message comprises the first field.

In one subembodiment, the CCCH message does not comprise the first field.

In one subembodiment, the first message comprises a suspendConfig IE.

In one subembodiment, the first message does not comprise a suspendConfig IE.

In one embodiment, a first field is used to indicate a cause of initiating an RRC connection resume request.

In one subembodiment, the first field comprises a resumeCause.

In one subembodiment, a name of the first field includes resumeCause.

In one subembodiment, a value of the first field includes resumeCause.

In one subembodiment, a value of the first field is provided by upper layers.

In one subembodiment, a value of the first field is provided by an RRC layer.

In one subembodiment, a value of the first field includes ma-Update.

In one subembodiment, a value of the first field includes sdt.

In one subembodiment, a value of the first field includes idt.

In one subembodiment, a value of the first field includes idt.

In one subembodiment, a name of a value of the first field includes at least one of sdt, or idt, or cp or up.

In one subembodiment, a name of a value of the first field includes at least one of inactive, or small, or data, or transmission, or cp, or up.

In one subembodiment, a value of the first field is used for indicating that a packet is to be transmitted via the first data radio bearer.

In one subembodiment, a value of the first field is used for indicating an RNA update.

Embodiment 6A

Figure 6A:
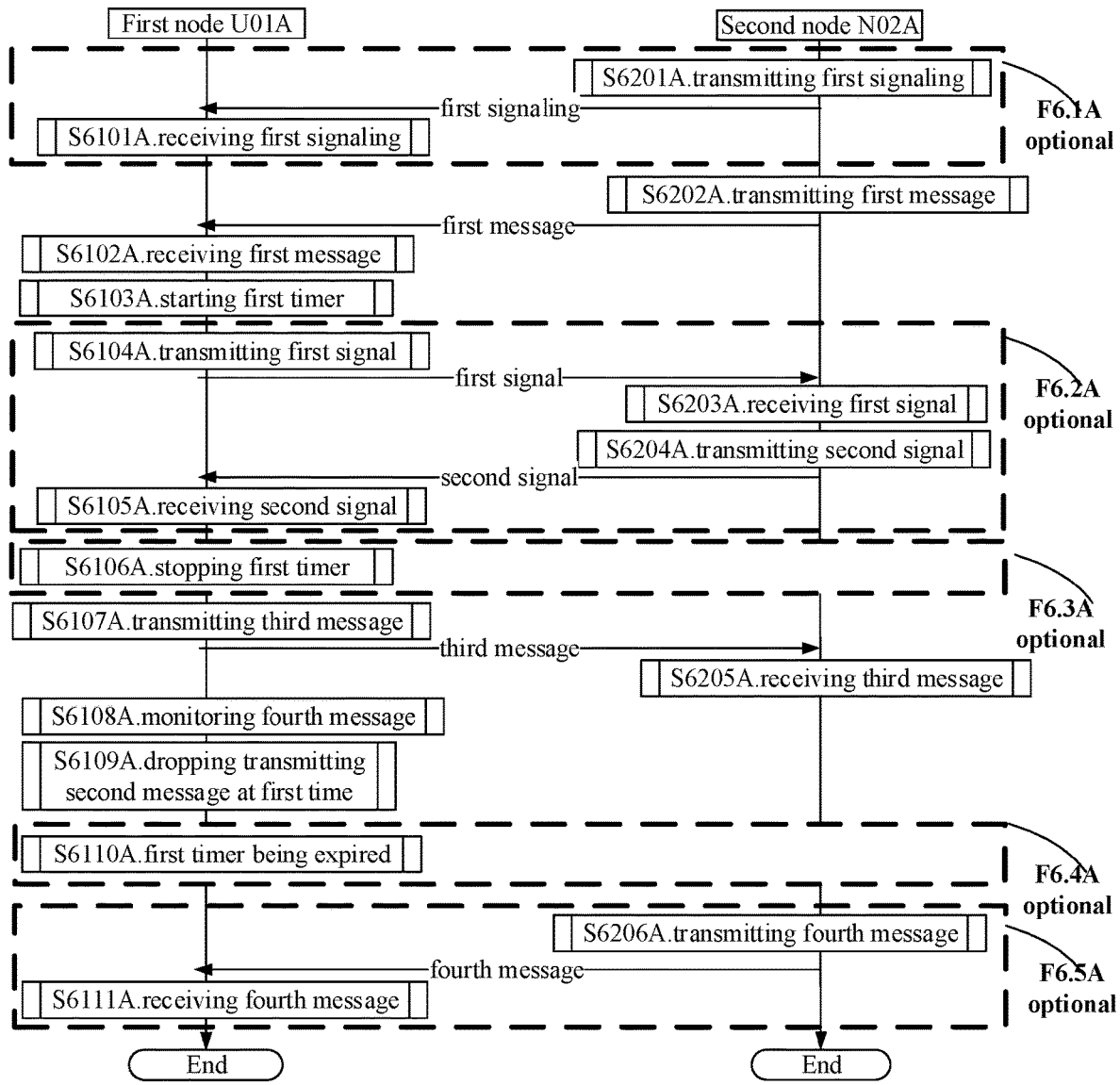
FIG. 6A illustrates a flowchart of radio signal transmission according to another embodiment of the present application.

Embodiment 6A illustrates a flowchart of signal transmission according to another embodiment of the present application, as shown in FIG. 6A. It should be particularly noted that the sequence illustrated herein does not set any limit to the signal transmission order or implementation order in the present application.

The first node U01A receives a first signaling in step S6101A; receives a first message in step S6102A; and in step S6103A, as a response to the action of receiving a first message, starts a first timer; transmits a first signal in step S6104A; and in step S6105A, as a response to the action of transmitting a first signal, receives a second signal; stops a first timer in step S6106A; transmits a third message in step S6107A; and monitors a fourth message in step S6108A; drops transmitting a second message at a first time in step S6109A; in step S6110A, the first timer is expired; and receives a fourth message in step S6111A.

The second node N02A transmits the first signaling in step S6201A; transmits the first message in step S6202A; receives the first signal in step S6203A; and transmits the second signal in step S6204A; receives the third message in step S6205A; and transmits the fourth message in step S6206A.

In Embodiment 6A, the first signaling indicates a second expiration value of the second timer; the first timer is different from the second timer; the first signal is used for a random access procedure; the first signal is used to determine that a packet is to be transmitted via the first data radio bearer; a packet transmitted via the first data radio bearer comprises the third message; the third message is used to trigger the fourth message; the first message is an RRC signaling, where a name of the first message includes RRC and Release, the first message indicating a first expiration value of the first timer; a time interval from the first time to the starting action of the first timer is no smaller than the first expiration value of the first timer; the second message is used to determine an update of a first area; the first data radio bearer is a data radio bearer of a first cell group.

In one embodiment, whether to transmit a second message at a first time is determined according to whether a packet is to be transmitted via a first data radio bearer.

In one embodiment, the phrase of determining whether to transmit a second message at a first time according to whether a packet is to be transmitted via a first data radio bearer comprises: when transmitting a packet via the first data radio bearer, determining to drop transmitting the second message at the first time.

In one embodiment, the phrase that a packet transmitted via the first data radio bearer comprises the third message comprises that: the third message comprises a small data packet.

In one embodiment, the phrase that a packet transmitted via the first data radio bearer comprises the third message comprises that: the third message comprises a DRB datum.

In one embodiment, the phrase that a packet transmitted via the first data radio bearer comprises the third message comprises that: the third message is transmitted via the first data radio bearer.

In one embodiment, the phrase that a packet transmitted via the first data radio bearer comprises the third message comprises that: a radio bearer of the third message comprises the first data radio bearer.

In one embodiment, the third message comprises an uplink datum.

In one embodiment, the third message comprises an uplink transmission, the uplink transmission being associated with the first data radio bearer, the uplink transmission comprising a small packet.

In one embodiment, when the third message is transmitted, the first node U01A is in the first state.

In one embodiment, the third message is PDCP-layer data.

In one embodiment, the third message is RRC-layer data.

In one embodiment, the third message is MAC-layer data.

In one embodiment, the third message comprises a CCCH message.

In one embodiment, the third message comprises a MAC CE.

In one embodiment, the third message comprises Padding bits.

In one embodiment, the third message comprises a BSR.

In one embodiment, the third message comprises DRB data.

In one embodiment, the third message comprises a first indicator, the first indicator being used to determine whether there is data to be transmitted.

In one subembodiment, the first indicator comprises one or multiple bits.

In one subembodiment, the first indicator is a field in the third message.

In one embodiment, the action of transmitting a third message comprises: the third message being delivered to a PDCP layer from an RRC layer.

In one embodiment, the action of transmitting a third message comprises: the third message being delivered to an RLC layer from a PDCP layer.

In one embodiment, the action of transmitting a third message comprises: the third message being delivered to a MAC layer from an RLC layer.

In one embodiment, the action of transmitting a third message comprises: the third message being delivered to a Physical (PHY) layer from a MAC layer.

In one embodiment, the action of transmitting a third message comprises: transmitting the third message via a PHY layer by the air interface.

In one embodiment, the phrase of the third message being used to trigger the fourth message comprises: as a response to transmitting the third message, receiving the fourth message.

In one embodiment, the phrase of the third message being used to trigger the fourth message comprises: the fourth message being related to the third message.

In one embodiment, after the third message is transmitted, the fourth message is monitored via a C-RNTI.

In one embodiment, after the third message is transmitted, the fourth message is monitored via an I-RNTI.

In one embodiment, after the third message is transmitted, the fourth message is monitored via a dedicated RNTI for small data transmission.

In one embodiment, when the fourth message is received, the first node U01A is in the first state.

In one embodiment, the fourth message comprises a downlink signaling.

In one embodiment, the fourth message is PDCP-layer data.

In one embodiment, the fourth message is a MAC-layer signaling.

In one embodiment, the fourth message is a PHY-layer signaling.

In one embodiment, the fourth message comprises a UL Grant.

In one embodiment, the fourth message comprises a Status Report.

In one embodiment, the fourth message comprises a fallback indication.

In one embodiment, the fourth message comprises a second indicator, the second indicator being used to determine whether to drop transmitting a packet via the first data radio bearer.

In one subembodiment, the second indicator comprises one or multiple bits.

In one subembodiment, the second indicator is a field in the fourth-type message #j.

In one embodiment, the third message is transmitted by Configured Grant (CG) resources.

In one subembodiment, the CG resources are configured within an RRCRelease message or an RRCConnectionRelease message.

In one subembodiment, the CG resources are configured within an Msg3.

In one subembodiment, the CG resources are configured within an MsgB.

In one subembodiment, the CG resources are configured in an RRC_CONNECTED state.

In one subembodiment, the CG resources are configured in the first state.

In one subembodiment, the CG resources are used for transmitting a packet via the first DRB.

In one subembodiment, the CG resources are used for transmitting a packet in the first state.

In one subembodiment, the CG resources are associated with a first cell, the first cell being a cell in the first cell group.

In one subembodiment, the CG resources are associated with the first cell group.

In one embodiment, the dotted-line box F6.1A is optional.
In one subembodiment, the dotted-line box F6.1A exists.
In one subembodiment, the dotted-line box F6.1A does not exist.
In one embodiment, the dotted-line box F6.2A is optional.
In one subembodiment, the dotted-line box F6.2A exists.

In one subembodiment, the dotted-line box F6.2A does not exist.

In one embodiment, the dotted-line box F6.3A is optional.
In one embodiment, the dotted-line box F6.4A is optional.
In one embodiment, the dotted-line box F6.3A and the dotted-line box F6.4A cannot co-exist.
In one subembodiment, the dotted-line box F6.3A exists, while the dotted-line box F6.4A does not exist.
In one subembodiment, the dotted-line box F6.3A does not exist, while the dotted-line box F6.4A exists.
In one embodiment, the dotted-line box F6.5A is optional.
In one subembodiment, the dotted-line box F6.5A exists.
In one subembodiment, the dotted-line box F6.5A does not exist.

In one embodiment, the phrase that the sequence illustrated herein does not set any limit to the signal transmission order or implementation order in the present application comprises that: the step S6109A is before the step S6110A, or the step S6109A is after the step S6110A.

In one embodiment, the phrase that the sequence illustrated herein does not set any limit to the signal transmission order or implementation order in the present application comprises that: the step S6105A is before the step S6111A, or the step S6105A is after the step S6111A.

In one embodiment, the phrase that the sequence illustrated herein does not set any limit to the signal transmission order or implementation order in the present application comprises that: the step S6204A is before the step S6206A, or the step S6204A is after the step S6206A.

In one embodiment, the phrase that the sequence illustrated herein does not set any limit to the signal transmission order or implementation order in the present application comprises that:

In one embodiment, a time of receiving the second signal is later than a time of transmitting the third message.

In one embodiment, a time of receiving the second signal is earlier than a time of transmitting the third message.

In one embodiment, a time of receiving the second signal is later than a time of receiving the fourth message.

In one embodiment, a time of receiving the second signal is earlier than a time of receiving the fourth message.

In one embodiment, the third message and the fourth message are messages before a reception of the second signal.

In one embodiment, the third message and the fourth message are messages after a reception of the second signal.

Embodiment 6B

Figure 6B:
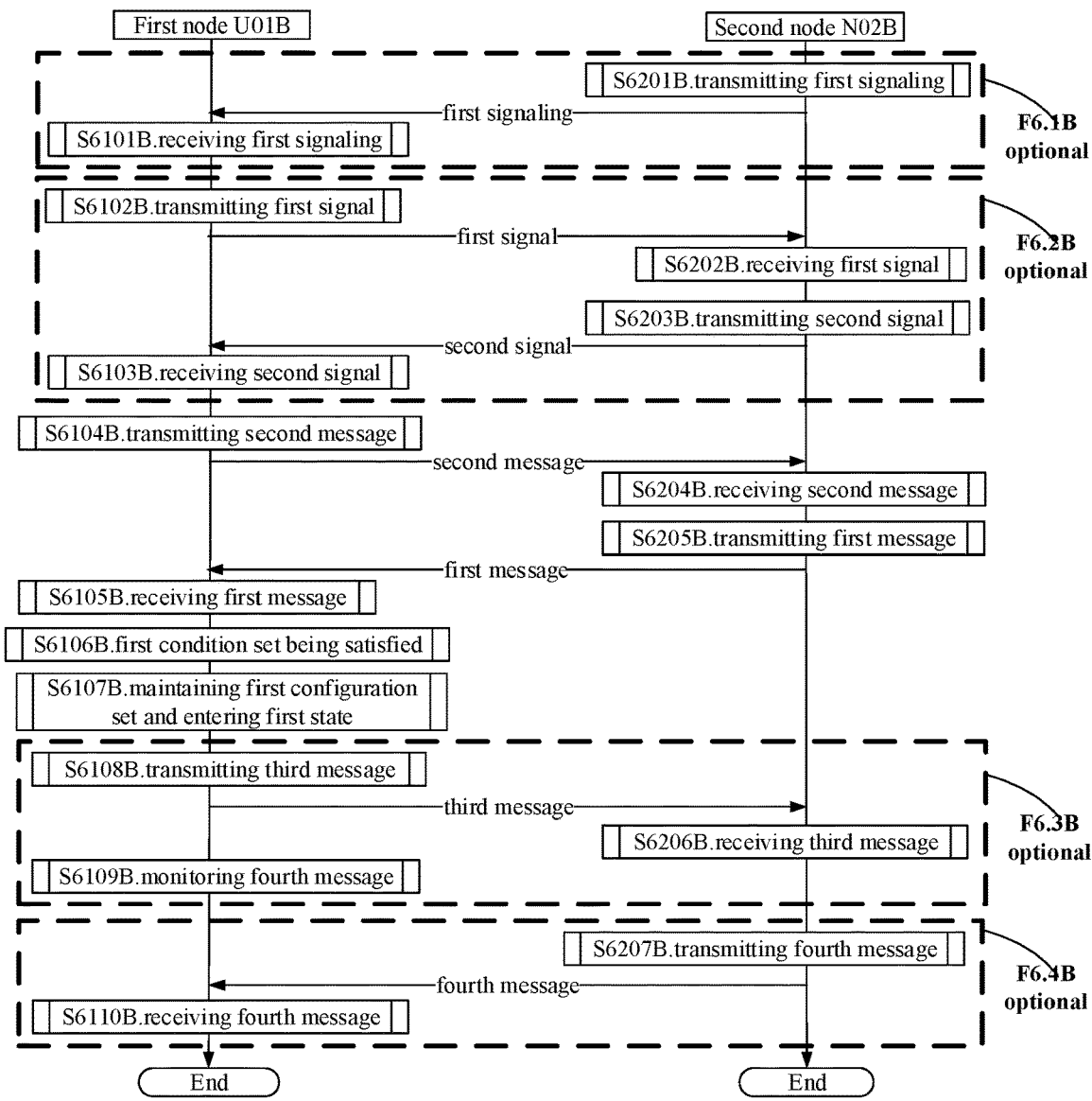
FIG. 6B illustrates a flowchart of radio signal transmission according to another embodiment of the present application.

Embodiment 6B illustrates a flowchart of radio signal transmission according to another embodiment of the present application, as shown in FIG. 6B. It should be particularly noted that the sequence illustrated herein does not set any limit to the signal transmission order or implementation order in the present application.

The first node U01B receives a first signaling in step S6101B; transmits a first signal in step S6102B; and in step S6103B, as a response to the action of transmitting a first signal, receives a second signal; transmits a second message in step S6104B; receives a first message in step S6105B, the first message being a Radio Resource Control (RRC) signaling, where a name of the first message includes RRC and Release; in step S6106B, a first condition set being fulfilled; and in step S6107B, as a response to a first condition set being satisfied, maintains a first configuration set and enters into a first state, the first configuration set comprising a first data radio bearer, the first data radio bearer being a data radio bearer of a first cell group; transmits a third message in step S6108B; and monitors a fourth message in step S6109B; and receives a fourth message in step S6110B.

The second node N02B transmits the first signaling in step S6201B; receives the first signal in step S6202B; and transmits the second signal in step S6203B; receives the second message in step S6204B; and transmits the first message in step S6205B; receives the third message in step S6206B; and transmits the fourth message in step S6207B.

In Embodiment 6B, the first signaling indicates a first expiration value of a first timer, the first timer being related to the first data radio bearer; the first signal is used for a random access procedure; the first signal is used to determine that a packet is to be transmitted via the first data radio bearer; the first state is an RRC state other than an RRC Connected state; the second message is used to trigger the first message; the third message is related to the first data radio bearer; the third message is used to trigger the fourth message; a time of starting the first timer is no later than the action of transmitting the third message; a condition of stopping the first timer includes receiving the fourth message; the first condition set comprises at least one of the action of receiving the first message, or a first timer being running, or determining that a packet is to be transmitted via the first data radio bearer.

In one embodiment, the phrase that the third message is related to the first data radio bearer comprises that: all or part of the third message is transmitted by the first data radio bearer.

In one embodiment, the phrase that the third message is related to the first data radio bearer comprises that: the third message comprises a user-plane packet, the user-plane packet being transmitted via the first data radio bearer.

In one embodiment, the phrase that the third message is related to the first data radio bearer comprises that: the first data radio bearer is used for transmitting the third message.

In one embodiment, the phrase that the third message is related to the first data radio bearer comprises that: the third message is associated with the first data radio bearer.

In one embodiment, the third message comprises an uplink datum.

In one embodiment, the third message comprises an uplink transmission, the uplink transmission being associated with the first data radio bearer, the uplink transmission comprising a small packet.

In one embodiment, the third message is PDCP-layer data.

In one embodiment, the third message is RRC-layer data.

In one embodiment, the third message is MAC-layer data.

In one embodiment, the third message comprises a CCCH message.

In one embodiment, the third message comprises a MAC CE.

In one embodiment, the third message comprises Padding bits.

In one embodiment, the third message comprises a BSR.

In one embodiment, the third message comprises DRB data.

In one embodiment, the third message comprises the first indication in the present application.

In one embodiment, the action of transmitting a third message comprises: the third message being delivered to a PDCP layer from an RRC layer.

In one embodiment, the action of transmitting a third message comprises: the third message being delivered to an RLC layer from a PDCP layer.

In one embodiment, the action of transmitting a third message comprises: the third message being delivered to a MAC layer from an RLC layer.

In one embodiment, the action of transmitting a third message comprises: the third message being delivered to a Physical (PHY) layer from a MAC layer.

In one embodiment, the action of transmitting a third message comprises: transmitting the third message via a PHY layer by the air interface.

In one embodiment, the phrase of the third message being used to trigger the fourth message comprises: as a response to transmitting the third message, receiving the fourth message.

In one embodiment, the phrase of the third message being used to trigger the fourth message comprises: the fourth message being related to the third message.

In one embodiment, after the third message is transmitted, the fourth message is monitored via a C-RNTI.

In one embodiment, after the third message is transmitted, the fourth message is monitored via an I-RNTI.

In one embodiment, after the third message is transmitted, the fourth message is monitored via a dedicated RNTI for small data transmission.

In one embodiment, the fourth message comprises a downlink signaling.

In one embodiment, the fourth message is PDCP-layer data.

In one embodiment, the fourth message is a MAC-layer signaling.

In one embodiment, the fourth message is a PHY-layer signaling.

In one embodiment, the fourth message comprises a UL Grant.

In one embodiment, the fourth message comprises a Status Report.

In one embodiment, the fourth message comprises the second indication in the present application.

In one embodiment, the phrase that the first signaling indicates a first expiration value of a first timer comprises that: the first expiration value of the first timer is a field in the first signaling.

In one embodiment, the phrase that the first signaling indicates a first expiration value of a first timer comprises that: the first signaling is used to determine the first expiration value of the first timer.

In one embodiment, the phrase that the first signaling indicates a first expiration value of a first timer comprises that: the first signaling configures the first expiration value of the first timer.

In one embodiment, the first signaling is transmitted via an air interface.

In one embodiment, the first signaling is transmitted via an antenna port.

In one embodiment, the first signaling is transmitted via an upper layer signaling.

In one embodiment, the first signaling is transmitted via a higher layer signaling.

In one embodiment, the first signaling comprises a Downlink (DL) signal.

In one embodiment, the first signaling comprises a Sidelink (SL) signal.

In one embodiment, the first signaling comprises all or part of an upper layer signaling.

In one embodiment, the first signaling comprises all or part of a higher layer signaling.

In one embodiment, the first signaling comprises an RRC message.

In one embodiment, the first signaling comprises a SIB1 message.

In one embodiment, the first signaling comprises an RRCReconfiguration message or an RRCConnectionReconfiguration message.

In one embodiment, the first signaling comprises an RRCRelease message or an RRCReleaseConnection message.

In one embodiment, the first signaling comprises one IE in an RRC message, where a name of the IE includes UE-TimersAndConstants.

In one embodiment, the first signaling comprises one IE in an RRC message, where a name of the IE includes RACH-ConfigCommon.

In one embodiment, the first signaling comprises one IE in an RRC message, where a name of the IE includes RACH-ConfigCommonTwoStepRA.

In one embodiment, the first signaling comprises one IE in an RRC message, where a name of the IE includes BWP-UplinkCommon.

In one embodiment, the first signaling comprises one IE in an RRC message, where a name of the IE includes BWP-Uplink.

In one embodiment, the first signaling comprises one IE in an RRC message, where a name of the IE includes ServingCellConfig.

In one embodiment, the first signaling comprises one field in an RRC message, where a name of the field includes t319.

In one embodiment, the first signaling comprises one field in an RRC message, where a name of the field includes ra-Response Window.

In one embodiment, the first signaling comprises one field in an RRC message, where a name of the field includes msgB-Response Window.

In one embodiment, the first signaling comprises one field in an RRC message, where a name of the field includes ra-ContentionResolutionTimer.

In one embodiment, the first expiration value comprises a positive integer number of millisecond(s).

In one embodiment, the first expiration value comprises a positive integer number of slot(s).

In one embodiment, the slot comprises at least one of slot(s), or subframe(s), or Radio Frame(s), or multiple Orthogonal Frequency Division Multiplexing (OFDM) symbols, or multiple Single Carrier Frequency Division Multiple Access (SC-FDMA) symbols.

In one embodiment, the first timer includes a timer.

In one embodiment, the first timer is an RRC-layer timer.

In one embodiment, the first timer is a PDCP-layer timer.

In one embodiment, the first timer is a MAC-layer timer.

In one embodiment, the first timer includes T319.

In one embodiment, the first timer includes a new timer.

In one embodiment, a name of the first timer includes T3.

In one embodiment, the first timer comprises a window.

In one embodiment, the phrase of the first timer being related to the first data radio bearer comprises that: the first timer is related to transmitting a packet via the first data radio bearer.

In one embodiment, the phrase of the first timer being related to the first data radio bearer comprises that: the first timer is used to determine a maximum time interval of transmitting a packet via the first data radio bearer.

In one embodiment, the phrase of the first timer being related to the first data radio bearer comprises that: during the time while the first timer is running, the first data radio bearer is in a resumed state.

In one embodiment, the phrase of the first timer being related to the first data radio bearer comprises that: the time while the first timer is running is used to determine a usage of the first data radio bearer.

In one embodiment, the phrase of the first timer being related to the first data radio bearer comprises that: a packet is transmitted via the first data radio bearer during the time while the first timer is running.

In one embodiment, the first condition set comprises a first timer being running.

In one embodiment, the first condition set comprises the action of receiving the first message, and the first timer being running.

In one embodiment, the first condition set comprises the action of receiving the first message, and determining that a packet is to be transmitted via the first data radio bearer, and the first timer being running.

In one embodiment, the phrase of a first timer being running comprises that: the first timer is keeping time.

In one embodiment, the phrase of a first timer being running comprises that: the first timer is larger than 0 and does not reach the first expiration value.

In one embodiment, the phrase of a first timer being running comprises that: the first timer is started.

In one embodiment, the phrase of a first timer being running comprises that: the first timer is started, and is not suspended.

In one embodiment, the phrase of a first timer being running comprises that: the first timer is expired, and is not restarted.

In one embodiment, the phrase of a first timer being running comprises that: the first timer is not stopped.

In one embodiment, the phrase of a first timer being running comprises that: a value of the first timer is updating as time changes.

In one embodiment, the phrase that a time of starting the first timer is no later than the action of transmitting the third message comprises: a time of starting the first timer is earlier than the action of transmitting the third message.

In one embodiment, the phrase that a time of starting the first timer is no later than the action of transmitting the third message comprises: a time of starting the first timer is related to the action of transmitting the third message.

In one embodiment, the phrase that a time of starting the first timer is no later than the action of transmitting the third message comprises: a time of starting the first timer is unrelated to the action of transmitting the third message.

In one embodiment, as a response to the action of transmitting the third message, the first timer is started.

In one embodiment, as a response to the action of transmitting a first signal, the first timer is started, where the first signal comprises an Msg3 or an MsgA, the Msg3 or the MsgA comprising an RRCResumeRequest message or an RRCResumeRequest1 message or an RRCConnectionResumeRequest message.

In one embodiment, as a response to the action of transmitting a first signal, the first timer is started, where the first signal comprises an Msg3 or an MsgA, the Msg3 or the MsgA comprising an RRCResumeRequest message or an RRCResumeRequest1 message or an RRCConnectionResumeRequest message.

In one embodiment, as a response to the action of transmitting a first signal, the first timer is started, where the first signal comprises an RRCResumeRequest message or an RRCResumeRequest1 message or an RRCConnectionResumeRequest message.

In one embodiment, the phrase that a condition of stopping the first timer includes receiving the fourth message comprises: upon reception of the fourth message, stopping the first timer.

In one embodiment, the phrase that a condition of stopping the first timer includes receiving the fourth message comprises: a reception of the fourth message being used to determine that the first timer is stopped.

In one embodiment, the phrase that a condition of stopping the first timer includes receiving the fourth message comprises: as a response to receiving the fourth message, stopping the first timer.

In one embodiment, when the first timer expires, stay in the first state.

In one embodiment, when the first timer expires, enter into an RRC_IDLE state.

In one embodiment, when the first timer expires, enter into an RRC_INACTIVE state.

In one embodiment, when the first timer expires, drop transmitting a packet via the first data radio bearer.

In one embodiment, when the first timer expires, update the first configuration set.

In one embodiment, the first signal is transmitted via an air interface.

In one embodiment, the first signal is transmitted via an antenna port.

In one embodiment, the first signal is transmitted on a Physical Random Access Channel (PRACH).

In one embodiment, the first signal is transmitted on a PUSCH.

In one embodiment, the first signal is transmitted through a CCCH.

In one embodiment, the first signal is transmitted through a DRB.

In one embodiment, the first signal is transmitted through an SRB.

In one embodiment, the first signal comprises all or part of a Physical Layer Signal.

In one embodiment, the first signal comprises all or part of an RRC message.

In one embodiment, the first signal comprises an Uplink (UL) signal.

In one embodiment, the first signal comprises at least one of a PRACH or a PUSCH.

In one embodiment, the phrase that the first signal is used for a random access procedure comprises: the first signal being a message in the random access procedure.

In one embodiment, the phrase that the first signal is used for a random access procedure comprises: the first signal comprising an Msg1 or an Msg3 or an MsgA.

In one embodiment, the first signal comprises a Message 1 (Msg1).

In one subembodiment, the Msg1 comprises a Random Access Preamble.

In one subembodiment, the Msg1 comprises a first characteristic sequence.

In one subsidiary embodiment of the above subembodiment, the first characteristic sequence comprises one or more of a pseudo-random sequence, a Zadoff-Chu sequence or a low-Peak-to-Average Power Ratio (low-PAPR) sequence.

In one subsidiary embodiment of the above subembodiment, the first characteristic sequence comprises a Cyclic Prefix (CP).

In one subsidiary embodiment of the above subembodiment, the first characteristic sequence comprises a positive integer.

In one subsidiary embodiment of the above subembodiment, the first characteristic sequence comprises a bit string.

In one embodiment, the first signal comprises a Message 3 (Msg3).

In one subembodiment, the Msg3 comprises an RRCResumeRequest message or an RRCResumeRequest1 message or an RRCConnectionResumeRequest message.

In one subembodiment, the Msg3 comprises an RRCEarlyDataRequest message.

In one subembodiment, the Msg3 comprises an RRCSmallDataRequest message.

In one subembodiment, the Msg3 comprises an RRCInactiveDataRequest message.

In one subembodiment, a name of the Msg3 includes at least one of RRC, or Resume, or Request, or Connection.

In one embodiment, a Signaling Radio Bearer (SRB) for the Msg3 includes SRB0.

In one subembodiment, the Msg3 comprises a CCCH message.

In one subembodiment, the Msg3 comprises DRB data.

In one subembodiment, the Msg3 comprises a MAC CE.

In one subembodiment, the Msg3 comprises a Buffer Status Report (BSR).

In one subembodiment, the Msg3 comprises Padding bits.

In one embodiment, the first signal comprises a Message A (MsgA), the MsgA comprising at least one of the Msgs1.

In one embodiment, the first signal comprises a Message A (MsgA), the MsgA comprising at least one of the Msgs1 and at least one of the Msgs3.

In one subembodiment, the MsgA comprises a Random Access Preamble.

In one subembodiment, the MsgA comprises a CCCH message.

In one subembodiment, the MsgA comprises DRB data.

In one subembodiment, the MsgA comprises a MAC CE.

In one embodiment, the phrase that the first signal is used to determine that a packet is to be transmitted via the first data radio bearer comprises that: the first signal comprises a first random access preamble, the first random access preamble being used to determine that a packet is to be transmitted via the first data radio bearer.

In one subembodiment, the first random access preamble is different from the random access preamble not being used to determine that a packet is to be transmitted via the first data radio bearer.

In one subembodiment, the first random access preamble is a dedicated random access preamble for determining that a packet is to be transmitted via the first data radio bearer.

In one subembodiment, the first random access preamble belongs to a first group, the first group being used to determine that a packet is to be transmitted via the first data radio bearer.

In one subembodiment, the first random access preamble uses a dedicated PRACH occasion.

In one subembodiment, a dedicated PRACH occasion used by the first random access preamble is different from a PRACH occasion of the random access preamble not being used to determine that a packet is to be transmitted via the first data radio bearer.

In one embodiment, the phrase that the first signal is used to determine that a packet is to be transmitted via the first data radio bearer comprises that: the first signal comprises the first field in the present application, the first field being used to determine that a packet is to be transmitted via the first data radio bearer.

In one embodiment, the phrase that the first signal is used to determine that a packet is to be transmitted via the first data radio bearer comprises that: the first signal comprises an Msg3 or an MsgA, where the Msg3 or the MsgA comprises a RRCResumeRequest message or a RRCResumeRequest1 message or a RRCConnectionResumeRequest message, the RRCResumeRequest message or the RRCResumeRequest1 message or the RRCConnectionResumeRequest message comprising the first field in the present application, the first field being used to determine that a packet is to be transmitted via the first data radio bearer.

In one embodiment, the first signal comprises the Msg1 and the Msg3, the Msg1 and the Msg3 being transmitted simultaneously.

In one embodiment, the first signal comprises the Msg1 and the Msg3, the Msg1 and the Msg3 not being transmitted simultaneously.

In one embodiment, the second signal is transmitted via an air interface.

In one embodiment, the second signal is transmitted via an antenna port.

In one embodiment, the second signal is transmitted on a PDCCH.

In one embodiment, the second signal comprises all or part of a Physical Layer Signal.

In one embodiment, the second signal comprises all or part of a MAC layer signaling.

In one embodiment, the second signal comprises all or part of an RRC message.

In one embodiment, the second signal comprises a physical-layer signaling.

In one embodiment, the second signal comprises a PDCCH.

In one embodiment, the second signal comprises a Downlink (DL) signal.

In one embodiment, the second signal comprises all or part of a MAC layer signaling.

In one embodiment, the second signal comprises Downlink Control Information (DCI).

In one embodiment, the second signal comprises a Message 2 (Msg2).

In one subembodiment, the Msg2 comprises an RAR.

In one subembodiment, the Msg2 comprises a MAC subheader.

In one subembodiment, the Msg2 comprises a MAC sub-PDU.

In one subembodiment, the Msg2 comprises a Timing Advance (TA).

In one subembodiment, the Msg2 comprises a successRAR.

In one subembodiment, the Msg2 comprises a UL Grant.

In one subembodiment, the Msg2 comprises a Temporary C-RNTI (TC-RNTI).

In one embodiment, the second signal comprises a Message 4 (Msg4).

In one subembodiment, the Msg4 comprises an RRCRelease message or an RRCConnectionRelease message.

In one subembodiment, the Msg4 comprises a UE Contention Resolution Identity.

In one subembodiment, the Msg4 comprises a CCCH message.

In one embodiment, the first message comprises a UL Grant.

In one embodiment, the first message comprises a PDCCH.

In one embodiment, the first message comprises DCI.

In one embodiment, the second signal comprises a Message B (MsgB), the MsgB comprising at least one of the Msgs2.

In one embodiment, the second signal comprises a Message B (MsgB), the MsgB comprising at least one of the Msgs4.

In one embodiment, the second signal comprises a Message B (MsgB), the MsgB comprising at least one of the Msgs2 and at least one of the Msgs4.

In one embodiment, the second signal is identified by a C-RNTI.

In one embodiment, CRC of the second signal is scrambled by a C-RNTI or a Modulation and Coding Scheme (MCS)-C-RNTI.

In one embodiment, CRC of the second signal is scrambled by a Temporary C-RNTI.

In one embodiment, CRC of the second signal is scrambled by a C-RNTI.

In one embodiment, CRC of the second signal is scrambled by an MsgB-RNTI.

In one embodiment, CRC of the second signal is scrambled by a Random Access (RA)-RNTI.

In one embodiment, CRC of the second signal is scrambled by the first RNTI.

In one embodiment, the second signal comprises one or more fields in an RRC message.

In one subembodiment, a name of the field includes fullI-RNTI.

In one subembodiment, a name of the field includes at least one of shortI-RNTIs.

In one subembodiment, a name of the field includes ran-PagingCycle.

In one subembodiment, a name of the field includes ran-NotificationAreaInfo.

In one subembodiment, a name of the field includes t380.

In one subembodiment, a name of the field includes nextHopChainingCount.

In one subembodiment, a name of the field includes C-RNTI.

In one subembodiment, a name of the field includes drb-ContinueROHC.

In one subembodiment, a name of the field includes measInactiveConfig.

In one subembodiment, a name of the field includes measIdleConfig.

In one subembodiment, a name of the field includes rrc-InactiveConfig.

In one subembodiment, a name of the field includes cg-Config.

In one subembodiment, a name of the field includes pur-Config.

In one subembodiment, the field indicates the first expiration value of the first timer.

In one subembodiment, the field indicates configurations of the first data radio bearer.

In one subembodiment, the field indicates ROHC of the first data radio bearer.

In one embodiment, the first signal comprises the Msg2 and the Msg4, the Msg2 and the Msg4 being transmitted simultaneously.

In one embodiment, the first signal comprises the Msg2 and the Msg4, the Msg2 and the Msg4 not being transmitted simultaneously.

In one embodiment, with the first message being received, and the first timer being running, it is determined that the first condition set is satisfied.

In one embodiment, upon reception of the first message, if the first timer is running, maintain a first configuration set and enter into a first state.

In one embodiment, upon reception of the first message, if the first message is used to determine that a packet is to be transmitted via the first data radio bearer, maintain a first configuration set and enter into a first state.

In one embodiment, upon reception of the first message, if it is determined that a packet is to be transmitted via the first data radio bearer, maintain a first configuration set and enter into a first state.

In one embodiment, the third message having been transmitted and the fourth message being monitored are used to determine that a packet is to be transmitted via the first data radio bearer.

In one embodiment, the third message having been transmitted and the fourth message being monitored are used to determine that a packet is to be transmitted via the first data radio bearer; the third message comprises a RRCResumeRequest message, or a RRCResumeRequest1 message, or a RRCConnectionResumeRequest message, while the fourth message comprises a RRCRelease message or a RRCConnectionRelease message.

In one embodiment, the third message having been transmitted and the fourth message being monitored are used to determine that a packet is to be transmitted via the first data radio bearer; the third message comprises DRB data, while the fourth message comprises an Acknowledgement (ACK)/a Negative Acknowledgement (NACK).

In one embodiment, the first signal having been transmitted and the second signal being monitored are used to determine that a packet is to be transmitted via the first data radio bearer.

In one embodiment, the first signal having been transmitted and the second signal being monitored are used to determine that a packet is to be transmitted via the first data radio bearer; the first signal comprises an Msg1, while the second signal comprises an Msg2.

In one embodiment, the first signal having been transmitted and the second signal being monitored are used to determine that a packet is to be transmitted via the first data radio bearer; the first signal comprises an Msg3, while the second signal comprises an Msg4.

In one embodiment, the first signal having been transmitted and the second signal being monitored are used to determine that a packet is to be transmitted via the first data radio bearer; the first signal comprises an MsgA, while the second signal comprises an MsgB.

In one embodiment, the first transmitter, transmitting a first signal; the first receiver, as a response to the action of transmitting a first signal, receiving a second signal.

In one subembodiment, the first transmitter, transmitting the Msg1; the first receiver, as a response to the action of transmitting the Msg1, receiving the Msg2; the first transmitter, as a response to the action of receiving the Msg2, transmitting the Msg3; the first receiver, as a response to the action of transmitting the Msg3, receiving the Msg4.

In one subembodiment, the first transmitter, transmitting the MsgA; the first receiver, as a response to the action of transmitting the MsgA, receiving the MsgB; the first transmitter, as a response to the action of receiving the MsgB, transmitting the Msg3; the first receiver, as a response to the action of transmitting the Msg3, receiving the Msg4.

In one subembodiment, the first transmitter, transmitting the MsgA; the first receiver, as a response to the action of transmitting the MsgA, receiving the MsgB.

In one subembodiment, the first transmitter, transmitting the Msg3; the first receiver, as a response to the action of transmitting the Msg3, receiving the Msg4.

In one embodiment, the dotted-line box F6.1B is optional.

In one subembodiment, the dotted-line box F6.1B exists.

In one subembodiment, the dotted-line box F6.1B does not exist.

In one embodiment, the dotted-line box F6.2B is optional.

In one subembodiment, the dotted-line box F6.2B exists.

In one subembodiment, the dotted-line box F6.2B does not exist.

In one embodiment, the dotted-line box F6.3B is optional.

In one subembodiment, the dotted-line box F6.3B exists.

In one subembodiment, the dotted-line box F6.3B does not exist.

In one embodiment, the dotted-line box F6.4B is optional.

In one subembodiment, the dotted-line box F6.4B exists.

In one subembodiment, the dotted-line box F6.4B does not exist.

In one embodiment, the dotted-line box F6.2B exists, while the dotted-line box F6.3B exists.

In one subembodiment, small data transmission is related to a random access procedure.

In one subembodiment, small data transmission is unrelated to a random access procedure.

In one subembodiment, small data transmission is related to RRC.

In one subembodiment, small data transmission is unrelated to RRC.

In one subembodiment, small data continues to be transmitted after completing the random access procedure.

In one embodiment, the dotted-line box F6.2B exists, while the dotted-line box F6.3B does not exist.

In one subembodiment, small data transmission is related to a random access procedure, and small data will cease to be transmitted after completing the random access procedure.

In one embodiment, the dotted-line box F6.2B does not exist, while the dotted-line box F6.3B exists.

In one subembodiment, small data transmission is unrelated to a random access procedure.

In one embodiment, when the dotted-line box F6.4B exists, the dotted-line box F6.3B exists.

In one subembodiment, the third message is transmitted, and the fourth message is successfully received.

In one embodiment, when the dotted-line box F6.4B does not exist, the dotted-line box F6.3B exists.

In one subembodiment, the fourth message is not successfully received.

In one subembodiment, the first timer is expired.

In one embodiment, when the dotted-line box F6.4B does not exist, the dotted-line box F6.3B does not exist.

In one subembodiment, the third message is not transmitted.

In one embodiment, as a response to satisfying a given condition of transmitting a packet via the first data radio bearer, the first data radio bearer is resumed.

In one subembodiment, the given condition is related to a Reference Signal Received Power (RSRP).

In one subembodiment, the given condition is related to a size of the packet.

In one embodiment, as a response to having received the first message, the first data radio bearer is resumed, the first message being triggered by the second message, the second message being used to determine that a packet is to be transmitted via the first data radio bearer.

In one embodiment, as a response to having received the second signal, the first data radio bearer is resumed, the second signal comprising the Msg2 or the Msg4 or the MsgB.

In one embodiment, as a response to transmitting the first signal, the first data radio bearer is resumed, the first signal comprising the Msg1 or the Msg3 or the MsgA.

In one embodiment, transmitting a packet via the first data radio bearer is based on a random access procedure.

In one embodiment, transmitting a packet via the first data radio bearer is not based on a random access procedure.

In one embodiment, the first signal and the second signal are used to determine a TA.

In one embodiment, the first signal and the second signal initiate a transmission of a packet via the first data radio bearer.

Embodiment 7A

Figure 7A:
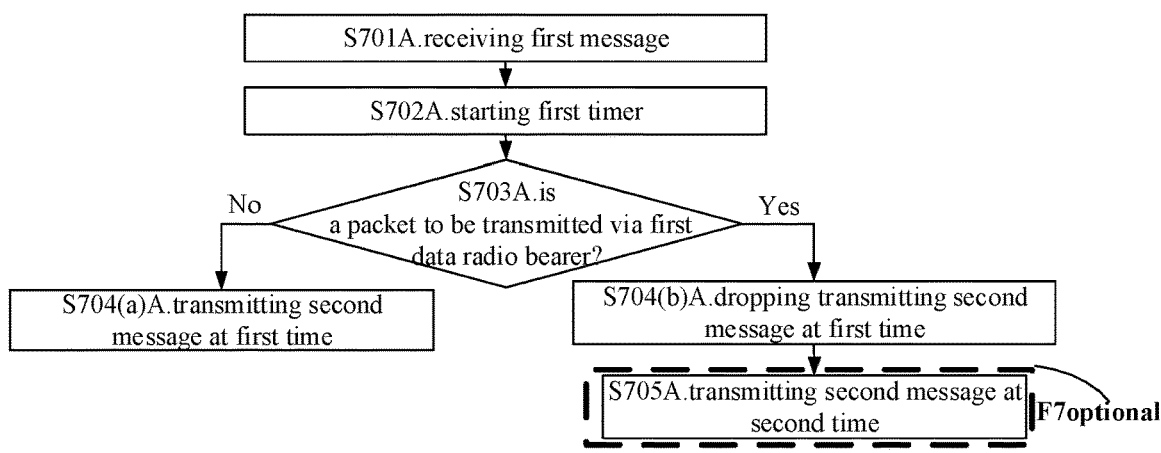
FIG. 7A illustrates a flowchart of determining whether to transmit a second message at a first time according to whether a packet is to be transmitted via a first data radio bearer according to one embodiment of the present application.

Embodiment 7A illustrates a flowchart of determining whether to transmit a second message at a first time according to whether a packet is to be transmitted via a first data radio bearer according to one embodiment of the present application, as shown in FIG. 7A. It should be particularly noted that the sequence illustrated herein does not set any limit to the signal transmission order or implementation order in the present application.

In one embodiment, in step S701A, receiving a first message; in step S702A, starting a first timer; in step S703A, determining whether a packet is to be transmitted via a first data radio bearer; when it is determined that a packet is to be transmitted via the first data radio bearer, entering into the step S704(a)A, otherwise, entering into the step S704(b)A; in step S704(a)A, transmitting the second message at a first time; in step S704(b)A, dropping transmitting the second message at the first time; in step S705A, transmitting the second message at a second time.

In one embodiment, the second time is greater than the first time.

In one embodiment, the second time is no smaller than the first time.

In one embodiment, the second timer being running is used to determine that a packet is to be transmitted via a first data radio bearer.

In one embodiment, a signal being transmitted and another signal awaiting to be received are used to determine that a packet is to be transmitted via a first data radio bearer.

In one subembodiment, the signal comprises the first signal in the present application, while the other signal comprises the second signal in the present application.

In one subembodiment, the signal comprises the Msg1 in the present application, while the other signal comprises the Msg2 in the present application.

In one subembodiment, the signal comprises the Msg3 in the present application, while the other signal comprises the Msg4 in the present application.

In one subembodiment, the signal comprises the MsgA in the present application, while the other signal comprises the MsgB in the present application.

In one subembodiment, the signal comprises the MsgA in the present application, while the other signal comprises the MsgB in the present application.

In one subembodiment, the signal comprises the third message in the present application, while the other signal comprises the fourth message in the present application.

In one subembodiment, the signal comprises the third-type message #1 in the present application, while the other signal comprises the fourth-type message #Q2 in the present application.

In one subembodiment, the signal comprises the third-type message #i in the present application, while the other signal comprises the fourth-type message #j in the present application.

In one embodiment, the first data radio bearer being running is used to determine that a packet is to be transmitted via a first data radio bearer.

In one subembodiment, the first data radio bearer being not in a suspended state is used to determine that the first data radio bearer is running.

In one subembodiment, the first data radio bearer being in a resumed state is used to determine that the first data radio bearer is running.

In one subembodiment, there exists data in a buffer associated with the first data radio bearer.

In one embodiment, the dotted-line box F7 is optional.

In one embodiment, the dotted-line box F7 exists.

In one embodiment, the dotted-line box F7 does not exist.

Embodiment 7B

Figure 7B:
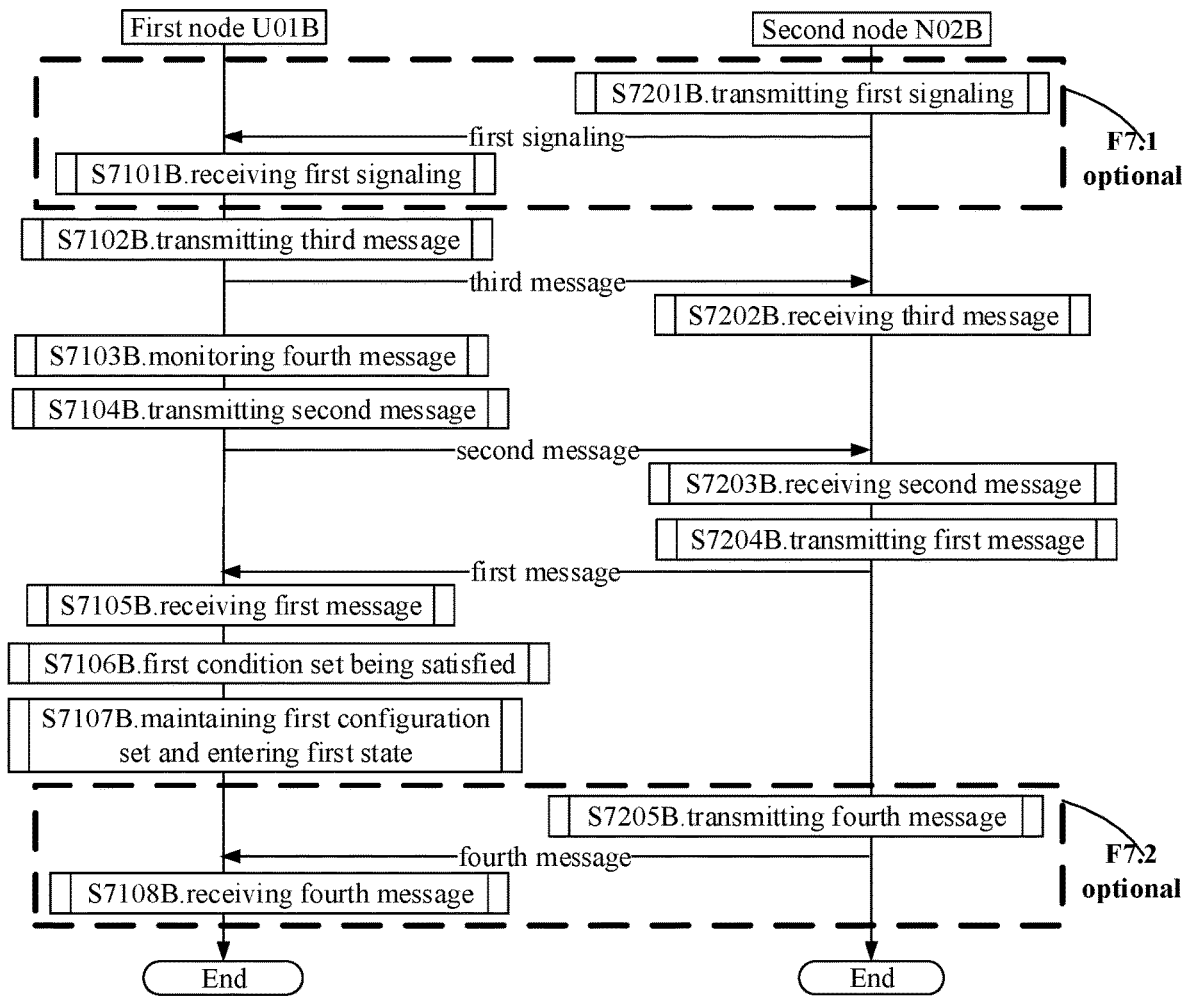
FIG. 7B illustrates a flowchart of radio signal transmission according to another embodiment of the present application.

Embodiment 7B illustrates a flowchart of signal transmission according to another embodiment of the present application, as shown in FIG. 7B. It should be particularly noted that the sequence illustrated herein does not set any limit to the signal transmission order or implementation order in the present application.

The first node U01B receives a first signaling in step S7101B; transmits a third message in step S7102B; and monitors a fourth message in step S7103B; transmits a second message in step S7104B; receives a first message in step S7105B, the first message being a Radio Resource Control (RRC) signaling, where a name of the first message includes RRC and Release; in step S7106B, a first condition set being satisfied; and in step S7107B, as a response to a first condition set being satisfied, maintains a first configuration set and enters into a first state, the first configuration set comprising a first data radio bearer, the first data radio bearer being a data radio bearer of a first cell group; and receives a fourth message in step S7108B.

The second node N02B transmits the first signaling in step S7201B; receives the third message in step S7202B; and receives the second message in step S7203B; and transmits the first message in step S7204B; and transmits the fourth message in step S7205B.

In Embodiment 7B, the first signaling indicates a first expiration value of a first timer, the first timer being related to the first data radio bearer; the first state is an RRC state other than an RRC Connected state; the second message is used to trigger the first message; the third message is related to the first data radio bearer; the third message is used to trigger the fourth message; a time of starting the first timer is no later than the action of transmitting the third message; a condition of stopping the first timer includes receiving the fourth message; the first condition set comprises at least one of the action of receiving the first message, or a first timer being running, or determining that a packet is to be transmitted via the first data radio bearer.

In one embodiment, the third message only comprises DRB data.

In one embodiment, the third message is transmitted by the CG resources in the present application.

In one embodiment, before the third message is transmitted, the first data radio bearer is resumed.

In one embodiment, transmitting a packet via the first data radio bearer is not based on a random access procedure.

In one embodiment, the dotted-line box F7.1 is optional.

In one subembodiment, the dotted-line box F7.1 exists.

In one subembodiment, the dotted-line box F7.1 does not exist.

In one embodiment, the dotted-line box F7.2 is optional.

In one subembodiment, the dotted-line box F7.2 exists.

In one subembodiment, the dotted-line box F7.2 does not exist.

Embodiment 8A

Figure 8A:
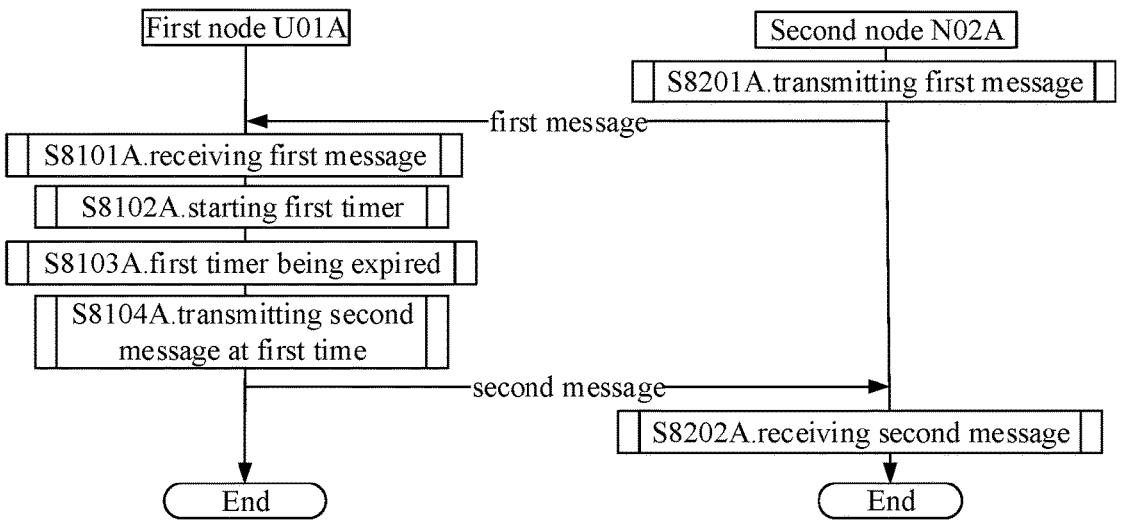
FIG. 8A illustrates a flowchart of radio signal transmission according to another embodiment of the present application.

Embodiment 8A illustrates a flowchart of signal transmission according to another embodiment of the present application, as shown in FIG. 8A. It should be particularly noted that the sequence illustrated herein does not set any limit to the signal transmission order or implementation order in the present application.

The first node U01A receives a first message in step S8101A; and in step S8102A, as a response to the action of receiving a first message, starts a first timer; in step S8103A, the first timer is expired; and in step S8104A, transmits a second message at a first time.

The second node N02A transmits the first message in step S8201A; and receives the second message in step S8202A.

In Embodiment 8A, the first message is a Radio Resource Control (RRC) signaling, where a name of the first message includes RRC and Release, the first message indicating a first expiration value of the first timer; a time interval from the first time to the starting action of the first timer is no smaller than the first expiration value of the first timer; the second message being used to determine an update of a first area.

In one embodiment, at the first time, no packet is to be transmitted via the first data radio bearer.

In one embodiment, the phrase of determining whether to transmit a second message at a first time according to whether a packet is to be transmitted via a first data radio bearer comprises: when not transmitting a packet via the first data radio bearer, determining to transmit the second message at the first time.

Embodiment 8B

Figure 8B:
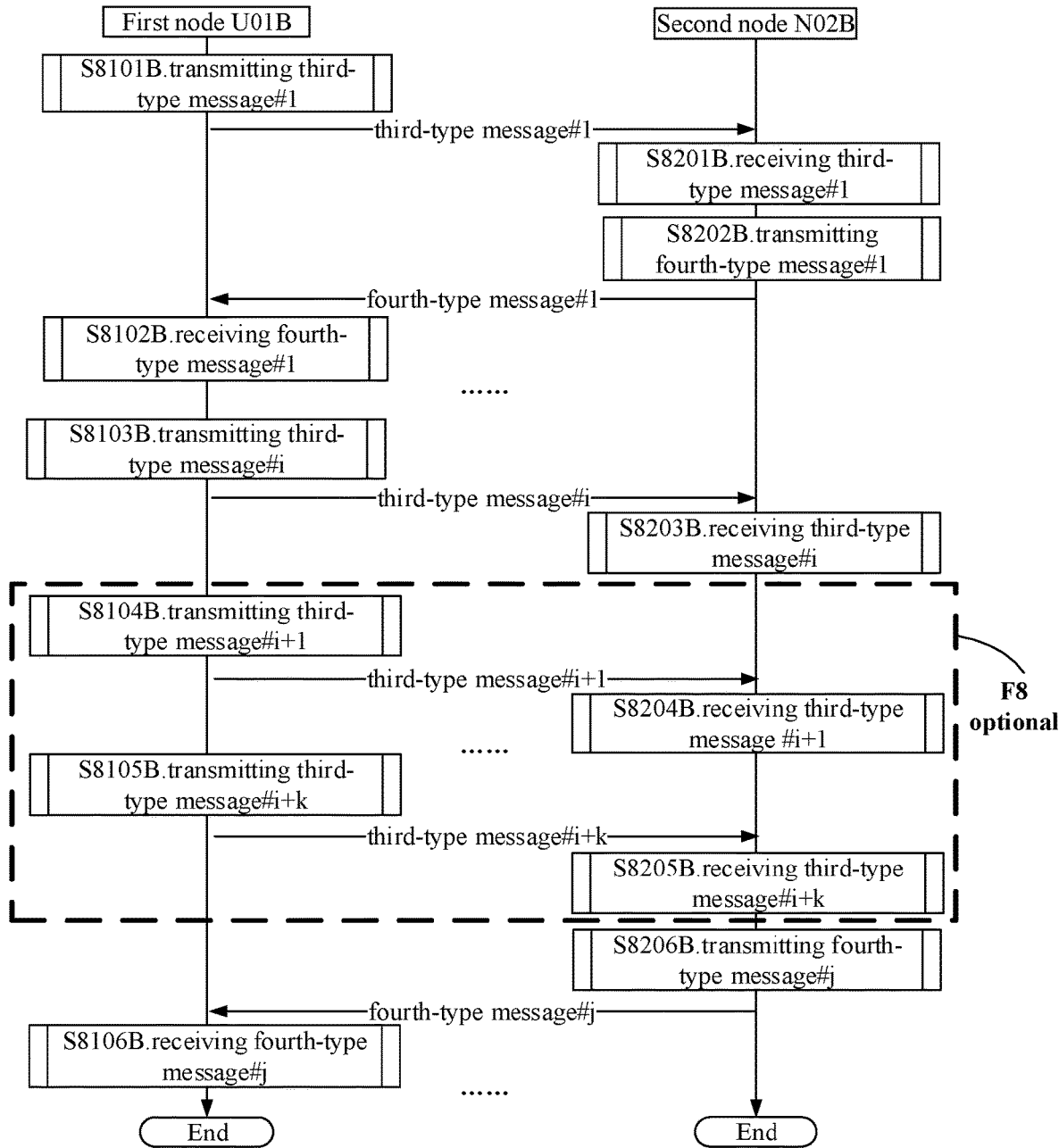
FIG. 8B illustrates a schematic diagram of transmission of a third message and a fourth message according to one embodiment of the present application.

Embodiment 8B illustrates a schematic diagram of transmission of a third message and a fourth message according to one embodiment of the present application, as shown in FIG. 8B. In FIG. 8B, each box represents a step; the ellipsis indicates the transmission of zero or one message or multiple messages; It should be particularly noted that the sequence illustrated herein does not set any limit to the signal transmission order or implementation order in the present application.

The first node U01B transmits a third-type message #1 in step S8101B; and receives a fourth-type message #1 in step S8102B; transmits a third-type message #i in step S8103B; transmits a third-type message #(i+1) in step S8104B; transmits a third-type message #(i+k) in step S8105B; and receives a fourth-type message #j in step S8106B.

The second node N02B receives the third-type message #1 in step S8201B; and transmits the fourth-type message #1 in step S8202B; receives the third-type message #i in step S8203B; receives the third-type message #(i+1) in step S8204B; receives the third-type message #(i+k) in step S8205B; and transmits the fourth-type message #j in step S7206B.

In Embodiment 8B, the first transmitter transmits Q1 third-type message(s); the second receiver monitors Q2 fourth-type message(s); herein, each of the Q1 third-type message(s) is related to the first data radio bearer; one of the Q1 third-type message(s) is used to trigger one of the Q2 fourth-type message(s); the third message is one of the Q1 third-type message(s); and the fourth message is one of the Q2 fourth-type message(s).

In one embodiment, Q1 is a positive integer, and Q1 is no greater than 10240.

In one embodiment, Q2 is a positive integer, and Q2 is no greater than 10240.

In one embodiment, Q1 is equal to 1, and Q2 is equal to 1.

In one embodiment, Q1 is greater than 1, and Q2 is greater than 1.

In one embodiment, Q1 is equal to Q2.

In one embodiment, Q1 is unequal to Q2.

In one embodiment, a third-type message #i is one of the Q1 third-type message(s), where i is an integer greater than 0 and no greater than Q1.

In one embodiment, a fourth-type message #j is one of the Q2 fourth-type message(s), where j is an integer greater than 0 and no greater than Q2.

In one embodiment, the third-type message #i comprises one or multiple retransmissions.

In one subembodiment, the retransmission comprises a Hybrid Automatic Repeat Request (HARQ) retransmission.

In one subembodiment, the retransmission is associated with a HARQ process.

In one subembodiment, the retransmission comprises a HARQ feedback.

In one subembodiment, the retransmission comprises an RLC retransmission.

In one subembodiment, the retransmission comprises a Status Report.

In one subembodiment, the retransmission comprises an RLC AM.

In one embodiment, the third-type message #i comprises no retransmission.

In one embodiment, the third-type message #1 is a first uplink transmission after the second signal.

In one embodiment, the third-type message #1 is a first uplink transmission after receiving an RRCRelease message or an RRCConnectionRelease message.

In one embodiment, the fourth-type message #Q2 is a last downlink transmission after an RRCRelease message or an RRCConnectionRelease message.

In one embodiment, the third-type message #i is transmitted by the first data radio bearer.

In one embodiment, the third-type message #i comprises a first indication, the first indication being used to determine whether there is data to be transmitted.

In one subembodiment, the first indication comprises one or multiple bits.

In one subembodiment, the first indication is a field in the third-type message #i.

In one embodiment, the third-type message #i comprises a BSR.

In one embodiment, the fourth-type message #j comprises a second indication, the second indication being used to determine whether to drop transmitting a packet via the first data radio bearer.

In one subembodiment, the second indication comprises one or multiple bits.

In one subembodiment, the second indication is a field in the fourth-type message #j.

In one embodiment, the fourth-type message #j comprises a PDCCH.

In one embodiment, the fourth-type message #j comprises a DCI.

In one embodiment, the fourth-type message #j comprises a UL Grant.

In one embodiment, the fourth-type message #j comprises a MAC CE.

In one embodiment, the fourth-type message #j comprises a Random Access Response (RAR).

In one embodiment, the fourth-type message #Q2 comprises an RRCRelease message or an RRCConnectionRelease message.

In one embodiment, the fourth-type message #Q2 comprises a suspendConfig IE.

In one embodiment, the dotted-line box F8 is optional.

In one embodiment, the dotted-line box F8 exists.

In one subembodiment, transmitting the third-type message #i includes transmitting the third-type message #i, transmitting the third-type message #(i+1) . . . , and transmitting the third-type message #(i+k), where k is a positive integer.

In one subembodiment, as a response to transmitting the third-type message #i, start the first timer; the third-type message #(i+1) . . . , and the third-type message #(i+k) are transmitted in the time while the first timer is running.

In one subembodiment, the third-type message #i, the third-type message #(i+1) . . . , and the third-type message #(i+k) use identical time-domain resources.

In one subembodiment, the third-type message #i, the third-type message #(i+1) . . . , and the third-type message #(i+k) use different time-domain resources.

In one subembodiment, the third-type message #i, the third-type message #(i+1) . . . , and the third-type message #(i+k) use identical frequency-domain resources.

In one subembodiment, the third-type message #i, the third-type message #(i+1) . . . , and the third-type message #(i+k) use different frequency-domain resources.

In one subembodiment, the third-type message #i, the third-type message #(i+1) . . . , and the third-type message #(i+k) correspond to a same fourth-type message #j.

In one embodiment, the dotted-line box F8 does not exist.

In one embodiment, the action of determining that a packet is to be transmitted via the first data radio bearer comprises: a third-type message #i being transmitted, and monitoring a fourth-type message #j corresponding to the third-type message #i.

In one embodiment, the action of determining that a packet is to be transmitted via the first data radio bearer comprises: a third-type message #i being transmitted, and monitoring a fourth-type message #j corresponding to the third-type message #i within a certain time interval.

In one subembodiment, the certain time interval comprises the first expiration value.

In one subembodiment, the phrase within a certain time interval comprises being no larger than the certain time interval.

In one subembodiment, the phrase within a certain time interval comprises being smaller than the certain time interval.

In one embodiment, the action of determining that a packet is to be transmitted via the first data radio bearer comprises: a third-type message #1 being transmitted, and monitoring a fourth-type message #Q2 corresponding to a third-type message #Q1.

In one embodiment, the action of determining that a packet is to be transmitted via the first data radio bearer comprises: a third-type message #1, a third-type message #2 . . . , and a third-type message #Q1 being transmitted, and monitoring a fourth-type message #Q2 corresponding to a third-type message #Q1.

In one embodiment, the action of determining that a packet is to be transmitted via the first data radio bearer comprises: a third-type message #1 being transmitted, and monitoring a fourth-type message #Q2 corresponding to a third-type message #Q1 within a given time interval.

In one subembodiment, the given time interval comprises the first expiration value.

In one subembodiment, the phrase within a given time interval comprises being no larger than the given time interval.

In one subembodiment, the phrase within a given time interval comprises being smaller than the given time interval.

In one embodiment, the action of determining that a packet is to be transmitted via the first data radio bearer comprises: a third-type message #1, a third-type message #2 . . . , and a third-type message #Q1 being transmitted, and monitoring a fourth-type message #Q2 corresponding to a third-type message #Q1 within a given time interval.

Embodiment 9A

Embodiment 9A illustrates a schematic diagram of a relation between a first timer and a second timer according to one embodiment of the present application, as shown in FIG. 9A. In FIG. 9A, the horizontal axis represents time, where T1A, T2A, a first time, T3A and T4A are five instances of time or time intervals in an ascending order in time; the solid-line box filled with slashes represents the running time of a first timer, the solid-line box filled with reticles represents the running time of a second timer, and the dotted-line box which is blank represents remaining time of the first timer.

In one embodiment, the dotted-line box F9.1A is optional.

In one subembodiment, at the time T1A, the first timer is started.

In one subembodiment, at the time T2A, the first timer is stopped.

In one embodiment, the dotted-line box F9.2A is optional.

In one subembodiment, at the time T1A, the first timer is started.

In one subembodiment, at the time T3A, the first timer is expired.

In one embodiment, the dotted-line box F9.3A is optional.

In one subembodiment, at the time T2A, the second timer is started.

In one subembodiment, at the time T3A, the first timer is expired.

In one embodiment, the dotted-line box F9.4A is optional.

In one subembodiment, at the time T2A, the second timer is started.

In one subembodiment, at the time T4A, the first timer is expired.

In one embodiment, the dotted-line box F9.1A and the dotted-line box F9.2A cannot co-exist.

In one embodiment, the dotted-line box F9.3A and the dotted-line box F9.4A cannot co-exist.

In one embodiment, the dotted-line box F9.1A and the dotted-line box F9.3A co-exist; or, the dotted-line box F9.1A and the dotted-line box F9.4A co-exist.

In one subembodiment, at the first time, the first timer does not reach the first expiration value.

In one subembodiment, at the first time, the second timer is running; the first timer being running is used to determine that a packet is to be transmitted via the first data radio bearer.

In one subembodiment, the first timer not reaching the first expiration value and the second timer being running are used to determine that transmitting the second message at the first time is dropped.

In one subembodiment, at the first time, when the first timer does not reach the first expiration value, if the second timer is running, drop transmitting the second message.

In one embodiment, the dotted-line box F9.2A coexists with the dotted-line box 9.3A or the dotted-line box F9.4A.

In one subembodiment, at the first time, the first timer reaches the first expiration value.

In one subembodiment, at the first time, the second timer is running; the first timer being running is used to determine that a packet is to be transmitted via the first data radio bearer.

In one subembodiment, the first timer reaching the first expiration value and the second timer being running are used to determine that transmitting the second message at the first time is dropped.

In one subembodiment, at the first time, when the first timer reaches the first expiration value, if the second timer is running, drop transmitting the second message.

In one embodiment, the dotted-line box F9.1A exists, while none of the dotted-line box F9.2A, the dotted-line box F9.3A and the dotted-line box F9.4A exists.

In one embodiment, the dotted-line box F9.2A exists, while none of the dotted-line box F9.1A, the dotted-line box F9.3A and the dotted-line box F9.4A exists.

In one subembodiment, at the first time, the first timer reaches the first expiration value.

In one subembodiment, at the first time, the second timer is not running.

In one subembodiment, the first timer reaching the first expiration value and the second timer not being running are used to determine that the second message is transmitted at the first time.

In one subembodiment, at the first time, when the first timer reaches the first expiration value, if the second timer is not running, transmit the second message.

In one embodiment, while the first timer is running, as a response to starting the second timer, stop the first timer; herein, the action of configuring a state of a second timer comprises the action of starting the second timer.

In one subembodiment, the sentence that "while the first timer is running, as a response to starting the second timer, stop the first timer" comprises that: while the first timer is running, as a response to determining that a packet is to be transmitted via the first data radio bearer, the first timer is stopped.

In one subembodiment, the sentence that "while the first timer is running, as a response to starting the second timer, stop the first timer" comprises that: while the first timer is running, as a response to determining that a packet is to be transmitted via the first data radio bearer, the second timer is started and the first timer is stopped.

In one embodiment, a time of starting the second timer is related to a reception of a first indication from lower layers; and a time of stopping the second timer is related to a reception of a second indication from lower layers; the first indication is used to determine a start of that a packet is to be transmitted via the first data radio bearer; the second indication is used to determine a stop of that a packet is to be transmitted via the first data radio bearer.

In one subembodiment, the phrase that a time of starting the second timer is related to a reception of a first indication from lower layers comprises: upon reception of the first indication from the lower layers, starting the second timer.

In one subembodiment, the phrase that a time of starting the second timer is related to a reception of a first indication from lower layers comprises: a reception of the first indication from the lower layers being used to determine to start the second timer.

In one subembodiment, the phrase that a time of stopping the second timer is related to a reception of a second indication from lower layers comprises: upon reception of the second indication from the lower layers, stopping the second timer.

In one subembodiment, the phrase that a time of stopping the second timer is related to a reception of a second indication from lower layers comprises: a reception of the second indication from the lower layers being used to determine to stop the second timer.

In one subembodiment, the first indication or the second indication comprises a notification between different protocol layers.

In one subembodiment, the first indication or the second indication comprises a notification between adjacent protocol layers.

In one subembodiment, the lower layers include protocol layers below an RRC layer.

In one subembodiment, the lower layers include a PDCP layer.

In one subembodiment, the lower layers include a MAC layer.

In one subembodiment, the lower layers include an RLC layer.

In one subembodiment, the lower layers include a PHY layer.

In one subembodiment, the first indication or the second indication is transmitted to the RRC layer of the first node by the lower layers of the first node.

In one subembodiment, the first indication or the second indication is transmitted to the PDCP layer of the first node by the lower layers of the first node.

In one subembodiment, the first indication or the second indication is transmitted to the MAC layer of the first node by the lower layers of the first node.

In one subembodiment, the first indication or the second indication is transmitted to the RLC layer of the first node by the lower layers of the first node.

In one embodiment, the phrase that the first indication is used to determine a start of that a packet is to be transmitted via the first data radio bearer comprises that: when it is determined that a packet starts to be transmitted via the first data radio bearer, the first indication is transmitted.

In one embodiment, the phrase that the first indication is used to determine a start of that a packet is to be transmitted via the first data radio bearer comprises that: the first indication indicates that a packet starts to be transmitted via the first data radio bearer.

In one embodiment, the phrase that the second indication is used to determine a stop of that a packet is to be transmitted via the first data radio bearer comprises that: when it is determined that transmitting a packet via the first data radio bearer is stopped, the second indication is transmitted.

In one embodiment, the phrase that the second indication is used to determine a stop of that a packet is to be transmitted via the first data radio bearer comprises that: the second indication indicates that transmitting a packet via the first data radio bearer is stopped.

In one embodiment, the phrase that the first timer is running comprises that: the first timer is keeping time.

In one embodiment, the phrase that the first timer is running comprises that: the first timer is larger than 0 and does not reach the first expiration value.

In one embodiment, the phrase that the first timer is running comprises that: the first timer is started.

In one embodiment, the phrase that the first timer is running comprises that: the first timer is started, and is not suspended.

In one embodiment, the phrase that the first timer is running comprises that: the first timer is expired, and is not restarted.

In one embodiment, the phrase that the first timer is running comprises that: the first timer is not stopped.

In one embodiment, the phrase that the first timer is running comprises that: a value of the first timer is updating as time changes.

In one embodiment, as a response to transmitting the first signal, start the second timer.

In one embodiment, as a response to transmitting the third message, start the second timer.

In one embodiment, as a response to transmitting the third-type message #1, start the second timer.

In one embodiment, as a response to transmitting the third-type message #i, start the second timer.

In one embodiment, as a response to transmitting the Msg1, start the second timer.

In one embodiment, as a response to transmitting the Msg3, start the second timer.

In one embodiment, as a response to transmitting the MsgA, start the second timer.

In one embodiment, as a response to receiving the second signal, stop the second timer.

In one embodiment, as a response to receiving the fourth message, stop the second timer.

In one embodiment, as a response to receiving the fourth-type message #Q2, stop the second timer.

In one embodiment, as a response to receiving the fourth-type message #j, stop the second timer.

In one embodiment, as a response to receiving the Msg2, stop the second timer.

In one embodiment, as a response to receiving the Msg4, stop the second timer.

In one embodiment, as a response to receiving the MsgB, stop the second timer.

In one embodiment, when the first timer expires, stay in the first state.

In one embodiment, when the first timer expires, enter into an RRC_IDLE state.

In one embodiment, when the first timer expires, enter into an RRC_INACTIVE state.

In one embodiment, when the first timer expires, drop transmitting a packet via the first data radio bearer.

In one embodiment, the phrase that as a response to starting the second timer comprises: as a response to determining that a packet is to be transmitted via the first data radio bearer.

In one embodiment, the phrase that as a response to starting the second timer comprises: as a response to transmitting the third message.

In one embodiment, the phrase that as a response to starting the second timer comprises: as a response to transmitting the first signal.

In one embodiment, the phrase of stopping the first timer comprises that: the first timer does not continue to count time.

In one embodiment, the phrase of stopping the first timer comprises that: the first timer does not continue to update.

In one embodiment, the phrase of stopping the first timer comprises that: a value of the first timer is set to an initial value.

In one embodiment, the phrase of stopping the first timer comprises that: the first timer is suspended.

In one embodiment, the phrase of stopping the first timer includes a meaning that: the value of the first timer does not reach the first expiration value.

Embodiment 9B

Embodiment 9B illustrates a schematic diagram of a first condition set being used to determine whether to maintain a first configuration set and enter into a first state according to one embodiment of the present application, as shown in FIG. 9B. In FIG. 9B, each box represents a step. It should be particularly noted that the sequence illustrated herein does not set any limit on the orders in which signals are transmitted and implementations in this present application.

In Embodiment 9B, receiving a first message in step S901, the first message being a Radio Resource Control (RRC) signaling, where a name of the first message includes RRC and Release; in step S902, determining whether a first condition set is satisfied, when a first condition set is satisfied, entering into step S903(a), otherwise, entering into step S903(b); and in step S903(a), as a response to a first condition set being satisfied, maintaining a first configuration set and entering into a first state, the first configuration set comprising a first data radio bearer, the first data radio bearer being a data radio bearer of a first cell group; in step S903(b), as a response to a first condition set not being satisfied, updating a first configuration set; and in step S904(b), entering into a first state; and in step S905(b), entering a third state.

In one embodiment, as a response to a first condition set not being satisfied, update the first configuration set.

In one embodiment, as a response to a first condition set not being satisfied, update the first configuration set and enter into the first state.

In one embodiment, as a response to a first condition set not being satisfied, update the first configuration set and enter into the third state.

In one embodiment, as a response to a first condition set not being satisfied, maintain the first configuration set and enter into a third state.

In one embodiment, as a response to a first condition set not being satisfied, maintain the first configuration set and enter into the first state.

In one embodiment, the action of updating a first configuration set comprises: modifying the first configuration set.

In one embodiment, the action of updating a first configuration set comprises: modifying configurations within the first configuration set.

In one embodiment, the action of updating a first configuration set comprises: resetting the first configuration set.

In one embodiment, the action of updating a first configuration set comprises: re-establishing the first configuration set.

In one embodiment, the action of updating a first configuration set comprises: suspending the first configuration set.

In one embodiment, the action of updating a first configuration set comprises: resetting a MAC and releasing default MAC cell group configurations.

In one embodiment, the action of updating a first configuration set comprises: re-establishing RLC entities of an SRB1.

In one embodiment, the action of updating a first configuration set comprises: suspending all SRBs other than an SRB0 and a Data Radio Bearer (DRB).

In one embodiment, the action of updating a first configuration set comprises: indicating that a PDCP is suspended at lower layers comprising all data radio bearers.

In one embodiment, the phrase of the first condition set not being satisfied comprises that: at least one condition in the first condition set is unsatisfied.

In one embodiment, the phrase of the first condition set not being satisfied comprises that: the action of receiving the first message is not satisfied, the first message being related to transmitting a packet via the first data radio bearer.

In one subembodiment, the meaning of the above sentence comprises: receiving the first message, the first message being unrelated to transmitting a packet via the first data radio bearer.

In one subembodiment, the meaning of the above sentence comprises: having received the first message, and the first message not being used for transmitting a packet via the first data radio bearer.

In one subembodiment, the meaning of the above sentence comprises: as a response to the action of transmitting a second message, the first message being received, where the second message is related to transmitting a packet via the first data radio bearer.

In one embodiment, the phrase of the first condition set not being satisfied comprises that: the action of receiving the first message being satisfied, and determining that transmitting a packet via the first data radio bearer is unsatisfied.

In one subembodiment, the meaning of the above sentence comprises: receiving the first message, the first message comprising a suspendConfig IE, and transmitting a packet via the first data radio bearer not being performed.

In one subembodiment, the meaning of the above sentence comprises: as a response to the action of transmitting a second message, the first message being received, where the second message comprises a RRCResumeRequest or a RRCResumeRequest1, while the first message comprises a suspendConfig IE, and transmitting a packet via the first data radio bearer not being performed.

In one embodiment, the phrase of transmitting a packet via the first data radio bearer not being performed comprises that: the first data radio bearer has no packet.

In one embodiment, the phrase of transmitting a packet via the first data radio bearer not being performed comprises that: the first data radio bearer is suspended.

In one embodiment, the phrase of transmitting a packet via the first data radio bearer not being performed comprises that: a PDCP entity corresponding to the first data radio bearer is not established or re-established.

In one embodiment, the phrase of transmitting a packet via the first data radio bearer not being performed comprises that: an RLC entity of a PDCP entity corresponding to the first data radio bearer is not established or re-established.

In one embodiment, the phrase of the first condition set not being satisfied comprises that: the action of receiving the first message is satisfied, and a first timer being running is not satisfied.

In one subembodiment, the meaning of the above sentence comprises: receiving the first message, the first message comprising a suspendConfig IE, and the first timer not being running.

In one subembodiment, the meaning of the above sentence comprises: as a response to the action of transmitting a second message, the first message being received, where the second message comprises a RRCResumeRequest or a RRCResumeRequest1 or a RRCConnectionResumeRequest, while the first message comprises a suspendConfig IE, and the first timer not being running.

In one embodiment, the phrase of the first timer not being running comprises that: the first timer is not started.

In one embodiment, the phrase of the first timer not being running comprises that: the first timer is started, and is suspended.

In one embodiment, the phrase of the first timer not being running comprises that: the first timer is not keeping time.

In one embodiment, the phrase of the first timer not being running comprises that: the first timer is expired, and is not restarted.

In one embodiment, the phrase of the first timer not being running comprises that: the first timer is stopped, and is not restarted.

In one embodiment, the phrase of the first timer not being running comprises that: the first timer is stopped, and is not restarted.

In one embodiment, the phrase of the first timer not being running comprises that: the first timer retains an initial value.

In one subembodiment, the initial value is equal to 0.

In one subembodiment, the initial value is greater than 0.

In one embodiment, the third state is an RRC state different from the first state.

In one embodiment, the third state includes an RRC_IDLE state.

In one embodiment, the third state includes an RRC_INACTIVE state.

In one embodiment, the third state includes an RRC_CONNECTED state.

In one embodiment, the first state includes an RRC_INACTIVE state, while the third state includes an RRC_IDLE state.

In one embodiment, the first state includes an RRC_INACTIVE state, while the third state includes an RRC_CONNECTED state.

In one embodiment, the first state includes an RRC_IDLE state, while the third state includes an RRC_INACTIVE state.

In one embodiment, the first state includes an RRC_IDLE state, while the third state includes an RRC_CONNECTED state.

In one embodiment, the dotted-line box F9.1B is optional.

In one embodiment, the dotted-line box F9.2B is optional.

In one embodiment, the dotted-line box F9.1B and the dotted-line box F9.2B cannot co-exist.

In one subembodiment, the dotted-line box F9.1B exists, while the dotted-line box F9.2B does not exist.

In one subembodiment, the dotted-line box F9.1B does not exist, while the dotted-line box F9.2B exists.

In one embodiment, neither of the dotted-line box F9.1B and the dotted-line box F9.2B exists.

Embodiment 10A

Embodiment 10A illustrates a schematic diagram of transmitting a second message at a second time according to one embodiment of the present application, as shown in FIG. 10A.

In Embodiment 10A, as a response to dropping transmitting the second message at the first time, transmitting the second message at a second time; herein, a time interval between the second time and the first time is related to transmitting a packet via the first data radio bearer.

In one embodiment, the second time includes a time at which transmitting a packet via the first data radio bearer is stopped.

In one embodiment, the second time includes a time at which the first timer is expired after transmitting a packet via the first data radio bearer is stopped.

In one embodiment, the second time includes a time at which the second timer is stopped.

In one embodiment, the second time includes a time at which the fourth message is received.

In one embodiment, the second time includes a time at which the second message is configured completely.

In one embodiment, the phrase that a time interval between the second time and the first time is related to transmitting a packet via the first data radio bearer comprises that: all of the time interval between the second time and the first time is used for transmitting data packet through the first Data Radio Bearer (DRB).

In one embodiment, the phrase that a time interval between the second time and the first time is related to transmitting a packet via the first data radio bearer comprises that: part of the time interval between the second time and the first time is used for transmitting data packet through the first Data Radio Bearer (DRB).

In one embodiment, the phrase that a time interval between the second time and the first time is related to transmitting a packet via the first data radio bearer comprises that: from the first time to the second time, a packet is transmitted via the first data radio bearer.

In one embodiment, the time interval between the second time and the first time comprises a positive number of millisecond(s).

In one embodiment, the time interval between the second time and the first time is a consecutive period of time.

In one embodiment, within the time interval between the second time and the first time, the first timer is in a stopped state.

In one subembodiment, as a response to determining that a packet is to be transmitted via the first data radio bearer, the first timer is stopped.

In one embodiment, within the time interval between the second time and the first time, the first timer restarts to count time after being stopped.

In one subembodiment, as a response to determining that a packet is to be transmitted via the first data radio bearer, the first timer is stopped.

In one subembodiment, as a response to a stop of transmitting a packet via the first data radio bearer, the first timer is started; as a response to the first timer being expired, the second message is transmitted at a second time.

In one embodiment, within the time interval between the second time and the first time, the first timer is in a suspended state.

In one subembodiment, as a response to determining that a packet is to be transmitted via the first data radio bearer, the first timer is suspended.

In one subembodiment, as a response to a stop of transmitting a packet via the first data radio bearer, the first timer is resumed.

In one subembodiment, as a response to a stop of transmitting a packet via the first data radio bearer, the first timer is resumed; at the second time, the first timer is expired; as a response to the first timer being expired, the second message is transmitted at a second time.

In one subembodiment, the meaning of suspending includes to stop counting time.

In one subembodiment, the meaning of suspending includes to stop counting time and retain a current value.

In one subembodiment, the meaning of suspending includes to suspend.

In one subembodiment, the meaning of resuming includes to continue to count time.

In one subembodiment, the meaning of resuming includes to continue to count time based on the current value.

In one subembodiment, the meaning of resuming includes to resume.

In one embodiment, within the time interval between the second time and the first time, the first timer restarts to count time after being suspended.

In one subembodiment, as a response to determining that a packet is to be transmitted via the first data radio bearer, the first timer is suspended.

In one subembodiment, as a response to a stop of transmitting a packet via the first data radio bearer, the first timer is resumed; as a response to the first timer being expired, the second message is transmitted at a second time.

In one embodiment, within the time interval between the second time and the first time, the first timer is restarted.

In one subembodiment, at a first time, as a response to transmitting a packet via the first data radio bearer, the first timer is restarted.

In one subembodiment, at a second time, as a response to not transmitting a packet via the first data radio bearer, the second message is transmitted.

Embodiment 10B

Embodiment 10B illustrates a schematic diagram of a first timer according to one embodiment of the present application, as shown in FIG. 10B. In FIG. 10B, the horizontal axis represents time, where T1B, T2B and T3B are respectively three instances of time in an ascending order in time; at the T1B, start a first timer, at the T2B, stop the first timer, and at the T3B, the first timer expires; the solid-line box filled with slashes represents the running time of the first timer, while the solid-line box which is blank represents remaining time of the first timer.

In Embodiment 10B, a time of starting the first timer is no later than the action of transmitting the third message; a condition of stopping the first timer includes receiving the fourth message.

In one embodiment, remaining time of the first timer is equal to a difference between the first expiration value of the first timer and the current running time of the first timer.

In one embodiment, a difference between the T2B and the T1B is no larger than the first expiration value.

In one embodiment, a difference between the T2B and the T1B is smaller than the first expiration value.

In one embodiment, a difference between the T3B and the T1B is equal to the first expiration value.

In one embodiment, a difference between the T3B and the T2B is equal to the remaining time of the first timer.

In one embodiment, transmitting the first signal is used to determine to start the first timer.

In one embodiment, transmitting the third message is used to determine to start the first timer.

In one subembodiment, the third message includes the third-type message #1 in the present application.

In one embodiment, upon reception of the notification, the first timer is started.

In one embodiment, a condition of stopping the first timer includes receiving the fourth message.

In one subembodiment, the fourth message comprises a downlink transmission for the third message.

In one subembodiment, the fourth message comprises the fourth-type message #Q2.

In one embodiment, receiving the fourth message is used to determine that the first timer is stopped.

In one embodiment, receiving the second signal is used to determine that the first timer is stopped.

In one embodiment, upon reception of the other notification, the first timer is stopped.

In one embodiment, the first timer reaching the first expiration value is used to determine that the first timer is expired.

In one embodiment, the dotted-line box F10.1 is optional.

In one embodiment, the dotted-line box F10.2 is optional.

In one embodiment, either of the dotted-line box F10.1 and the dotted-line box F10.2 exists.

In one subembodiment, the dotted-line box F10.1 exists, while the dotted-line box F10.2 does not exist.

In one subsidiary embodiment of the above subembodiment, a time interval between the T2B and the T1B is used to determine that the first timer is running.

In one subsidiary embodiment of the above subembodiment, the first timer is started, and the first timer has not reached the first expiration value, and the first timer not being stopped is used to determine that the first timer is running.

In one subsidiary embodiment of the above subembodiment, a duration between the T1B and the T2B is the running time of the first timer.

In one subembodiment, the dotted-line box F10.1 does not exist, while the dotted-line box F10.2 exists.

In one subsidiary embodiment of the above subembodiment, during the time while the first timer is running, the fourth message is not received.

In one subsidiary embodiment of the above subembodiment, the first timer is expired at the time T3B.

In one subsidiary embodiment of the above subembodiment, a duration between the T1B and the T3B is the running time of the first timer.

Embodiment 11A

Embodiment 11A illustrates a schematic diagram of determining whether to transmit a second message at a first time according to a state of a second timer according to one embodiment of the present application.

In Embodiment 11A, the first node in the present application receives a first signaling; configures a state of a second timer according to whether a packet is to be transmitted via the first data radio bearer; and determines whether to transmit the second message at the first time according to the state of the second timer; herein, the first signaling indicates a second expiration value of the second timer; the first timer is different from the second timer.

In one embodiment, the action of configuring a state of a second timer according to whether a packet is to be transmitted via the first data radio bearer comprises that: configuring a state of the second timer is related to whether a packet is to be transmitted via the first data radio bearer.

In one embodiment, the action of configuring a state of a second timer according to whether a packet is to be transmitted via the first data radio bearer comprises that: configuring a state of the second timer is related to determining whether a packet is to be transmitted via the first data radio bearer.

In one embodiment, the action of configuring a state of a second timer according to whether a packet is to be transmitted via the first data radio bearer comprises that: configuring a state of the second timer is related to whether a packet is being transmitted via the first data radio bearer.

In one embodiment, the action of configuring a state of a second timer according to whether a packet is to be transmitted via the first data radio bearer comprises that: determining that a packet is to be transmitted via the first data radio bearer is used to determine to start the second timer.

In one embodiment, the action of configuring a state of a second timer according to whether a packet is to be transmitted via the first data radio bearer comprises that: determining that a packet is not to be transmitted via the first data radio bearer is not used to determine to start the second timer.

In one embodiment, the action of configuring a state of a second timer according to whether a packet is to be transmitted via the first data radio bearer comprises that: a start of execution of transmitting a packet via the first data radio bearer is used to determine to start the second timer.

In one embodiment, the action of configuring a state of a second timer according to whether a packet is to be transmitted via the first data radio bearer comprises that: a start of execution of transmitting a packet via the first data radio bearer is used to determine to start the second timer.

In one embodiment, the action of configuring a state of a second timer according to whether a packet is to be transmitted via the first data radio bearer comprises that: determining a start of execution of transmitting a packet via the first data radio bearer is used to determine to restart the second timer.

In one embodiment, the action of configuring a state of a second timer according to whether a packet is to be transmitted via the first data radio bearer comprises that: a stop of transmitting a packet via the first data radio bearer is used to determine to stop the second timer.

In one embodiment, the action of configuring a state of a second timer according to whether a packet is to be transmitted via the first data radio bearer comprises that: a successful completion of transmitting a packet via the first data radio bearer is used to determine to stop the second timer.

In one embodiment, the action of determining whether to transmit the second message at the first time according to the state of the second timer comprises that: whether to transmit the second message at the first time is related to the state of the second timer.

In one embodiment, the action of determining whether to transmit the second message at the first time according to the state of the second timer comprises that: the state of the second timer is a condition of determining whether to transmit the second message at the first time.

In one embodiment, the action of determining whether to transmit the second message at the first time according to the state of the second timer comprises that: the state of the second timer is a condition among multiple conditions of determining whether to transmit the second message at the first time.

In one embodiment, the action of determining whether to transmit the second message at the first time according to the state of the second timer comprises that: the second timer being running is used to determine to drop transmitting the second message at the first time.

In one embodiment, the action of determining whether to transmit the second message at the first time according to the state of the second timer comprises that: the second timer not being running is used to determine to transmit the second message at the first time.

In one embodiment, at a first time, if the second timer is running, drop transmitting the second message.

In one embodiment, at a first time, if the second timer is not running, transmit the second message.

In one embodiment, at a first time, if the second timer is running, no matter whether other conditions among the multiple conditions are satisfied, drop transmitting the second message.

In one embodiment, at a first time, if the second timer is not running, and other conditions among the multiple conditions are satisfied, transmit the second message.

Embodiment 11B

Embodiment 11B illustrates a schematic diagram of a first timer according to another embodiment of the present application, as shown in FIG. 11B. In FIG. 11B, the horizontal axis represents time, where T4B, T5B, T6B and T7B represent four instances of time; the solid-line box filled with slashes represents the running time of a first timer.

In Embodiment 11B, the first transmitter transmits Q1 third-type message(s); the second receiver monitors Q2 fourth-type message(s); herein, each of the Q1 third-type message(s) is related to the first data radio bearer; one of the Q1 third-type message(s) is used to trigger one of the Q2 fourth-type message(s); the third message is one of the Q1 third-type message(s); and the fourth message is one of the Q2 fourth-type message(s); a time of starting the first timer is no later than the action of transmitting the third message; a condition of stopping the first timer includes receiving the fourth message.

In one embodiment, transmitting the third-type message #i, and as a response to transmitting the third-type message #i, starting or restarting the first timer; as a response to the action of transmitting the third-type message #i, receiving the fourth-type message #j, and as a response to receiving the fourth-type message #j, stopping the first timer.

In one embodiment, at the time T4B, as a response to transmitting a third-type message #1, start the first timer; at the time T5B, as a response to receiving a fourth-type message #1, stop the first timer; at the time T6B, as a response to transmitting a third-type message #i, restart the first timer; at the time T7B, as a response to receiving a fourth-type message #j, stop the first timer.

In one embodiment, for a same time of running of the first timer, i is equal to j.

In one embodiment, for a same time of running of the first timer, i is unequal to j.

In one embodiment, the T4B, T5B, T6B and T7B are fourth instances of time in an ascending order in time.

In one embodiment, the time T5B and the time T6B are the same instance of time.

In one embodiment, there is a time interval being comprised between the time T5B and the time T6B.

In one subembodiment, the time interval comprises a positive integer number of slot(s).

In one subembodiment, the time interval comprises a positive number of millisecond(s).

In one embodiment, the first timer is started per uplink transmission.

Embodiment 12A

Embodiment 12A illustrates a schematic diagram illustrating that a third message is one of Q1 third-type message(s) and a fourth message is one of Q2 fourth-type message(s) according to one embodiment of the present application, as shown in FIG. 12A.

In Embodiment 12A, the first node in the present application transmits Q1 third-type message(s); and monitors Q2 fourth-type message(s); herein, each of the Q1 third-type message(s) is related to the first data radio bearer; one of the Q1 third-type message(s) is used to trigger one of the Q2 fourth-type message(s); the third message is one of the Q1 third-type message(s); and the fourth message is one of the Q2 fourth-type message(s).

In one embodiment, Q1 is a positive integer, and Q1 is no greater than 10240.

In one embodiment, Q2 is a positive integer, and Q2 is no greater than 10240.

In one embodiment, Q1 is equal to 1, and Q2 is equal to 1.

In one embodiment, Q1 is greater than 1, and Q2 is greater than 1.

In one embodiment, Q1 is equal to Q2.

In one embodiment, Q1 is unequal to Q2.

In one embodiment, a third-type message #i is one of the Q1 third-type message(s), where i is an integer greater than 0 and no greater than Q1.

In one embodiment, a fourth-type message #j is one of the Q2 fourth-type message(s), where j is an integer greater than 0 and no greater than Q2.

In one embodiment, the third-type message #i comprises one or multiple retransmissions.

In one embodiment, the third-type message #1 is a first uplink transmission after the second signal.

In one embodiment, the third-type message #1 is a first uplink transmission after receiving an RRCRelease message or an RRCConnectionRelease message.

In one embodiment, the third-type message #1 is a first uplink transmission before receiving an RRCRelease message or an RRCConnectionRelease message.

In one embodiment, the fourth-type message #Q2 is a last downlink transmission after an RRCRelease message or an RRCConnectionRelease message.

In one embodiment, the fourth-type message #Q2 is a last downlink transmission before an RRCRelease message or an RRCConnectionRelease message.

In one embodiment, the third-type message #i is transmitted by the first data radio bearer.

In one embodiment, the third-type message #i comprises a first indication, the first indication being used to determine whether there is data to be transmitted.

In one subembodiment, the first indication comprises one or multiple bits.

In one subembodiment, the first indication is a field in the third-type message #i.

In one embodiment, the third-type message #i comprises a BSR.

In one embodiment, the fourth-type message #j comprises a second indication, the second indication being used to determine whether to drop transmitting a packet via the first data radio bearer.

In one subembodiment, the second indication comprises one or multiple bits.

In one subembodiment, the second indication is a field in the fourth-type message #j.

In one embodiment, the fourth-type message #j comprises a PDCCH.

In one embodiment, the fourth-type message #j comprises a DCI.

In one embodiment, the fourth-type message #j comprises a UL Grant.

In one embodiment, the fourth-type message #j comprises a MAC CE.

In one embodiment, the fourth-type message #j comprises a Random Access Response (RAR).

In one embodiment, the fourth-type message #Q2 comprises an RRCRelease message or an RRCConnectionRelease message.

In one embodiment, the fourth-type message #Q2 comprises a suspendConfig IE.

Embodiment 12B

Embodiment 12B illustrates a structure block diagram of a processing device used in a first node according to one embodiment of the present application; as shown in FIG. 12B. In FIG. 12B, a processing device 1200 in a first node is comprised of a first receiver 1201 and a first transmitter 1202.

The first receiver 1201 receives a first message, the first message being a Radio Resource Control (RRC) signaling, where a name of the first message includes RRC and Release; as a response to a first condition set being satisfied, maintains a first configuration set and enters into a first state, the first configuration set comprising a first data radio bearer, the first data radio bearer being a data radio bearer of a first cell group.

In Embodiment 12B, the first condition set comprises the action of receiving the first message, where the first state is an RRC state other than an RRC Connected state.

In one embodiment, the first transmitter 1202 transmits a second message, the second message being used to trigger the first message.

In one embodiment, the first transmitter 1202 transmits a third message; the first receiver 1201 monitors a fourth message; herein, the third message is related to the first data radio bearer; the third message is used to trigger the fourth message.

In one embodiment, the first receiver 1201 receives a first signaling; herein, the first signaling indicates a first expiration value of a first timer, the first timer being related to the first data radio bearer; the first condition set comprises the first timer being running.

In one embodiment, a time of starting the first timer is no later than the action of transmitting the third message; a condition of stopping the first timer includes receiving the fourth message.

In one embodiment, the first transmitter 1202 transmits a first signal; the first receiver 1201, as a response to the action of transmitting a first signal, receives a second signal; herein, the first signal is used for a random access procedure; the first signal is used to determine that a packet is to be transmitted via the first data radio bearer.

In one embodiment, the first condition set comprises determining that a packet is to be transmitted via the first data radio bearer.

In one embodiment, the first receiver 1201 comprises the antenna 452, the receiver 454, the multi-antenna receiving processor 458, the receiving processor 456, the controller/processor 459, the memory 460 and the data source 467 in FIG. 4 of the present application.

In one embodiment, the first receiver 1201 comprises the antenna 452, the receiver 454, the multi-antenna receiving processor 458 and the receiving processor 456 in FIG. 4 of the present application.

In one embodiment, the first receiver 1201 comprises the antenna 452, the receiver 454 and the receiving processor 456 in FIG. 4 of the present application.

In one embodiment, the first transmitter 1202 comprises the antenna 452, the transmitter 454, the multi-antenna transmitting processor 457, the transmitting processor 468, the controller/processor 459, the memory 460 and the data source 467 in FIG. 4 of the present application.

In one embodiment, the first transmitter 1202 comprises the antenna 452, the transmitter 454, the multi-antenna transmitting processor 457 and the transmitting processor 468 in FIG. 4 of the present application.

In one embodiment, the first transmitter 1202 comprises the antenna 452, the transmitter 454 and the transmitting processor 468 in FIG. 4 of the present application.

Embodiment 13A

Figure 13A:
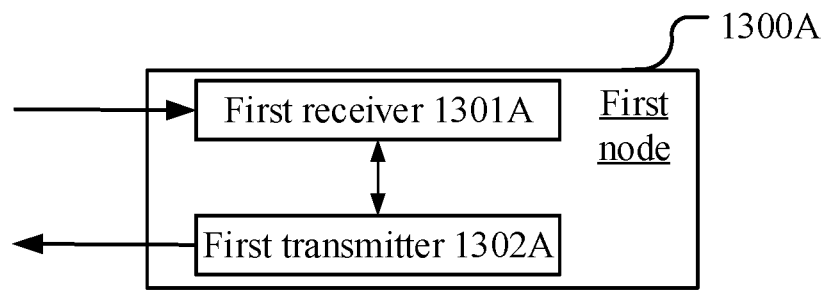
FIG. 13A illustrates a structure block diagram of a processing device used in a first node according to one embodiment of the present application.

Embodiment 13A illustrates a structure block diagram of a processing device used in a first node according to one embodiment of the present application; as shown in FIG. 13A. In FIG. 13A, a processing device 1300A in a first node is comprised of a first receiver 1301A and a first transmitter 1302A.

The first receiver 1301A receives a first message; and as a response to the action of receiving a first message, starts a first timer; and the first transmitter 1302A determines whether to transmit a second message at a first time according to whether a packet is to be transmitted via a first data radio bearer.

In Embodiment 13, the first message is a Radio Resource Control (RRC) signaling, where a name of the first message includes RRC and Release, the first message indicating a first expiration value of the first timer; a time interval from the first time to the starting action of the first timer is no smaller than the first expiration value of the first timer; the second message is used to determine an update of a first area; the first data radio bearer is a data radio bearer of a first cell group.

In one embodiment, the first transmitter 1302A transmits a first signal; the first receiver 1301A, as a response to the action of transmitting a first signal, receives a second signal; herein, the first signal is used for a random access procedure; the first signal is used to determine that a packet is to be transmitted via the first data radio bearer.

In one embodiment, the first transmitter 1302A transmits a third message; the first receiver 1301A monitors a fourth message; herein, a packet transmitted via the first data radio bearer comprises the third message; the third message is used to trigger the fourth message.

In one embodiment, the first receiver 1301A receives a first signaling; configures a state of a second timer according to whether a packet is to be transmitted via the first data radio bearer; and the first transmitter 1302A determines whether to transmit the second message at the first time according to the state of the second timer; herein, the first signaling indicates a second expiration value of the second timer; the first timer is different from the second timer.

In one embodiment, the first receiver 1301A, while the first timer is running, stops the first timer as a response to starting the second timer; herein, the action of configuring a state of a second timer comprises the action of starting the second timer.

In one embodiment, a time of starting the second timer is related to a reception of a first indication from lower layers; and a time of stopping the second timer is related to a reception of a second indication from lower layers; the first indication is used to determine a start of that a packet is to be transmitted via the first data radio bearer; the second indication is used to determine a stop of that a packet is to be transmitted via the first data radio bearer.

In one embodiment, the first transmitter 1302A, as a response to dropping transmitting the second message at the first time, transmits the second message at a second time; herein, a time interval between the second time and the first time is related to transmitting a packet via the first data radio bearer.

In one embodiment, the first receiver 1301A comprises the antenna 452, the receiver 454, the multi-antenna receiving processor 458, the receiving processor 456, the controller/processor 459, the memory 460 and the data source 467 in FIG. 4 of the present application.

In one embodiment, the first receiver 1301A comprises the antenna 452, the receiver 454, the multi-antenna receiving processor 458 and the receiving processor 456 in FIG. 4 of the present application.

In one embodiment, the first receiver 1301A comprises the antenna 452, the receiver 454 and the receiving processor 456 in FIG. 4 of the present application.

In one embodiment, the first transmitter 1302A comprises the antenna 452, the transmitter 454, the multi-antenna transmitting processor 457, the transmitting processor 468, the controller/processor 459, the memory 460 and the data source 467 in FIG. 4 of the present application.

In one embodiment, the first transmitter 1302A comprises the antenna 452, the transmitter 454, the multi-antenna transmitting processor 457 and the transmitting processor 468 in FIG. 4 of the present application.

In one embodiment, the first transmitter 1302A comprises the antenna 452, the transmitter 454 and the transmitting processor 468 in FIG. 4 of the present application.

Embodiment 13B

Figure 13B:
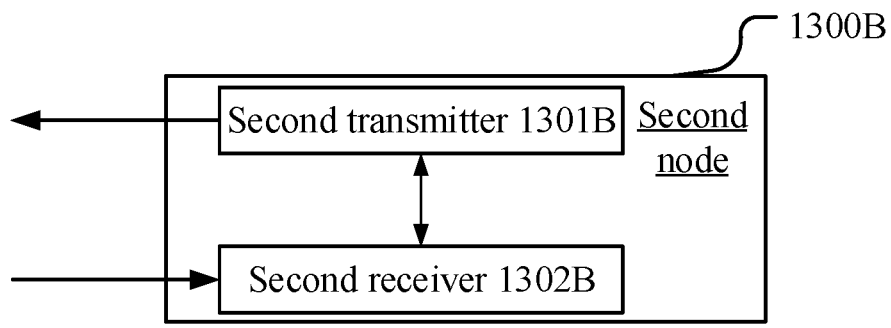
FIG. 13B illustrates a structure block diagram of a processing device used in a second node according to one embodiment of the present application.

Embodiment 13B illustrates a structure block diagram of a processing device used in a second node according to one embodiment of the present application; as shown in FIG. 13B. In FIG. 13B, a processing device 1300B in a second node comprises a second transmitter 1301B and a second receiver 1302B.

The second transmitter 1301B transmits a first message, the first message being a Radio Resource Control (RRC) signaling, where a name of the first message includes RRC and Release;

in Embodiment 13B, as a response to a first condition set being satisfied, a first configuration set is maintained and a first state is entered, the first configuration set comprising a first data radio bearer, the first data radio bearer being a data radio bearer of a first cell group; the first condition set comprises the action of receiving the first message, where the first state is an RRC state other than an RRC Connected state.

In one embodiment, the second receiver 1302B receives a second message, the second message being used to trigger the first message.

In one embodiment, the second receiver 1302B receives a third message; the second transmitter 1301B, upon reception of the third message, transmits a fourth message; herein, the third message is related to the first data radio bearer; the third message is used to trigger the fourth message.

In one embodiment, the second transmitter 1301B transmits a first signaling; herein, the first signaling indicates a first expiration value of a first timer, the first timer being related to the first data radio bearer; the first condition set comprises the first timer being running.

In one embodiment, a time of starting the first timer is no later than the action of transmitting the third message; a condition of stopping the first timer includes receiving the fourth message.

In one embodiment, the second receiver 1302B receives a first signal; the second transmitter 1301B transmits a second signal as a response to the action of transmitting a first signal; herein, the first signal is used for a random access procedure; the first signal is used to determine that a packet is to be transmitted via the first data radio bearer.

In one embodiment, the first condition set comprises determining that a packet is to be transmitted via the first data radio bearer.

In one embodiment, the second transmitter 1301B comprises the antenna 420, the transmitter 418, the multi-antenna transmitting processor 471, the transmitting processor 416, the controller/processor 475 and the memory 476 in FIG. 4 of the present application.

In one embodiment, the second transmitter 1301B comprises the antenna 420, the transmitter 418, the multi-antenna transmitting processor 471 and the transmitting processor 416 in FIG. 4 of the present application.

In one embodiment, the second transmitter 1301B comprises the antenna 420, the transmitter 418 and the transmitting processor 416 in FIG. 4 of the present application.

In one embodiment, the second receiver 1302B comprises the antenna 420, the receiver 418, the multi-antenna receiving processor 472, the receiving processor 470, the controller/processor 475 and the memory 476 in FIG. 4 of the present application.

In one embodiment, the second receiver 1302B comprises the antenna 420, the receiver 418, the multi-antenna receiving processor 472 and the receiving processor 470 in FIG. 4 of the present application.

In one embodiment, the second receiver 1302B comprises the antenna 420, the receiver 418 and the receiving processor 470 in FIG. 4 of the present application.

Embodiment 14

Figure 14:
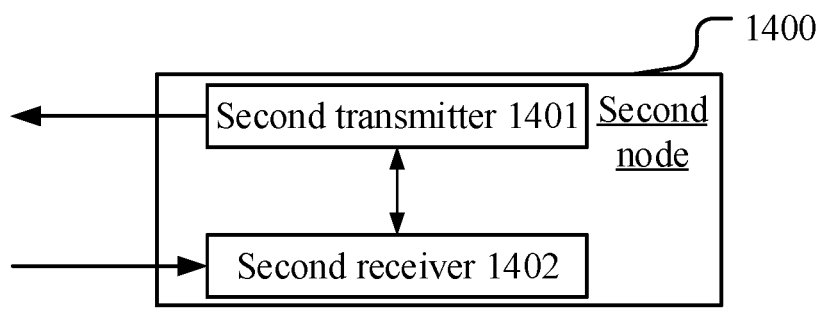
FIG. 14 illustrates a structure block diagram of a processing device used in a second node according to one embodiment of the present application.

Embodiment 14 illustrates a structure block diagram of a processing device used in a second node according to one embodiment of the present application; as shown in FIG. 14. In FIG. 14, a processing device 1400 in a second node comprises a second transmitter 1401 and a second receiver 1402.

The second transmitter 1401 transmits a first message;
the second receiver 1402 monitors a second message.

In Embodiment 14, as a response to the first message being received, a first timer is started; whether the second message is transmitted at a first time is determined according to whether a packet is to be transmitted via a first data radio bearer; the first message is an RRC signaling, where a name of the first message includes RRC and Release, the first message indicating a first expiration value of the first timer; a time interval from the first time to the starting action of the first timer is no smaller than the first expiration value of the first timer; the second message is used to determine an update of a first area; the first data radio bearer is a data radio bearer of a first cell group.

In one embodiment, the first message is received by the first node.

In one embodiment, the first timer is started by the first node.

In one embodiment, a transmitter of the second message includes the first node.

In one embodiment, the second receiver 1402 receives a first signal; the second transmitter 1401 transmits a second signal as a response to the action of receiving a first signal; herein, the first signal is used for a random access procedure; the first signal is used to determine that a packet is to be transmitted via the first data radio bearer.

In one embodiment, the second receiver 1402 monitors a third message; the second transmitter 1401, upon reception of the third message, transmits a fourth message; herein, a packet transmitted via the first data radio bearer comprises the third message; the third message is used to trigger the fourth message.

In one embodiment, the second transmitter 1401 transmits a first signaling; the second receiver 1402 receives a second message; herein, a state of a second timer is configured according to whether a packet is to be transmitted via the first data radio bearer; and whether the second message is transmitted at the first time is determined according to the state of the second timer; the first signaling indicates a second expiration value of the second timer; the first timer is different from the second timer.

In one embodiment, the state of the second timer is configured in the first node.

In one embodiment, while the first timer is running, as a response to starting the second timer, the first timer is stopped; the action of configuring a state of a second timer comprises the action of starting the second timer.

In one embodiment, a time of starting the second timer is related to a reception of a first indication from lower layers; and a time of stopping the second timer is related to a reception of a second indication from lower layers; the first indication is used to determine a start of that a packet is to be transmitted via the first data radio bearer; the second indication is used to determine a stop of that a packet is to be transmitted via the first data radio bearer.

In one embodiment, the second receiver 1402 receives a second message; herein, in response to transmitting of the second message being dropped at the first time, the second message is transmitted at a second time; a time interval between the second time and the first time is related to transmitting data packet through the first Data Radio Bearer (DRB).

In one embodiment, the second transmitter 1401 comprises the antenna 420, the transmitter 418, the multi-antenna transmitting processor 471, the transmitting processor 416, the controller/processor 475 and the memory 476 in FIG. 4 of the present application.

In one embodiment, the second transmitter 1401 comprises the antenna 420, the transmitter 418, the multi-antenna transmitting processor 471 and the transmitting processor 416 in FIG. 4 of the present application.

In one embodiment, the second transmitter 1401 comprises the antenna 420, the transmitter 418 and the transmitting processor 416 in FIG. 4 of the present application.

In one embodiment, the second receiver 1402 comprises the antenna 420, the receiver 418, the multi-antenna receiving processor 472, the receiving processor 470, the controller/processor 475 and the memory 476 in FIG. 4 of the present application.

In one embodiment, the second receiver 1402 comprises the antenna 420, the receiver 418, the multi-antenna receiving processor 472 and the receiving processor 470 in FIG. 4 of the present application.

In one embodiment, the second receiver 1402 comprises the antenna 420, the receiver 418 and the receiving processor 470 in FIG. 4 of the present application.

The ordinary skill in the art may understand that all or part of steps in the above method may be implemented by instructing related hardware through a program. The program may be stored in a computer readable storage medium, for example Read-Only-Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The present application is not limited to any combination of hardware and software in specific forms. The UE and terminal in the present application include but are not limited to unmanned aerial vehicles, communication modules on unmanned aerial vehicles, telecontrolled aircrafts, aircrafts, diminutive airplanes, mobile phones, tablet computers, notebooks, vehicle-mounted communication equipment, wireless sensor, network cards, terminals for Internet of Things (JOT), RFID terminals, NB-IOT terminals, Machine Type Communication (MTC) terminals, enhanced MTC (eMTC) terminals, data cards, low-cost mobile phones, low-cost tablet computers, etc. The base station or system device in the present application includes but is not limited to macro-cellular base stations, micro-cellular base stations, home base stations, relay base station, gNB (NR node B), Transmitter Receiver Point (TRP), and other radio communication equipment.

The above are merely the preferred embodiments of the present application and are not intended to limit the scope of protection of the present application. Any modification, equivalent substitute and improvement made within the spirit and principle of the present application are intended to be included within the scope of protection of the present application.

What is claimed is:

1. A first node for wireless communications, comprising:
   a receiver, configured to receive a first message comprising an indication of a first expiration value associated with a first timer, wherein the first message is a radio resource control (RRC) release message;
   in response to the received first message, run the first timer until an expiry of the first timer according to the first expiration value; and
   a first transmitter configured to transmit a second message used to determine an update of a first area, wherein the transmission of the second message is triggered after the expiry of the first timer and in response to a received system information block (SIB) message if there is an ongoing small data transmission (SDT), and wherein the transmission of the second message is triggered by the expiry of the first timer if there is no ongoing SDT.

2. A method in a first node for wireless communications, comprising:
   receiving a first message comprising an indication of a first expiration value associated with a first timer, wherein the first message is a radio resource control (RRC) release message;
   in response to the received first message, running the first timer until an expiry of the first timer according to the first expiration value; and
   transmitting a second message used to determine an update of a first area, wherein the transmission of the second message is triggered after the expiry of the first timer and in response to a received system information block (SIB) message if there is an ongoing small data transmission (SDT), and wherein the transmission of the second message is triggered by the expiry of the first timer if there is no ongoing SDT.

3. The first node of claim 1, further configured to:
in response to the received first message, enter an RRC_INACTIVE state.

4. The first node of claim 1, wherein the indication of the first expiration value is included in a T380 field of the first message.

5. The first node of claim 1, wherein the first timer is a T380 timer.

6. The first node of claim 1, wherein the ongoing SDT is via a first data radio bearer.

7. The first node of claim 1, wherein the transmission of the second message is triggered by the expiry of the first timer if an SDT at the first node fails before the expiry of the first timer.

8. The first node of claim 1, wherein the transmission of the second message is triggered after the expiry of the first timer and in response to the received SIB message if a serving cell of the first node does not belong to a configured ran-NotificationAreaInfo.

9. The first node of claim 1, wherein the second message is an RRC resume request message including a resumeCause indication with a value configured as rna-Update, and wherein the first area comprises a radio access network (RAN)-based Notification Area (RNA).

10. The method of claim 2, further comprising:
in response to the received first message, entering an RRC_INACTIVE state.

11. The method of claim 2, wherein the indication of the first expiration value is included in a t380 field of the first message.

12. The method of claim 2, wherein the first timer is a T380 timer.

13. The method of claim 2, wherein the ongoing SDT is via a first data radio bearer.

14. The method of claim 2, wherein the transmission of the second message is triggered by the expiry of the first timer if an SDT at the first node fails before the expiry of the first timer.

15. The method of claim 2, wherein the transmission of the second message is triggered after the expiry of the first timer and in response to the received SIB message if a serving cell of the first node does not belong to configured a ran-NotificationAreaInfo.

16. The method of claim 2, wherein the second message is an RRC resume request including a resumeCause indication with a value configured as rna-Update, and wherein the first area comprises a radio access network (RAN)-based Notification Area (RNA).

* * * * *